United States Patent
Mikami et al.

(10) Patent No.: US 6,549,840 B1
(45) Date of Patent: *Apr. 15, 2003

(54) VEHICLE CONTROL APPARATUS FOR FRONT AND REAR DRIVE RATIO ON THE BASIS OF OPERATOR'S DESIRED VEHICLE DRIVE FORCE AND STATIC AND DYNAMIC VEHICLE STATES

(75) Inventors: Tsuyoshi Mikami, Aichi-ken (JP); Koichi Kondo, Toyoake (JP); Takuji Kawabata, Okazaki (JP)

(73) Assignee: Toyota Jidosha Kabushiki Kaisha, Toyota (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 106 days.

(21) Appl. No.: 09/685,043

(22) Filed: Oct. 10, 2000

(30) Foreign Application Priority Data

Oct. 8, 1999 (JP) .......................... 11-287930
Oct. 8, 1999 (JP) .......................... 11-287931
Oct. 8, 1999 (JP) .......................... 11-287932

(51) Int. Cl.⁷ ............... G06F 7/00; B60K 1/00; B60K 6/00
(52) U.S. Cl. ............. 701/69; 180/65.2; 180/243; 701/89
(58) Field of Search ............... 701/22, 69, 70, 701/73, 82, 84, 89–91; 180/65.1, 65.2, 65.3, 65.6, 233, 243, 245, 248

(56) References Cited

U.S. PATENT DOCUMENTS

| | | | |
|---|---|---|---|
| 5,549,172 A | * 8/1996 | Mutoh et al. | 180/65.1 |
| 5,988,307 A | 11/1999 | Yamada et al. | 180/243 |
| 6,119,799 A | * 9/2000 | Morisawa et al. | 180/65.2 |
| 6,263,267 B1 | * 7/2001 | Anthony et al. | 701/22 |

FOREIGN PATENT DOCUMENTS

| | | |
|---|---|---|
| JP | 55-110328 | 8/1980 |
| JP | 55-127624 | 9/1980 |
| JP | 63-188528 | 8/1988 |
| JP | 63-284030 | 11/1988 |
| JP | 3-203502 | 9/1991 |
| JP | 6-80047 | 3/1994 |
| JP | 6-166344 | 6/1994 |
| JP | 6-166349 | 6/1994 |
| JP | 6-261416 | 9/1994 |
| JP | 7-117512 | 5/1995 |

(List continued on next page.)

OTHER PUBLICATIONS

News from Toyota, Oct. 8, 1999, No. 44.

Primary Examiner—William A. Cuchlinski, Jr.
Assistant Examiner—Edward Pipala
(74) Attorney, Agent, or Firm—Oblon, Spivak, McClelland, Maier & Neustadt, P.C.

(57) ABSTRACT

A vehicle control apparatus for controlling a four-wheel-drive automotive vehicle of a type which comprises a first drive power source for driving one of a pair of front wheels and a pair of rear wheels, and a second drive power source for driving the other of the pairs of front and rear wheels, wherein an operator's desired value of a vehicle drive force for driving the automotive vehicle is obtained on the basis of an amount of operation of a manually operated vehicle accelerating member and a running speed of the vehicle, and a front drive force for driving the pair of front wheels and a rear drive force for driving the pair of rear wheels are controlled on the basis of a static and a dynamic state of the vehicle such that a sum of the front drive force and the rear drive force is equal to the obtained operator's desired value of the vehicle drive force.

50 Claims, 33 Drawing Sheets

FOREIGN PATENT DOCUMENTS

| | | |
|---|---|---|
| JP | 7-125556 | 5/1995 |
| JP | 7-231508 | 8/1995 |
| JP | 7-90706 | 10/1995 |
| JP | 7-322404 | 12/1995 |
| JP | 8-300964 | 11/1996 |
| JP | 8-300965 | 11/1996 |
| JP | 9-284917 | 10/1997 |
| JP | 2000-79828 | 3/2000 |
| JP | 2000-79834 | 3/2000 |

* cited by examiner

| SHIFT LEVER POSITION | MODE | ENGAGED(○) OR RELEASED(×) | | |
|---|---|---|---|---|
| | | C1 | C2 | B1 |
| B,D | ETC DRIVE MODE | × | ○ | × |
| | DIRECT ENGINE DRIVE MODE | ○ | ○ | × |
| | FORWARD MOTOR DRIVE MODE | ○ | × | × |
| N,P | NEUTRAL MODE 1,2 | × | × | × |
| | CHARGING & ENGINE START MODE | × | × | ○ |
| R | REVERSE MOTOR DRIVE MODE | ○ | × | × |
| | FRICTION DRIVE MODE | ○ | × | ○ |

VEHICLE CONTROL APPARATUS FOR FRONT AND REAR DRIVE RATIO ON THE BASIS OF OPERATOR'S DESIRED VEHICLE DRIVE FORCE AND STATIC AND DYNAMIC VEHICLE STATES

BACKGROUND OF THE INVENTION

1. Field of the Invention

The present invention relates generally to a control apparatus for controlling a four-wheel-drive automotive vehicle, and more particularly to techniques for minimizing the operation of a rear-wheel driving electric motor so as to reduce a temperature rise of this electric motor, by controlling the ratio of distribution of the vehicle drive force to the front and rear drive wheels according to a desired vehicle drive force, particular while the vehicle is being started.

The present invention also relates to a control apparatus for controlling an automotive vehicle wherein one of a front and a rear drive wheels is driven by a first drive power source, while the other of the front and rear drive wheels is driven by a second vehicle drive power source.

2. Discussion of Related Art

There is known a control apparatus for controlling a four-wheel-drive automotive vehicle wherein the front wheels are driven by a first drive power source in the form of an engine while the rear wheels are driven by a second drive power source in the form of an electric motor. This control apparatus is arranged to increase the output torque of the electric motor with respect to the output torque of the engine, according to the operating amount of an accelerator pedal or the opening angle of a throttle valve. An example of such a control apparatus is disclosed in JP-A-63-188528.

In the known control apparatus for the four-wheel-drive vehicle described above, the output of the electric motor is controlled on the basis of the operating amount of the accelerator pedal and the vehicle running speed such that the output of the electric motor is increased with an increase in the operating amount of the accelerator pedal. However, the known control apparatus is not satisfactory and is required to be further improved, regarding the four-wheel driving mode in which the output of the engine for driving the front wheels and the output of the electric motor for driving the rear wheels are controlled depending upon the running condition of the vehicle. Where the operator's desired vehicle drive force is provided by the sum of the front wheel drive force and the rear wheel drive force in the four-wheel driving mode, for instance, the known control apparatus suffers from an inadequate control of the ratio of distribution of the vehicle drive force to the front and rear wheels, due to a change in the static condition and dynamic or running condition of the vehicle and a change in the road surface condition.

The known control apparatus indicated above has another drawback. That is, a permissible range of the output torque of the electric motor is not set depending upon the running condition of the vehicle. Accordingly, the electric motor may suffer from overheating, with a result of limiting the vehicle running condition in which the electric motor is operable, leading to deteriorated drivability of the vehicle. Namely, the output torque to be generated by the electric motor should be limited depending upon its operating temperature, in order to prevent overheating and other damages of the electric motor.

SUMMARY OF THE INVENTION

The prevent invention was made in view of the background prior art discussed above. It is a first object of the present invention to provide a control apparatus for controlling a four-wheel-drive automotive vehicle, which permits the vehicle to be driven with the operator's desired drive force, with an optimum ratio of distribution of the vehicle drive force to the front and rear wheels, irrespective of changes in the static and dynamic condition of the vehicle and the road surface condition.

A second object of the present invention is to provide a control apparatus for controlling an automotive vehicle having two drive power sources for driving respective front and rear drive wheels, which control apparatus permits increased drivability of the vehicle, by reducing a limitation of the vehicle running conditions in which the second drive power source in the form of an electric motor is operated.

The first object may be achieved according to a first aspect of the present invention, which provides a vehicle control apparatus for controlling a four-wheel-drive automotive vehicle of a type which comprises a first drive power source for driving one of a pair of front wheels and a pair of rear wheels, and a second drive power source for driving the other of the pairs of front and rear wheels, characterized in that the vehicle control apparatus is operable to control a front drive force for driving the pair of front wheels and a rear drive force for driving the pair of rear wheels, depending upon a static and a dynamic state of the vehicle such that a sum of the front drive force and the rear drive force is equal to the obtained operator's desired value of a vehicle drive force for driving said automotive vehicle, which operator's desired value is obtained on the basis of an amount of operation of a manually operated vehicle accelerating member and a running speed of the vehicle.

In the vehicle control apparatus constructed according to the first aspect of this invention constructed as described above, the front and rear drive forces for driving the respective pairs of front and rear wheels are controlled on the basis of the static and dynamic states of the vehicle such that a sum of the front and rear drive forces is equal to the operator's desired value of the vehicle drive force which is obtained on the basis of the amount of operation of the manually operated vehicle accelerating member and the running speed of the vehicle. This vehicle control apparatus permits the vehicle to be driven in the four-wheel driving mode such that the ratio of the front and rear drive forces with respect to each other suitably reflects the static and dynamic states of the vehicle, which includes the condition of the road surface on which the vehicle lies.

Preferably, the operator's desired value of the vehicle drive force is calculated on the basis of the operating amount of an accelerator pedal and the vehicle running speed and according to a predetermined relationship between the operator's desired value and the operating amount of the accelerator pedal and the vehicle running speed, and the front and rear drive forces for driving the front and rear wheels are controlled on the basis of the static state of the vehicle such as a load distribution ratio of the front and rear wheels, the dynamic state of the vehicle such as a difference between the rotating speeds of the front and rear wheels and a longitudinal acceleration value of the vehicle, and the road surface condition such as the friction coefficient and gradient of the road surface, such that the sum of the front and rear drive forces is equal to the calculated operator's desired value of the vehicle drive force.

According to one preferred form of the vehicle control apparatus according to the first aspect of the invention, the first drive power source consists of a plurality of drive power sources, preferably, a plurality of drive power sources of different types. In this form of the control apparatus, at least one of the two or more drive power sources of the first drive power source can be operated in an operating condition in which the efficiency is high enough to assure a high degree of fuel economy of the vehicle.

Preferably, the second drive power source consists of at least one motor/generator which selectively function as an electric motor and an electric motor. This second drive power source is desirably used to drive the pair of rear wheels.

According to another preferred form of the vehicle control apparatus according to the first aspect of this invention, a ratio of the front drive force and the rear drive force with respect to each other is determined on the basis of the operator's desired value of the vehicle drive force. For instance, the ratio is changed when the operator's desired value of the vehicle drive force has been reduced below a predetermined threshold. This arrangement reduces the rear-wheel drive force, when the operator's desired vehicle drive force is small to such an extend that there is not a risk of slipping of the drive wheels. This arrangement is effective to prevent an unnecessary consumption of an electric power and a temperature rise of the electric motor used to drive the rear wheels.

According to a further preferred form of the vehicle control apparatus, the static state of the vehicle includes a starting state of the vehicle, and the ratio of the front drive force and the rear drive force in the starting state of the vehicle is controlled on the basis of the operator's desired value of the vehicle drive force. This arrangement assures an adequate control of the distribution of the front and rear drive forces depending upon the operator's desired vehicle drive force, when the four-wheel-drive vehicle is started.

According to a still further preferred form of the vehicle control apparatus, the static state of the vehicle includes a starting state of the vehicle, and the ratio of the front drive force and the rear drive force in the starting state of the vehicle is controlled such that one of the front and rear drive forces which is used for driving one of the pairs of front and rear wheels which is driven by one of the first and second drive power sources whose performance is more adversely influenced by a rise of its operating temperature is smaller when the operator's desired value of the vehicle drive force is smaller than a predetermined threshold than when the operator's desired value is not smaller than the predetermined threshold. This arrangement is effective to reduce the thermal load of one of the first and second drive power sources that is more likely to be adversely influenced by a rise of the operating temperature, whereby the vehicle can be kept driven in the four-wheel driving mode for a relatively long time.

According to a yet further preferred form of the vehicle control apparatus, the static state of the vehicle includes a starting state of the vehicle, and the ratio of the front drive force and the rear drive force in the starting state of the vehicle is controlled such the rear drive force for driving the rear wheels driven by the second drive power source is smaller when the operator's desired value of the vehicle drive force is smaller than a predetermined threshold than when the operator's desired value is not smaller than the predetermined threshold. This arrangement reduces the rear drive force to be produced by the second drive power source, resulting in a reduction in the operating temperature of the second drive power source, so that the second drive power source can be operated in a wider range of operating condition.

The above-indicated predetermined threshold used for controlling the ratio of the front and rear drive forces with respect to each other is determined by the maximum vehicle drive force below which the drive wheels are not likely to slip on a road surface having a predetermined low value of friction coefficient. According to this arrangement, the ratio of the rear drive force is made smaller to reduce the output of the second drive power source, namely, the output of the rear-wheel drive electric motor, so as to prevent overheating of this electric motor, when the operator's desired vehicle drive force is smaller than the threshold, that is, does not cause the front and rear drive wheels to slip on the road surface.

The object indicated above may also be achieved according to a second aspect of this invention, which provides a vehicle control apparatus for controlling a four-wheel-drive automotive vehicle of a type which comprises a first drive power source for driving one of a pair of front wheels and a pair of rear wheels, and a second drive power source for driving the other of the pair of front and rear wheels, the vehicle control apparatus being operable to drive the automotive vehicle in a four-wheel driving mode in which the pairs of front and rear wheels are driven by the first and second drive power sources, when the automotive vehicle is placed in any one of a starting state in which the vehicle is being started, an accelerating state in which the vehicle is being accelerated, and a low-$\mu$ running state in which the vehicle is running on a road surface whose friction coefficient is lower than a predetermined threshold, the vehicle control apparatus being operable to drive the automotive vehicle in a two-wheel driving state in which one of the pairs of front and rear wheels are driven, when the vehicle is not placed in any one of the starting state, accelerating state and the low-$\mu$ running state.

In the vehicle control apparatus constructed according to a second aspect of this invention described above, the automotive vehicle is driven in the four-wheel driving mode with both the front wheels and the rear wheels, when the vehicle is placed in one of the starting state, accelerating state and low-$\mu$ running state. Accordingly, the four-wheel driving mode ro the two-wheel running mode is selected depending upon the vvehicle state, so that unnecessary vehicle running in the four-wheel driving mode is avoided, whereby the overheating of the second drive power source driven in the four-wheel driving mode can be prevented.

According to one preferred form of the second aspect of the invention, the vehicle control apparatus is operable to drive the automotive vehicle in the four-wheel driving mode when a load acting on the vehicle is smaller than a predetermined threshold, namely, when the vehicle is in deceleration or in a coasting run without an operation of a brake operating member. This vehicle control apparatus permits the vehicle driving in the four-wheel driving mode under a relatively small load.

The first and second drive power sources may include at least one electric motor, or a drive power source capable of generating an electric energy, namely, a motor/generator which selectively functions as an electric motor and an electric generator. In this case, the electric motor (motor/generator) is operated such that the engine is operable in an operating condition in which the efficiency of the engine is sufficiently high.

The vehicle control apparatus according a preferred form of the second aspect of the invention is operable when the vehicle is in the starting state, to drive the vehicle with only the electric motor of the first or second drive power source, or with a drive power source of the first or second drive power source, which is capable of generating an electric energy. In this case, the vehicle can be started without an operation of the engine, leading to an improved fuel economy of the engine.

The vehicle control apparatus according to another preferred form of the second aspect of the invention is operable to operate at least one electric motor as an electric generator so as to provide a regenerative braking torque, when the vehicle is being braked or in a coasting run. This arrangement assures improved energy efficiency and fuel economy of the vehicle.

The vehicle control apparatus according to a further preferred form of the second aspect of the invention is operable to drive the automotive vehicle with only the engine of the first drive power source, or with both the engine and the drive power source or electric motor capable of generating an electric energy, when a load acting on the vehicle is larger than a predetermined threshold. This arrangement permits the vehicle to be driven in the four-wheel driving mode with a sufficiently large drive force.

The object indicated above may also be achieved according to a third aspect of this invention, which provide a vehicle control apparatus for controlling an automotive vehicle of a type wherein front wheels and rear wheels can be driven by a drive power source device, the vehicle control apparatus being operable to control a front drive force for driving the front wheels and a rear drive force for driving the rear wheels, depending upon a state of the automotive vehicle, such that a sum of the front drive force and the rear drive force is equal to an operator's desired value of a vehicle drive force for driving the vehicle, which operator's desired value is obtained on the basis of an amount of operation of a manually operated vehicle accelerating member and a running speed of the vehicle.

In the vehicle control apparatus according to the third aspect of the invention, the front drive force and the rear drive force are controlled depending upon the vehicle state, such that the sum of the front and rear drive forces is equal to the operator's desired vehicle drive force obtained on the basis of the operating amount of the manually operated vehicle accelerating member and the vehicle running state. This vehicle control apparatus permits the vehicle to be driven in the four-wheel driving mode with the operator's desired vehicle drive force, such that the front and rear drive forces suitably reflect the vehicle state.

Preferably, the front and rear wheels are operatively connected to a common drive power source device, and the ratio of the front drive force and the rear drive force with respect to each other is controlled by a drive force distributing clutch. This arrangement eliminates a need of providing a plurality of drive power sources at respective different locations on the vehicle.

In a further preferred form of the vehicle control apparatus according to the first or second aspect of this invention described above, the automotive vehicle has traction control means for reducing a drive force of the one of the pairs of front and rear wheels, so that a slip ratio of the one pair of wheels driven by the first drive power source is held within a predetermined optimum range, the vehicle control apparatus comprising (a) torque distribution feedback control means for controlling a front-rear torque distribution ratio which is a ratio of a front-wheel drive torque for driving the front wheels and a rear-wheel drive torque for driving the rear wheels with respect to each other, such that an actual state of slipping of the one pair of wheels with respect to that of the other pair of wheels coincides with a desired state of slipping, and (b) feedback control changing means operable when the traction control means is in operation, for commanding the torque distribution feedback control means to change the front-rear torque distribution ratio to a value different from that used when the traction control means is not in operation.

In the above arrangement, the front-rear torque distribution ratio is controlled by the feedback-controlled by the torque distribution feedback control means such that the actual slipping state of the front and rear wheels with respect to each other coincides with the desired value, so that the total drive torque is adequately distributed to the front and rear wheels. Further, the feedback control changing means commands the torque distribution feedback control means to control the front-rear torque distribution ratio to different values depending upon whether the traction control means is in operation or not. Namely, even where the drive torque of the drive wheels driven by the first drive power source is reduced to reduce the slipping tendency of those drive wheels as a result of the traction control by the traction control means, for instance, the drive torque of the other drive wheels driven by the second drive power source is increased to maintain substantially the same total vehicle drive force or torque, so that the vehicle can be driven in the four-wheel driving mode with high drivability.

Preferably, the vehicle control apparatus according to the above preferred arrangement further includes second-drive-source control means for controlling the second drive power source on the basis of the front-rear torque distribution ratio determined by the torque distribution feedback control means. In this instance, the actual front-rear torque distribution is controlled by an operation of the second drive power source so that the actual slip state of the front and rear wheels is made equal to the desired value.

The feedback control changing means indicated above is preferably adapted to command the torque distribution feedback control means, during an operation of the traction control means, to change at least one of a) a control error of the slip state of the wheels to be controlled by feedback control by the torque distribution feedback control means, b) a desired value of the slip state, and c) an actual value of the slip state, the control error being a difference between the desired and actual values, such that the ratio of the above-indicated other pair of wheels driven by the second drive power source is increased. In this arrangement wherein at least one of the control error of the slip state and the desired and actual values of the slip state which determine the control error is changed so as to increase the ratio of the drive torque of the wheels driven by the second drive power source, the vehicle can be driven with high drivability, with the second drive power source being operated to drive the corresponding wheels with the increased drive torque even while the other drive wheels are under the traction control by the traction control means.

The feedback control changing means is preferably adapted to command the torque distribution feedback control means to change a feedback gain included in a feedback control equation used for calculating the front-rear torque distribution ratio, such that the changed feedback gain increase the ratio of the drive torque of the wheels driven by the second drive power source. This arrangement to change the feedback gain so as to increase the ratio of the drive torque of the wheels driven by the second drive power source permits the vehicle to be driven with high drivability with the second drive power source being operated to drive the corresponding wheels with an increased drive torque when the traction control means is in operation.

The feedback control changing means may be adapted to change, during an operation of the traction control means, the front-rear torque distribution ratio as calculated by the torque distribution feedback control means according to a control equation, such that the changed front-rear torque distribution ratio increases the ratio of the drive torque of the wheels driven by the second drive power source. In this arrangement, too, the second drive power source is operated to drive the corresponding wheels with an increased drive torque even while the traction control means is in operation.

Preferably, the traction control means is adapted to reduce the output of the first drive power source and/or the drive force of the wheels driven by the first drive power source, when the vehicle is started on a snow-covered or frozen road surface or any other road surface whose friction coefficient is lower than a predetermined lower limit. In this case, the front-rear torque distribution ratio is changed by the torque distribution feedback control means where the traction control is effected to reduce the output of the first drive power source and/or the drive force of the drive wheels driven by the first drive power source.

In a further preferred form of the vehicle control apparatus according to the first or second aspect of the invention, the first drive power source includes a first electric motor for driving the pair of front wheels while the second drive power source includes a second electric motor for driving the pair of rear wheels, the vehicle control apparatus being operable to control the first and second electric motors according to a predetermined relationship between thermal ratings of the first and second electric motors. This arrangement permits the vehicle to be driven with a high degree of running stability, while taking into account of the balance of the front-wheel drive force and the rear-wheel drive force.

Preferably, the thermal rating of the first electric motor is made higher than that of the second electric motor, so that the output of the second electric motor having the lower thermal rating is restricted or limited before that of the first electric motor is restricted or reduced. The restriction of the output of the second electric motor operated to drive the rear wheels assures a comparatively high degree of running stability of the vehicle.

In a still further preferred form of the vehicle control apparatus according to the first or second aspect of this invention, the first drive power source includes a first electric motor for driving the pair of front wheels while the second drive power source includes a second electric motor for driving the pair of rear wheels, and the first drive power source includes a first electric motor for driving the pair of front wheels while the second drive power source includes a second electric motor for driving the pair of rear wheels, the vehicle control apparatus including first-motor output increasing means operable when an output of the second electric motor is limited, to increase an output of the first electric motor. In the present arrangement wherein the output of the first electric motor is increased when the output of the second electric motor is limited, the vehicle can be driven with a comparatively high degree of stability, without a change in the total vehicle drive force. Where each of the first and second electric motor is a motor/generator capable of providing a regenerative braking torque, the vehicle can be braked with a comparatively high degree of stability, without a change in the total regenerative vehicle braking torque.

In the above form of the invention, too, the thermal rating of the first electric motor is preferably made higher than that of the second electric motor, so that the output of the second electric motor having the lower thermal rating is restricted or limited before that of the first electric motor. The restriction of the output of the second electric motor operated to drive the rear wheels assures a comparatively high degree of running stability of the vehicle.

In another preferred form of the vehicle control apparatus according to the first or second aspect of the present invention, the first drive power source includes a first electric motor for driving the pair of front wheels while the second drive power source includes a second electric motor for driving the pair of rear wheels, and the vehicle control apparatus includes second-motor output reducing means operable when an output of the first electric motor is limited, to reduce an output of the second electric motor so that a ratio of a front drive force for driving the front wheels and a rear drive force for driving the rear wheels with respect to each other coincides with a desired value. This arrangement to reduce the output of the second electric motor upon reduction of the output of the first electric motor permits the actual front-rear distribution ratio of the vehicle drive force or braking force to be maintained at the desired value, assuring a high degree of running stability of the vehicle. Namely, upon reduction of the output of the first electric motor, the output of the second electric motor is reduced so that the desired rear-wheel drive force ratio is maintained, or so that the actual front-wheel drive force is larger than the rear-wheel drive force by a desired amount. Where each of the first and second electric motors is a motor/generator, the regenerative braking force generated by the second electric motor is reduced when the regenerative braking force generated by the first electric motor is limited. Thus, the vehicle can be driven with high stability, without a change in the front-rear drive force distribution ratio.

Preferably, the thermal rating of the first electric motor is made higher than that of the second electric motor, so that the output of the second electric motor having the lower thermal rating is restricted or limited before that of the first electric motor is restricted or reduced. The restriction of the output of the second electric motor operated to drive the rear wheels assures a comparatively high degree of running stability of the vehicle.

The vehicle control apparatus according to a further preferred form of the first or second aspect of this invention is adapted to apply an assisting drive force to the automotive vehicle upon starting of the automotive vehicle on an uphill road surface, such that the assisting drive force corresponds to a gradient of the uphill road surface, the vehicle control apparatus including means for inhibiting the application of the assisting drive force to the automotive vehicle if a brake operating member for applying a brake to the automotive vehicle has been kept in its non-operated position for more than a predetermined time while the vehicle is stationary. A fact that the vehicle has been kept in its non-operated position for a relatively long time indicates that the vehicle operator does not has an intention of starting the vehicle. Since an assisting drive force is not applied to the vehicle in this case, the vehicle is permitted to be moved down in the reverse direction on the uphill road surface, so that the vehicle operator can recognize or perceive the gradient of the uphill road surface.

The vehicle control apparatus according to a further preferred form of the first or second aspect of this invention is adapted to apply an assisting drive force to the automotive vehicle on an uphill road surface, such that the assisting drive force corresponds to a gradient of the uphill road surface, the vehicle control apparatus including means for generating the assisting drive force such that the assisting drive force rapidly increases to a desired value for an initial period of the application of the assisting drive force, and slowly decreases from the desired value to zero for a terminal period of the application of the assisting drive force. According to this arrangement, the vehicle can be smoothly started on the uphill road surface, with the assisting drive force being rapidly increased to the desired value, so that the vehicle is suitably prevented from being moved down in the reverse direction on the uphill road surface upon starting of the vehicle. Further, the assisting drive force is slowly reduced after the vehicle has been started on the uphill road surface, so that the assisting drive force is removed without giving a discomfort to the vehicle operator.

In a further preferred form of the vehicle control apparatus according to the first or second aspect of the invention, the front drive force for driving the pair of front wheels and the rear drive force for driving the pair of rear wheels are controlled, during starting of the vehicle, on the basis of a gradient of a road surface on which the vehicle is started. In this arrangement, the front and rear drive force the sum of which is determined by the operator's desired vehicle drive force are controlled on the basis of the gradient of the road surface while the vehicle is being started.

The vehicle control apparatus according to the above preferred form of the invention is desirably adapted to determine the vehicle drive force on the basis of the gradient of the road surface such that a speed at which the vehicle is moved down in the reverse direction on an uphill road surface is lower than a predetermined threshold, as long as the road surface gradient is held within a predetermined range. In other words, the vehicle drive force is not increased after the road surface gradient exceeds the upper limit of the predetermined range, so that the vehicle operator can perceive the relatively large road surface gradient with high accuracy, since the vehicle is more or less moved down on the road surface in the reverse direction if the road surface gradient is excessively large.

The above-indicated predetermined threshold or upper limit of the speed of the backward movement of the vehicle on the uphill road surface is preferably several km/h, for instance, about 1–3 km/h. In this case, the vehicle is prevented from moving down on the uphill road surface at a high speed exceeding about 3 km/h, for example.

However, the vehicle drive force may be determined on the basis of the gradient of the road surface such that an acceleration value of the vehicle when the vehicle is moved down in the reverse direction on the uphill road surface is lower than a predetermined threshold, for instance, about 1.0 m/s$^2$.

The application of the vehicle drive force corresponding to the road surface gradient may be terminated when the operator's desired vehicle drive force has exceeded a predetermined upper limit. In this arrangement, the vehicle drive force is increased with an increase in the road surface gradient, to prevent or reduce the downward reverse movement of the vehicle on the uphill road surface, as long as the operator's desired vehicle drive force is smaller than the upper limit.

The second object indicated above may be achieved according to a third aspect of this invention, which provides a vehicle control apparatus for controlling a four-wheel-drive automotive vehicle of a type which comprises a first drive power source for driving one of a pair of front wheels and a pair of rear wheels, and a second drive power source for driving the other of the pairs of front and rear wheels, the vehicle control apparatus comprising:

output-torque-range selecting means for selecting one of a plurality of output torque ranges in which the second drive power source is operated, on the basis of an operating state of the automotive vehicle; and second-power-source control means for operating the second drive power source such that an output torque of the second drive power source is held within the selected output torque range.

In the vehicle control apparatus constructed according to the third aspect of the present invention, the second drive power source is operated such that the output torque of the second drive power source is held within one of the output torque ranges which is selected by the output-torque-range selecting means on the basis of the operating state of the vehicle. This arrangement permits the automotive vehicle to be driven, with the second drive power source being operated to provide the required minimum drive force. Accordingly, there does not arise an overheating or a temperature rise of the second drive power source, which would limit the operation of the second drive power source. Thus, the present arrangement reduces the limitation in the operation of the second drive power source, making it possible to improve the drivability of the vehicle.

Preferably, the vehicle control apparatus according to the third aspect of the invention further comprises output-torque-range memory means for storing data representative of the plurality of output torque ranges.

In one preferred form of the vehicle control apparatus according to the third aspect of the invention, the plurality of output torque ranges include at least a first range of the output torque and a second range of the output torque whose upper limit is smaller than that of the first range. This arrangement permits the second drive power source to be operated in the second output torque range whose upper limit is comparatively small. Accordingly, an operation of the second drive power source for a long time to provide a comparatively large drive torque in the first range is avoided, thereby preventing an overheating or temperature rise of the second drive power source, so that the second drive power source can be maintained in an operable state. For instance, the two or more output torque ranges are defined in a two-dimensional coordinate system in which the operating speed of the second drive power source is taken along a first axis while the output torque of the second drive power source is taken along a second axis perpendicular to the first axis. The first output torque range has a larger maximum output torque value than that of the second output torque range. One of these first and second output torque ranges is selected depending upon the operating or running state of the vehicle, for driving the vehicle in the four-wheel drive mode with an operation of the second drive power source as well as an operation of the first drive power source, such that the output torque of the second drive power source is reduced as much as possible. The present arrangement prevents a continued operation of the second drive power source in the first output toque range in which the output torque is comparatively large, so that the second drive power source is kept operable.

In another preferred form of the vehicle control apparatus according to the third aspect of the invention, the second-power-source control means reduces the output torque of the second drive power source across a boundary of two adjacent ones of the plurality of output torque ranges, at a rate lower than a rate at which the second-power-source control means increases the output torque across the boundary. This arrangement prevents a rapid reduction of the drive force of the wheels driven by the second drive power source, assuring running stability of the vehicle. When the selected output torque range of the second drive power source is changed from the range whose maximum drive toque is relatively large to the range whose maximum drive torque is relatively small, the second-power-source control means reduces the output torque of the second drive power source at a rate lower than the rate at which the output torque is increased when the selected output torque range is changed from the range whose maximum drive torque is relatively small to the range whose maximum drive torque is relatively large. Accordingly, an abrupt reduction of the drive force of the wheels driven by the second drive power source is avoided, assuring a sufficiently high degree of running stability of the vehicle.

In a still further preferred form of the vehicle control apparatus according to the third aspect of the invention, the output-torque-range selecting means selects the above-indicated first range when the automotive vehicle is placed in any one of a starting state, a slipping state of its drive wheels and an understeering state, and selects the above-indicated second range when the automotive vehicle is placed in any other states. This arrangement permits the second drive power source to be operated to provide a sufficiently large drive torque when the vehicle is in a starting or understeering state or when the drive wheels are slipping on the road surface. For instance, the output-torque-range selecting means is adapted to select the first output torque range when the wheels driven by the first drive power source are slipping. The present form of the vehicle control apparatus is effective to permit smooth starting and acceleration of the vehicle, and prevent slipping of the wheels driven by the first drive power source and an understeering state of the vehicle.

In a yet further preferred form of the vehicle control apparatus according to the third aspect of this invention, the output-torque-range selecting means selects the above-indicated first range when a gradient of a road surface on which the automotive vehicle lies is larger than a predetermined threshold, and selects the above-indicated second range when the gradient is not larger than the predetermined threshold. This arrangement is effective to prevent or reduce the reverse downward movement of the vehicle on an uphill road surface, while maximizing the frequency of operation of the second drive power source in the second output torque range so as to provide the required minimum drive torque. Thus, the present arrangement assures improved efficiency of operation of the second drive power source and effectively prevents overheating of the second drive power source, particularly where the second drive power source is an electric motor.

In still another preferred form of the vehicle control apparatus according to the third aspect of this invention, the second-drive-source control means operates the second drive power source during starting of the automotive vehicle on an uphill road surface, such that the automotive vehicle is kept driven in a four-wheel driving mode with the pairs of front and rear wheels, until the running speed of the vehicle is raised to a higher value when the gradient of the uphill road surface is relatively large, than when the gradient is relatively small. This arrangement is effective to prevent or reduce the reverse downward movement of the vehicle on the uphill road surface when the vehicle is started on the uphill road surface.

Preferably, the vehicle control apparatus according to the third aspect of the invention further comprises (a) an ant-lock braking-pressure control means operable upon detecting of slipping of any one of the wheels on the basis of the peripheral speed of each wheel detected by a wheel speed sensor, for controlling a braking force to be applied to each slipping wheel such that a slip ratio of the slipping wheel is held within a predetermined range, and (b) vehicle-turning-stability control means operable during turning of the vehicle, for controlling a braking force or drive force of an appropriate one or ones of the wheels so as to prevent an understeering or oversteering state off the vehicle, such that a direction of running of the vehicle does not deviate from a nominal running path of the vehicle defined by a steering angle of a steering wheel of the vehicle, and wherein the second-power-source control means terminates or inhibits an operation of the second drive power source when said wheel speed sensor is defective, or when one of the anti-lock braking-pressure control means and the vehicle-turning-stability control means is in operation. This arrangement automatically changes the vehicle driving mode from the four-wheel driving mode to the two-wheel driving mode (in which the vehicle is driven with only the first drive power source), when the wheel speed sensor is defective or when the anti-lock braking-pressure control means or the vehicle-turning-stability control means is in operation. The present arrangement prevents a control interference between different controls including the control of the second drive power source by the second-power-source control means, the anti-lock braking-pressure control by the anti-lock braking-pressure control means and the vehicle-turning-stability control by the vehicle-turning-stability control means, so that the running stability and safety of the vehicle is improved.

Preferably, the vehicle control apparatus according to the third aspect of the invention further comprises low-temperature detecting means for detecting that an ambient temperature of the vehicle is lower than a predetermined lower limit below which a friction coefficient of a road surface on which the vehicle is running is expected to be lower than a predetermined lower limit, and wherein the second-power-source control means operates the second drive power source when the ambient temperature lower than the lower limit is detected by the low-temperature detecting means. In this arrangement, the second drive power source is automatically activated upon detection of the ambient temperature lower than the lower limit, so that the running safety of the vehicle is improved.

Preferably, the control apparatus according to the third aspect of this invention further comprises (a) vehicle-starting detecting means for determining whether the vehicle is in the process of being started, (b) wheel-slip detecting means for determining whether the wheels are slipping on a road surface, (c) understeering detecting means for determining, on the basis of a steering angle and a yaw rate of the vehicle, whether the vehicle is turning in an understeering state, (d) vehicle-turning detecting means for determining whether the vehicle is turning with the steering angle being larger than a predetermined threshold, (e) accelerator operation detecting means for determining whether a vehicle accelerating member is operated at a rate higher than a predetermined threshold, (f) high-load running detecting means for determining whether the vehicle is running under a relatively high load with the vehicle accelerating member being operated by more than a predetermined amount, and (g) vehicle-deceleration detecting means for determining whether the vehicle is in a decelerating state, and wherein the second-power-source control means determines that the vehicle is required to be driven in the four-wheel driving mode, and operates the second drive power source, when an affirmative decision is obtained by any one of the vehicle-starting detecting means, the wheel-slip detecting means, the understeering detecting means, the vehicle turning-detecting means, the accelerator operation detecting means, the high-load running detecting means and the vehicle-deceleration detecting means, the second-power-source control means determining that the vehicle is not required to be driven in the four-wheel driving mode when a negative decision is obtained by all of the above-indicated seven detecting means, and turning off the second drive power source a predetermined delay time after the moment of the determination that the vehicle is not required to be driven in the four-wheel driving mode. According to this arrangement, the second drive power source is automatically operated when the vehicle driving in the four-wheel driving mode is required, so that the vehicle can be driven with high stability. Further, the delay time provided after the determination that the four-wheel driving of the vehicle is not required and before the second drive power source is turned off is effective to prevent a on-off control hunting of the second drive power source.

Preferably, the vehicle control apparatus according to the above-arrangement further comprises at least one of (a) steering-angle sensor defect detecting means for detecting a defect of a steering angle sensor for detecting the steering angle of the steering wheel of the vehicle, and (b) a yaw-rate sensor defect detecting means for detecting a defect of a yaw rate sensor for detecting the yaw rate of the vehicle, and wherein the second-power-source control means does not operate the second drive power source if the defect of either one of the steering angle sensor and the yaw rate sensor is detected, even when the understeering detecting means has detected the understeering state of the vehicle. This arrangement prevents the vehicle driving in the four-wheel driving mode even if the understeering state of the vehicle is erroneously detected due to a defect of the steering angle sensor or yaw rate sensor.

In a further preferred form of the vehicle control apparatus according to the third aspect of this invention described above, the automotive vehicle has traction control means for reducing a drive force of the one of the pairs of front and rear wheels, so that a slip ratio of the one pair of wheels driven by the first drive power source is held within a predetermined optimum range, the vehicle control apparatus comprising (a) torque distribution feedback control means for controlling a front-rear torque distribution ratio which is a ratio of a front-wheel drive torque for driving the front wheels and a rear-wheel drive torque for driving the rear wheels with respect to each other, such that an actual state of slipping of the one pair of wheels with respect to that of the other pair of wheels coincides with a desired state of slipping, and (b) feedback control changing means operable when the traction control means is in operation, for commanding the torque distribution feedback control means to change the front-rear torque distribution ratio to a value different from that used when the traction control means is not in operation.

In the above arrangement, the front-rear torque distribution ratio is controlled by the feedback-controlled by the torque distribution feedback control means such that the actual slipping state of the front and rear wheels with respect to each other coincides with the desired value, so that the total drive torque is adequately distributed to the front and rear wheels. Further, the feedback control changing means commands the torque distribution feedback control means to control the front-rear torque distribution ratio to different values depending upon whether the traction control means is in operation or not. Namely, even where the drive torque of the drive wheels driven by the first drive power source is reduced to reduce the slipping tendency of those drive wheels as a result of the traction control by the traction control means, for instance, the drive torque of the other drive wheels driven by the second drive power source is increased to maintain substantially the same total vehicle drive force or torque, so that the vehicle can be driven in the four-wheel driving mode with high drivability.

Preferably, the vehicle control apparatus according to the above preferred arrangement further includes second-drive-source control means for controlling the second drive power source on the basis of the front-rear torque distribution ratio determined by the torque distribution feedback control means. In this instance, the actual front-rear torque distribution is controlled by an operation of the second drive power source so that the actual slip state of the front and rear wheels is made equal to the desired value.

The feedback control changing means indicated above is preferably adapted to command the torque distribution feedback control means, during an operation of the traction control means, to change at least one of a) a control error of the slip state of the wheels to be controlled by feedback control by the torque distribution feedback control means, b) a desired value of the slip state, and c) an actual value of the slip state, the control error being a difference between the desired and actual values, such that the ratio of the above-indicated other pair of wheels driven by the second drive power source is increased. In this arrangement wherein at least one of the control error of the slip state and the desired and actual values of the slip state which determine the control error is changed so as to increase the ratio of the drive torque of the wheels driven by the second drive power source, the vehicle can be driven with high drivability, with the second drive power source being operated to drive the corresponding wheels with the increased drive torque even while the other drive wheels are under the traction control by the traction control means.

The feedback control changing means is preferably adapted to command the torque distribution feedback control means to change a feedback gain included in a feedback control equation used for calculating the front-rear torque distribution ratio, such that the changed feedback gain increase the ratio of the drive torque of the wheels driven by the second drive power source. This arrangement to change the feedback gain so as to increase the ratio of the drive torque of the wheels driven by the second drive power source permits the vehicle to be driven with high drivability with the second drive power source being operated to drive the corresponding wheels with an increased drive torque when the traction control means is in operation.

The feedback control changing means may be adapted to change, during an operation of the traction control means, the front-rear torque distribution ratio as calculated by the torque distribution feedback control means according to a control equation, such that the changed front-rear torque distribution ratio increases the ratio of the drive torque of the wheels driven by the second drive power source. In this arrangement, too, the second drive power source is operated to drive the corresponding wheels with an increased drive torque even while the traction control means is in operation.

Preferably, the traction control means is adapted to reduce the output of the first drive power source and/or the drive force of the wheels driven by the first drive power source, when the vehicle is started on a snow-covered or frozen road surface or any other road surface whose friction coefficient is lower than a predetermined lower limit. In this case, the front-rear torque distribution ratio is changed by the torque distribution feedback control means where the traction control is effected to reduce the output of the first drive power source and/or the drive force of the drive wheels driven by the first drive power source.

In a further preferred form of the vehicle control apparatus according to the third aspect of the invention, the first drive power source includes a first electric motor for driving the pair of front wheels while the second drive power source includes a second electric motor for driving the pair of rear wheels, the vehicle control apparatus being operable to control the first and second electric motors according to a predetermined relationship between thermal ratings of the first and second electric motors. This arrangement permits the vehicle to be driven with a high degree of running stability, while taking into account of the balance of the front-wheel drive force and the rear-wheel drive force.

Preferably, the thermal rating of the first electric motor is made higher than that of the second electric motor, so that the output of the second electric motor having the lower thermal rating is restricted or limited before that of the first electric motor is restricted or reduced. The restriction of the output of the second electric motor operated to drive the rear wheels assures a comparatively high degree of running stability of the vehicle.

In a still further preferred form of the vehicle control apparatus according to the third aspect of this invention, the first drive power source includes a first electric motor for driving the pair of front wheels while the second drive power source includes a second electric motor for driving the pair of rear wheels, and the first drive power source includes a first electric motor for driving the pair of front wheels while the second drive power source includes a second electric motor for driving the pair of rear wheels, the vehicle control apparatus including first-motor output increasing means operable when an output of the second electric motor is limited, to increase an output of the first electric motor. In the present arrangement wherein the output of the first electric motor is increased when the output of the second electric motor is limited, the vehicle can be driven with a comparatively high degree of stability, without a change in the total vehicle drive force. Where each of the first and second electric motor is a motor/generator capable of providing a regenerative braking torque, the vehicle can be braked with a comparatively high degree of stability, without a change in the total regenerative vehicle braking torque.

In the above form of the invention, too, the thermal rating of the first electric motor is preferably made higher than that of the second electric motor, so that the output of the second electric motor having the lower thermal rating is restricted or limited before that of the first electric motor. The restriction of the output of the second electric motor operated to drive the rear wheels assures a comparatively high degree of running stability of the vehicle.

In another preferred form of the vehicle control apparatus according to the third aspect of the present invention, the first drive power source includes a first electric motor for driving the pair of front wheels while the second drive power source includes a second electric motor for driving the pair of rear wheels, and the vehicle control apparatus includes second-motor output reducing means operable when an output of the first electric motor is limited, to reduce an output of the second electric motor so that a ratio of a front drive force for driving the front wheels and a rear drive force for driving the rear wheels with respect to each other coincides with a desired value. This arrangement to reduce the output of the second electric motor upon reduction of the output of the first electric motor permits the actual front-rear distribution ratio of the vehicle drive force or braking force to be maintained at the desired value, assuring a high degree of running stability of the vehicle. Namely, upon reduction of the output of the first electric motor, the output of the second electric motor is reduced so that the desired rear-wheel drive force ratio is maintained, or so that the actual front-wheel drive force is larger than the rear-wheel drive force by a desired amount. Where each of the first and second electric motors is a motor/generator, the regenerative braking force generated by the second electric motor is reduced when the regenerative braking force generated by the first electric motor is limited. Thus, the vehicle can be driven with high stability, without a change in the front-rear drive force distribution ratio.

Preferably, the thermal rating of the first electric motor is made higher than that of the second electric motor, so that the output of the second electric motor having the lower thermal rating is restricted or limited before that of the first electric motor is restricted or reduced. The restriction of the output of the second electric motor operated to drive the rear wheels assures a comparatively high degree of running stability of the vehicle.

The vehicle control apparatus according to a further preferred form of the first or second aspect of this invention is adapted to apply an assisting drive force to the automotive vehicle upon starting of the automotive vehicle on an uphill road surface, such that the assisting drive force corresponds to a gradient of the uphill road surface, the vehicle control apparatus including means for inhibiting the application of the assisting drive force to the automotive vehicle if a brake operating member for applying a brake to the automotive vehicle has been kept in its non-operated position for more than a predetermined time while the vehicle is stationary. A fact that the vehicle has been kept in its non-operated position for a relatively long time indicates that the vehicle operator does not has an intention of starting the vehicle. Since an assisting drive force is not applied to the vehicle in this case, the vehicle is permitted to be moved down in the reverse direction on the uphill road surface, so that the vehicle operator can recognize or perceive the gradient of the uphill road surface.

The vehicle control apparatus according to a further preferred form of the first or second aspect of this invention is adapted to apply an assisting drive force to the automotive vehicle on an uphill road surface, such that the assisting drive force corresponds to a gradient of the uphill road surface, the vehicle control apparatus including means for generating the assisting drive force such that the assisting drive force rapidly increases to a desired value for an initial period of the application of the assisting drive force, and slowly decreases from the desired value to zero for a terminal period of the application of the assisting drive force. According to this arrangement, the vehicle can be smoothly started on the uphill road surface, with the assisting drive force being rapidly increased to the desired value, so that the vehicle is suitably prevented from being moved down in the reverse direction on the uphill road surface upon starting of the vehicle. Further, the assisting drive force is slowly reduced after the vehicle has been started on the uphill road surface, so that the assisting drive force is removed without giving a discomfort to the vehicle operator.

In a further preferred form of the vehicle control apparatus according to the first or second aspect of the invention, the front drive force for driving the pair of front wheels and the rear drive force for driving the pair of rear wheels are controlled, during starting of the vehicle, on the basis of a gradient of a road surface on which the vehicle is started. In this arrangement, the front and rear drive force the sum of which is determined by the operator's desired vehicle drive force are controlled on the basis of the gradient of the road surface while the vehicle is being started.

The vehicle control apparatus according to the above preferred form of the invention is desirably adapted to determine the vehicle drive force on the basis of the gradient of the road surface such that a speed at which the vehicle is moved down in the reverse direction on an uphill road surface is lower than a predetermined threshold, as long as the road surface gradient is held within a predetermined range. In other words, the vehicle drive force is not increased after the road surface gradient exceeds the upper limit of the predetermined range, so that the vehicle operator can perceive the relatively large road surface gradient with high accuracy, since the vehicle is more or less moved down on the road surface in the reverse direction if the road surface gradient is excessively large.

The above-indicated predetermined threshold or upper limit of the speed of the backward movement of the vehicle on the uphill road surface is preferably several km/h, for instance, about 1–3 km/h. In this case, the vehicle is prevented from moving down on the uphill road surface at a high speed exceeding about 3 km/h, for example.

However, the vehicle drive force may be determined on the basis of the gradient of the road surface such that an acceleration value of the vehicle is moved down in the reverse direction on the uphill road surface is lower than a predetermined threshold, for instance, about 1.0 m/s$^2$.

The uphill-starting control means 350 may be modified to apply an assisting drive force to the vehicle before starting of the vehicle on the uphill road surface, so that the acceleration value of the vehicle during downward movement in the reverse direction on the uphill road surface is held lower than a predetermined small value, for example, about 1.0 m/s$^2$.

The application of the vehicle drive force corresponding to the road surface gradient may be terminated when the operator's desired vehicle drive force has exceeded a predetermined upper limit. In this arrangement, the vehicle drive force is increased with an increase in the road surface gradient, to prevent or reduce the downward reverse movement of the vehicle on the uphill road surface, as long as the operator's desired vehicle drive force is smaller than the upper limit.

The second object indicated above may be achieved according to a third aspect of this invention, which provides a vehicle control apparatus for controlling a four-wheel-drive automotive vehicle of a type which comprises a first drive power source for driving one of a pair of front wheels and a pair of rear wheels, and a second drive power source for driving the other of the pairs of front and rear wheels, the vehicle control apparatus comprising:

output-torque-range selecting means for selecting one of a plurality of output torque ranges in which the second drive power source is operated, on the basis of an operating state of the automotive vehicle; and second-power-source control means for operating the second drive power source such that an output torque of the second drive power source is held within the selected output torque range.

In the vehicle control apparatus constructed according to the third aspect of the present invention, the second drive power source is operated such that the output torque of the second drive power source is held within one of the output torque ranges which is selected by the output-torque-range selecting means on the basis of the operating state of the vehicle. This arrangement permits the automotive vehicle to be driven, with the second drive power source being operated to provide the required minimum drive force. Accordingly, there does not arise an overheating or a temperature rise of the second drive power source, which would limit the operation of the second drive power source. Thus, the present arrangement reduces the limitation in the operation of the second drive power source, making it possible to improve the drivability of the vehicle.

Preferably, the vehicle control apparatus according to the third aspect of the invention further comprises output-torque-range memory means for storing data representative of the plurality of output torque ranges.

In one preferred form of the vehicle control apparatus according to the third aspect of the invention, the plurality of output torque ranges include at least a first range of the output torque and a second range of the output torque whose upper limit is smaller than that of the first range. This arrangement permits the second drive power source to be operated in the second output torque range whose upper limit is comparatively small. Accordingly, an operation of the second drive power source for a long time to provide a comparatively large drive torque in the first range is avoided, thereby preventing an overheating or temperature rise of the second drive power source, so that the second drive power source can be maintained in an operable state. For instance, the two or more output torque ranges are defined in a two-dimensional coordinate system in which the operating speed of the second drive power source is taken along a first axis while the output torque of the second drive power source is taken along a second axis perpendicular to the first axis. The first output torque range has a larger maximum output torque value than that of the second output torque range. One of these first and second output torque ranges is selected depending upon the operating or running state of the vehicle, for driving the vehicle in the four-wheel drive mode with an operation of the second drive power source as well as an operation of the first drive power source, such that the output torque of the second drive power source is reduced as much as possible. The present arrangement prevents a continued operation of the second drive power source in the first output toque range in which the output torque is comparatively large, so that the second drive power source is kept operable.

In another preferred form of the vehicle control apparatus according to the third aspect of the invention, the second-power-source control means reduces the output torque of the second drive power source across a boundary of two adjacent ones of the plurality of output torque ranges, at a rate lower than a rate at which the second-power-source control means increases the output torque across the boundary. This arrangement prevents a rapid reduction of the drive force of the wheels driven by the second drive power source, assuring running stability of the vehicle. When the selected output torque range of the second drive power source is changed from the range whose maximum drive toque is relatively large to the range whose maximum drive torque is relatively small, the second-power-source control means reduces the output torque of the second drive power source at a rate lower than the rate at which the output torque is increased when the selected output torque range is changed from the range whose maximum drive torque is relatively small to the range whose maximum drive torque is relatively large. Accordingly, an abrupt reduction of the drive force of the wheels driven by the second drive power source is avoided, assuring a sufficiently high degree of running stability of the vehicle.

In a still further preferred form of the vehicle control apparatus according to the third aspect of the invention, the output-torque-range selecting means selects the above-indicated first range when the automotive vehicle is placed in any one of a starting state, a slipping state of its drive wheels and an understeering state, and selects the above-indicated second range when the automotive vehicle is placed in any other states. This arrangement permits the second drive power source to be operated to provide a sufficiently large drive torque when the vehicle is in a starting or understeering state or when the drive wheels are slipping on the road surface. For instance, the output-torque-range selecting means is adapted to select the first output torque range when the wheels driven by the first drive power source are slipping. The present form of the vehicle control apparatus is effective to permit smooth starting and acceleration of the vehicle, and prevent slipping of the wheels driven by the first drive power source and an understeering state of the vehicle.

In a yet further preferred form of the vehicle control apparatus according to the third aspect of this invention, the output-torque-range selecting means selects the above-indicated first range when a gradient of a road surface on which the automotive vehicle lies is larger than a predetermined threshold, and selects the above-indicated second range when the gradient is not larger than the predetermined threshold. This arrangement is effective to prevent or reduce the reverse downward movement of the vehicle on an uphill road surface, while maximizing the frequency of operation of the second drive power source in the second output torque range so as to provide the required minimum drive torque. Thus, the present arrangement assures improved efficiency of operation of the second drive power source and effectively prevents overheating of the second drive power source, particularly where the second drive power source is an electric motor.

In still another preferred form of the vehicle control apparatus according to the third aspect of this invention, the second-drive-source control means operates the second drive power source during starting of the automotive vehicle on an uphill road surface, such that the automotive vehicle is kept driven in a four-wheel driving mode with the pairs of front and rear wheels, until the running speed of the vehicle is raised to a higher value when the gradient of the uphill road surface is relatively large, than when the gradient is relatively small. This arrangement is effective to prevent or reduce the reverse downward movement of the vehicle on the uphill road surface when the vehicle is started on the uphill road surface.

Preferably, the vehicle control apparatus according to the third aspect of the invention further comprises (a) an antlock braking-pressure control means operable upon detecting of slipping of any one of the wheels on the basis of the peripheral speed of each wheel detected by a wheel speed sensor, for controlling a braking force to be applied to each slipping wheel such that a slip ratio of the slipping wheel is held within a predetermined range, and (b) vehicle-turning-stability control means operable during turning of the vehicle, for controlling a braking force or drive force of an appropriate one or ones of the wheels so as to prevent an understeering or oversteering state off the vehicle, such that a direction of running of the vehicle does not deviate from a nominal running path of the vehicle defined by a steering angle of a steering wheel of the vehicle, and wherein the second-power-source control means terminates or inhibits an operation of the second drive power source when said wheel speed sensor is defective, or when one of the anti-lock braking-pressure control means and the vehicle-turning-stability control means is in operation. This arrangement automatically changes the vehicle driving mode from the four-wheel driving mode to the two-wheel driving mode (in which the vehicle is driven with only the first drive power source), when the wheel speed sensor is defective or when the anti-lock braking-pressure control means or the vehicle-turning-stability control means is in operation. The present arrangement prevents a control interference between different controls including the control of the second drive power source by the second-power-source control means, the anti-lock braking-pressure control by the anti-lock braking-pressure control means and the vehicle-turning-stability control by the vehicle-turning-stability control means, so that the running stability and safety of the vehicle is improved.

Preferably, the vehicle control apparatus according to the third aspect of the invention further comprises low-temperature detecting means for detecting that an ambient temperature of the vehicle is lower than a predetermined lower limit below which a friction coefficient of a road surface on which the vehicle is running is expected to be lower than a predetermined lower limit, and wherein the second-power-source control means operates the second drive power source when the ambient temperature lower than the lower limit is detected by the low-temperature detecting means. In this arrangement, the second drive power source is automatically activated upon detection of the ambient temperature lower than the lower limit, so that the running safety of the vehicle is improved.

Preferably, the control apparatus according to the third aspect of this invention further comprises (a) vehicle-starting detecting means for determining whether the vehicle is in the process of being started, (b) wheel-slip detecting means for determining whether the wheels are slipping on a road surface, (c) understeering detecting means for determining, on the basis of a steering angle and a yaw rate of the vehicle, whether the vehicle is turning in an understeering state, (d) vehicle-turning detecting means for determining whether the vehicle is turning with the steering angle being larger than a predetermined threshold, (e) accelerator operation detecting means for determining whether a vehicle accelerating member is operated at a rate higher than a predetermined threshold, (f) high-load running detecting means for determining whether the vehicle is running under a relatively high load with the vehicle accelerating member being operated by more than a predetermined amount, and (g) vehicle-deceleration detecting means for determining whether the vehicle is in a decelerating state, and wherein the second-power-source control means determines that the vehicle is required to be driven in the four-wheel driving mode, and operates the second drive power source, when an affirmative decision is obtained by any one of the vehicle-starting detecting means, the wheel-slip detecting means, the understeering detecting means, the vehicle turning-detecting means, the accelerator operation detecting means, the high-load running detecting means and the vehicle-deceleration detecting means, the second-power-source control means determining that the vehicle is not required to be driven in the four-wheel driving mode when a negative decision is obtained by all of the above-indicated seven detecting means, and turning off the second drive power source a predetermined delay time after the moment of the determination that the vehicle is not required to be driven in the four-wheel driving mode. According to this arrangement, the second drive power source is automatically operated when the vehicle driving in the four-wheel driving mode is required, so that the vehicle can be driven with high stability. Further, the delay time provided after the determination that the four-wheel driving of the vehicle is not required and before the second drive power source is turned off is effective to prevent a on-off control hunting of the second drive power source.

Preferably, the vehicle control apparatus according to the above-arrangement further comprises at least one of (a) steering-angle sensor defect detecting means for detecting a defect of a steering angle sensor for detecting the steering angle of the steering wheel of the vehicle, and (b) a yaw-rate sensor defect detecting means for detecting a defect of a yaw rate sensor for detecting the yaw rate of the vehicle, and wherein the second-power-source control means does not operate the second drive power source if the defect of either one of the steering angle sensor and the yaw rate sensor is detected, even when the understeering detecting means has detected the understeering state of the vehicle. This arrangement prevents the vehicle driving in the four-wheel driving mode even if the understeering state of the vehicle is erroneously detected due to a defect of the steering angle sensor or yaw rate sensor.

BRIEF DESCRIPTION OF THE DRAWINGS

The above and other objects, features, advantages and technical and industrial significance of the present invention will be better understood by reading the following detailed description of presently preferred embodiments of the invention, when considered in connection with the accompanying drawings, in which.

DETAILED DESCRIPTION OF THE PREFERRED EMBODIMENTS

Figure 1:
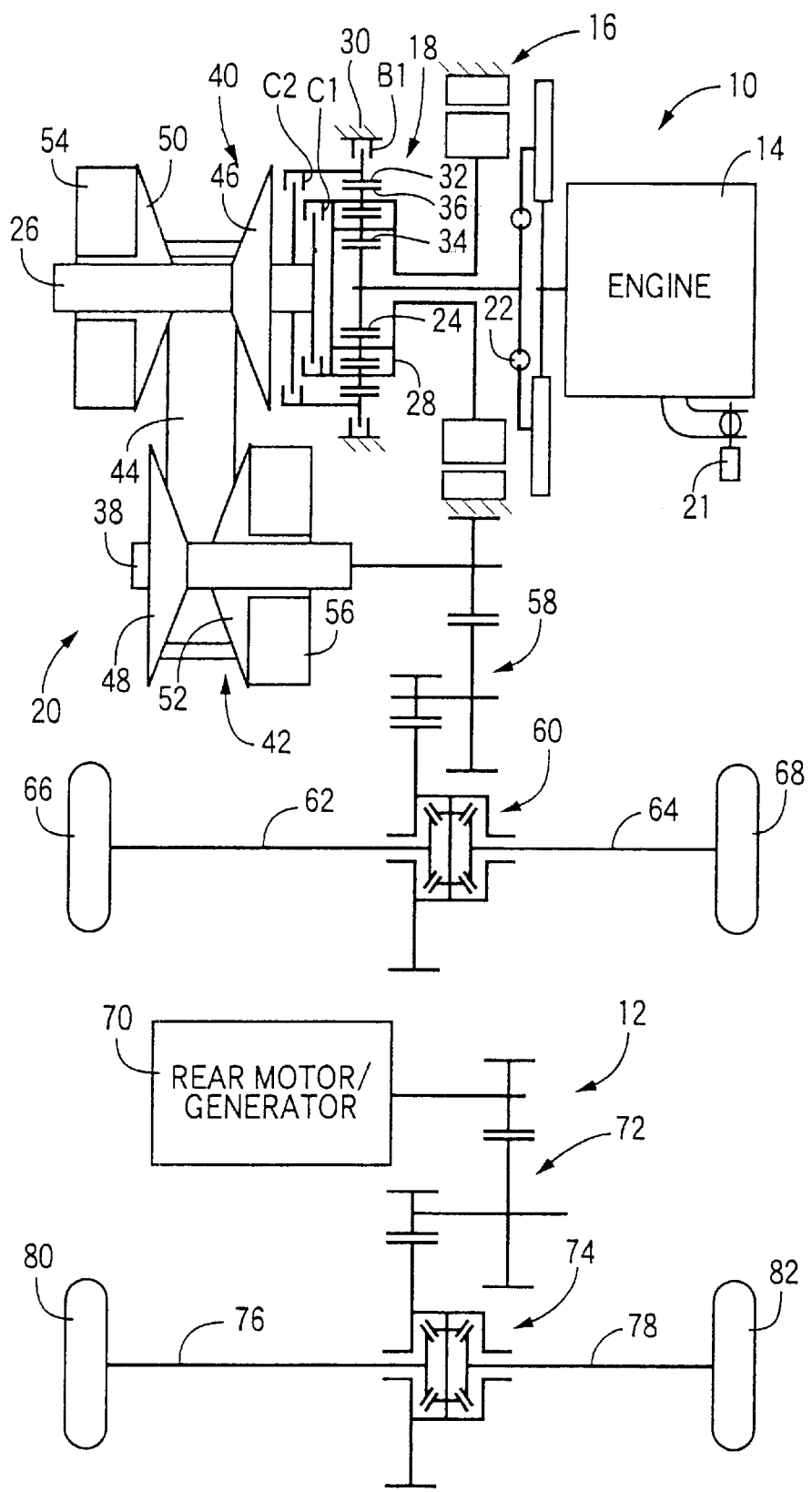
FIG. 1 is a schematic view showing an arrangement of a power transmitting system of a four-wheel-drive vehicle equipped with a control apparatus constructed according to one embodiment of this invention.

Referring first to the schematic view of FIG. 1, there is shown an arrangement of a power transmitting system in a four-wheel-drive hybrid vehicle having front and rear drive wheels, which is provided with a control apparatus according to the principle of this invention. This four-wheel-drive vehicle has a plurality of drive devices, namely, a first drive device in the form of a main drive device 10 including a first drive unit for driving the front drive wheels, and a second drive device in the form of an auxiliary drive device 12 including a second drive unit for driving the rear drive wheels.

The main drive device 10 includes an engine 14, a motor/generator 16 (hereinafter abbreviated as "M/G16"), a planetary gear device 18 of double-pinion type, and a continuously variable transmission 20, which are arranged coaxially with each other. The engine 14 is an internal combustion engine operated by combustion of an air-fuel mixture, and the M/G 16 selectively functions as an electric motor or an electric generator. The continuously variable transmission 20 is operated so as to continuously change its speed ratio. As indicated above, the engine 14 functions as the first or main drive unit, and is provided with a throttle actuator 21 for operating a throttle valve provided for controlling a quantity of intake air that is introduced into an intake pipe, more specifically, for controlling an angle of opening $\theta_{TH}$ of the throttle valve.

The planetary gear device 18 is a synthesizing/distributing mechanism constructed to mechanically synthesize forces or distributing a force, and includes three rotary elements that are rotatable about a common axis, that is, a first rotary element in the form of a sun gear 24, a second rotary element in the form of a carrier 28 and a third rotary element in the form of a ring gear 32. The sun gear 24 is connected to the engine 14 through a damper 22, and the carrier 28 is connected to an input shaft 26 of the continuously variable transmission 20 through a first clutch C1 and to an output shaft of the motor/generator. The ring gear 32 is connected to the input shaft 26 of the continuously variable transmission 20 through a second clutch C2 and to a stationary member in the form of a housing 30 through a brake B1. The carrier 28 supports a pair of pinions (planetary gears) 34, 36 which mesh with each other and with the sun gear 24 and the ring gear 32, such that the pinions 34, 36 are rotatable about their axes, respectively. Each of the first and second clutches C1, C2 and the brake B1 is a hydraulically operated frictional coupling device including a plurality of mutually superposed friction members in the form of friction plates and a hydraulic actuator for forcing the friction plates against each other and releasing the friction plates away from each other. The clutch or brake C1, C2, B1 is engaged when the friction plates are forced against each other, and is released when the friction plates are released away from each other.

The planetary gear device 18 cooperates with the is M/G 16 connected to the carrier 28, to constitute an electric torque converter (ETC) adapted to gradually increase the amount of electric energy to be generated by the M/G 16 during an operation of the engine 14, that is, during rotation of the sun gear 24, so as to gradually increase the drive torque of the M/G 16 or the reaction force of the carrier 28, for thereby gradually or smoothly increasing the rotating speed of the ring gear 32 so as to permit smooth starting of the vehicle. If the gear ratio of the planetary gear device 18, which is a ratio of the number of teeth of the un gear 24 to the number of teeth of the ring gear 32, is represented by ρ, there exists the following relationship among a torque value $T_R$ of the ring gear 32, a torque value $T_C$ of the carrier 28 and a torque value $T_S$ of the sun gear 24:

$$T_R:T_C:T_S=1/\rho:(1-\rho)/\rho:1$$

Where the gear ratio ρ is equal to 0.5 as in an ordinary planetary gear device, the torque of the engine 14 is boosted to 1/ρ, that is, two times, before it is transmitted to the continuously variable transmission. Thus, the vehicle is placed in a torque boosting mode (electric torque converter or ETC DRIVE mode) while the electric torque converter (ETC) is in operation.

The continuously variable transmission 20 has a pair of variable-diameter pulleys 40, 42 that are mounted on the input shaft 26 and an output shaft 38, respectively, and a transmission belt 44 connecting these pulleys 40, 42. As described below, the effective diameters of the pulleys 40, 42 can be changed continuously. The pulleys 40, 42 include respective stationary rotary members 46, 48 fixed on the input shaft 26 and an output shaft 38, respectively, and respective movable rotary members 50, 52 mounted on the input and output shafts 26, 38, respectively, such that the movable rotary members 50, 52 are axially movable relative to the respective input and output shafts 26, 38 and are rotated with these shafts 26, 38. The movable rotary members 50, 52 cooperate with the respective stationary rotary members 46, 48 to define V-grooves therebetween. The pulleys 40, 42 further include respective hydraulic cylinders 54, 56 adapted to axially move the respective movable rotary members 50, 52 relative to the input and output shafts 26, 38, for thereby changing the effective diameters of the variable-diameter pulleys 40, 42, so that a speed ratio γ of the continuously variable transmission 20 can be changed. The speed ratio γ is a ratio of the rotating speed of the input shaft 26 to the rotating speed of the output shaft 38.

The output torque of the continuously variable transmission 20 is transmitted from its output shaft 38 to a pair of front wheels 66, 68 through a speed reducing device 58, a differential gear device 60, and a pair of front axles 62, 64. In FIG. 1, a steering device for changing the steering angle of the front wheels 66, 68 is not shown. It will be understood that the power transmitting system of the present hybrid vehicle includes the planetary gear device 18, continuously variable transmission 20 and speed reducing device 58 and differential gear device 60.

The auxiliary drive device 12 includes a rear motor/generator 70 (hereinafter abbreviated as "RMG 70") that functions as the second or auxiliary drive unit. The output torque of the RMG 70 is transmitted to a pair of rear wheels 80, 82 through a speed reducing device 72, a differential gear device 74 and a pair of rear axles 76, 78.

Figure 2:
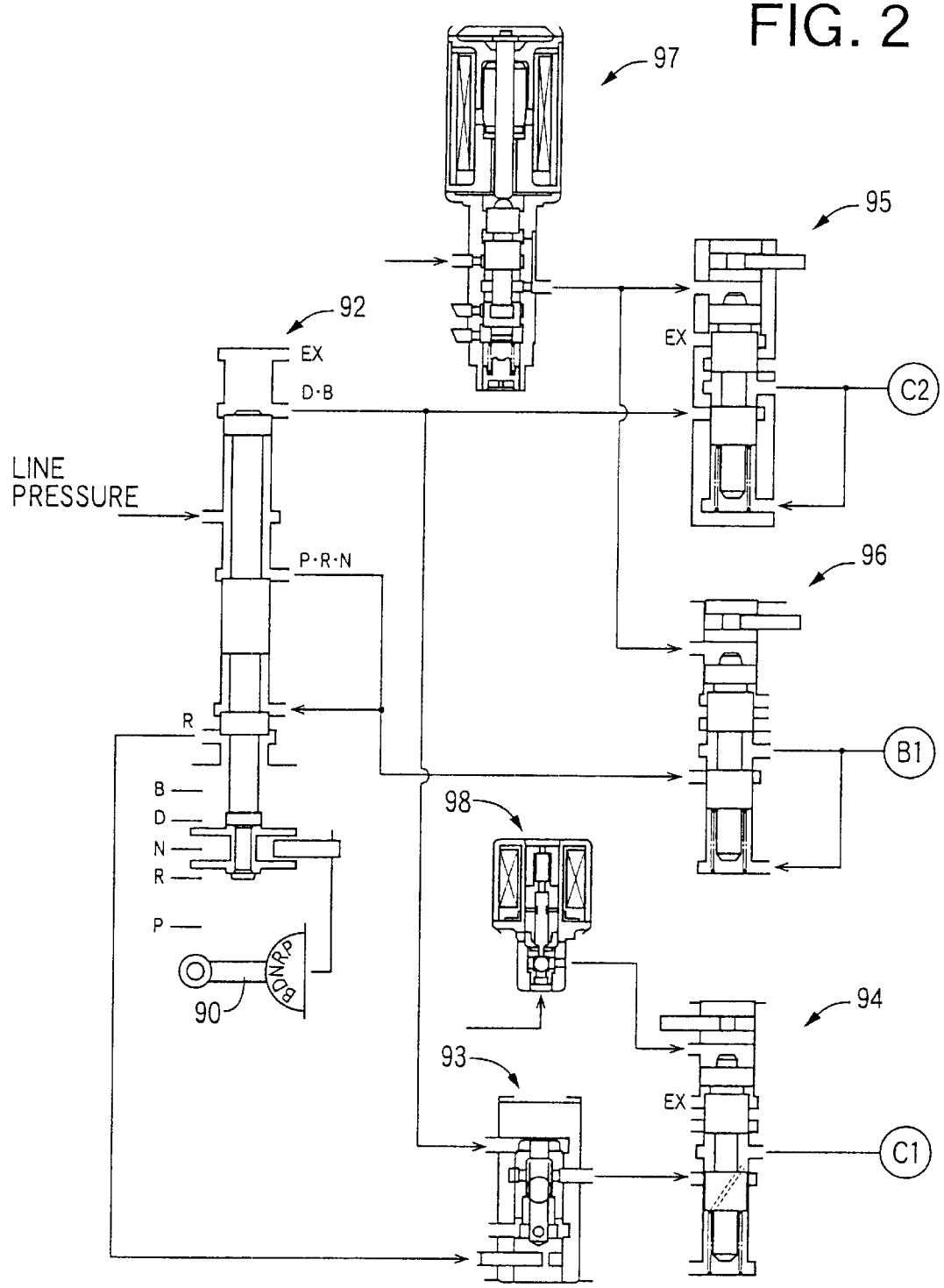
FIG. 2 is a view showing a portion of a hydraulic control device for controlling a planetary gear device used in the power transmitting system of FIG. 1.

Referring to FIG. 2, there is illustrated an arrangement of a hydraulic control device adapted to selectively establish various operating modes of the planetary gear device 18 of the main drive device 10. The hydraulic control device includes a manual valve 92 mechanically connected to a shift lever 90 which is operated by the vehicle operator to a selected one of five operating positions P, R, N, D and B. The manual valve 92 is adapted to receive a line pressure generated by an oil pump (not shown), and apply the line pressure to a selected one of a first pressure-regulating valve 94, a second pressure-regulating valve 95 and a third-pressure regulating valve 96, depending upon the currently selected position of the shift lever 90. Namely, when the shit lever 90 is placed in one of the operating positions D, B and R, the manual valve 92 applies the line pressure through a shuttle valve 93 to the first pressure-regulating valve 94 for regulating an engaging pressure of the first clutch C1. When the shift lever 90 is place in one of the operating positions D and B, the manual valve 92 applies the line pressure to the second pressure-regulating valve 95 for regulating an engaging pressure of the second clutch C2. When the shift lever 90 is placed in one of the operating positions N, P and R, the manual valve 92 applies the line pressure to the third pressure-regulating valve 96 for regulating an engaging pressure of the brake B1. The second and third pressure-regulating valves 95, 96 are adapted to receive a pilot pressure from a linear solenoid valve 97 controlled by a hybrid control device 104, for controlling the engaging pressures of the second clutch C2 and the brake B1. On the other hand, the first pressure-regulating valve 94 is adapted to receive a pilot pressure from a three-way valve in the form of a solenoid-operated shut-off valve 98 controlled by the hybrid control device 104, for controlling the engaging pressure of the first clutch C1. The duty cycle or ratio of the shut-off valve 98 is controlled by the hybrid control device 104.

Figure 3:
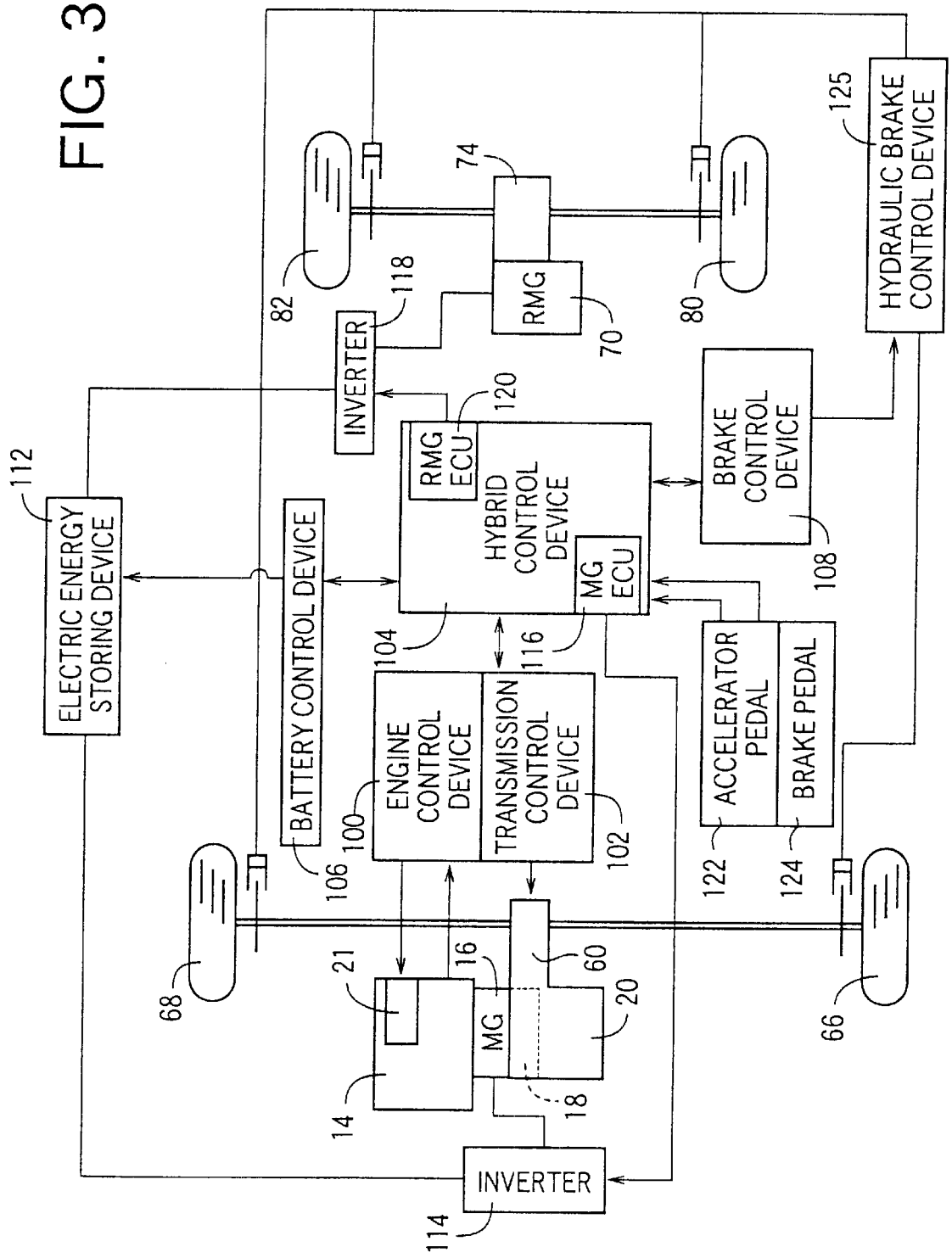
FIG. 3 is a view illustrating various control devices provided for the four-wheel-drive vehicle of FIG. 1.

Reference is now made to FIG. 3, there are illustrated various control devices of a control apparatus provided for the four-wheel-drive vehicle of FIG. 1. The vehicle control apparatus includes an engine control device 100, a transmission control device 102, the hybrid control device 104 indicated above, a battery control device 106 and a brake control device 108. Each of these control devices 100, 102, 104, 106, 108 is a so-called microcomputer incorporating a central processing unit (CPU), a random-access memory (RAM), a read-only memory (ROM), and an input/output interface. The CPU processes input signals according to control programs stored in the ROM while utilizing a temporary data storage function of the RAM, for performing various controls of the vehicle. The control devices 100–108 are capable of effecting data communications with each other, such that appropriate signals requested by one of the control devices are transmitted from another control device in response to a request received from the above-indicated one control device.

The engine control device 100 effects various controls of the engine 14, such as a fuel injection control for controlling a fuel injection valve so as to control the amount of fuel to be injected into the engine 14, an ignition timing control for controlling an igniter for controlling the ignition timing, and a traction control for controlling the throttle actuator 21 to temporarily reduce the output of the engine 14 so that the slipping tendency of the front drive wheels 66, 68 is reduced to enable the front drive wheels 66, 68 to have a sufficient road-surface gripping force, that is, to generate a sufficient vehicle traction force.

The transmission control device 102 is adapted to hold the tension of the transmission belt 44 at an optimum value and control the speed ratio γ of the continuously variable transmission 20. Described more specifically, the transmission control device 102 controls a pressure-regulating valve provided for adjusting the tension of the transmission belt 44, on the basis of the presently established speed ratio γ and the actual transmission torque of the transmission 20 (namely, the output torque of the engine 14 and the MG 16), and according to a predetermined relationship among the tension of the belt 44 and the speed ratio and transmission torque of the transmission 20. This relationship, which is stored in the ROM of the transmission control device 102, is formulated so as to optimize the belt tension. For controlling the speed ratio γ of the transmission 20, the transmission control device 102 determines a desired speed ratio value γ*, on the basis of the actual vehicle running speed V and the actual load on the engine 14 (as represented by the opening angle $θ_{TH}$ of the throttle valve or the operating amount $A_{cc}$ of an accelerator pedal 122), and according to a predetermined relationship among the desired speed ratio value γ* and the vehicle running speed V and engine load. This relationship, which is also stored in the ROM, is formulated to permit the engine 14 to operate according to a minimum fuel consumption curve or a maximum efficiency curve.

Figures 4, 5:
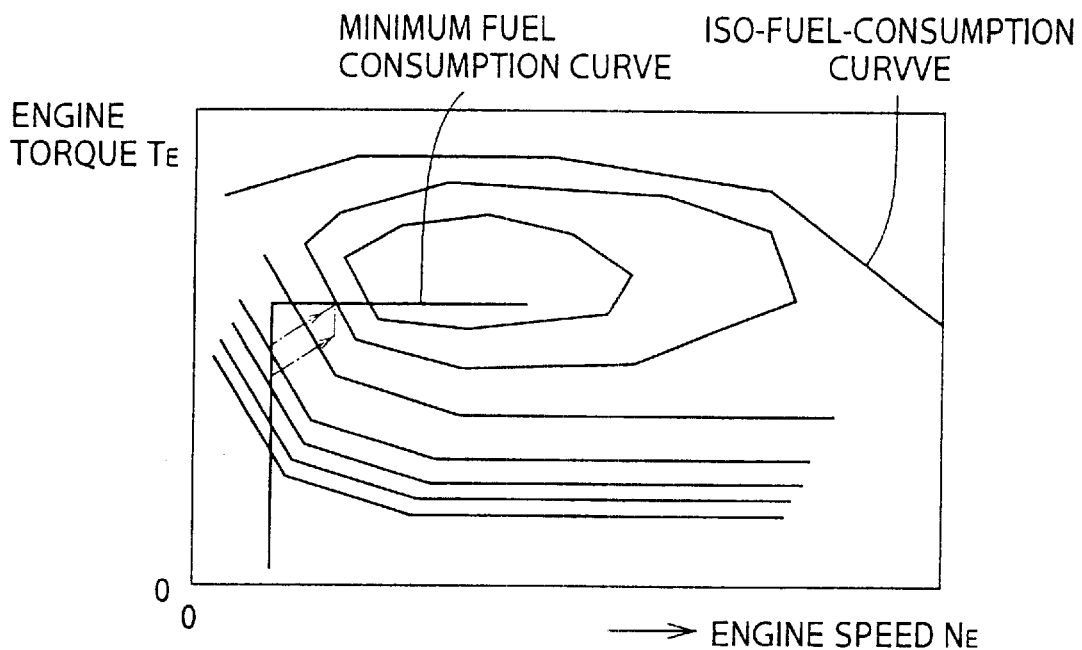
FIG. 4 is a graph showing maximum fuel economy lines for explaining operations of an engine control device and a transmission control device shown in FIG. 3.
FIG. 5 is a view showing various vehicle operating modes selected by a hybrid control device shown in FIG. 3.

For instance, the engine control device 100 and the transmission control device 102 control the throttle actuator 21, the fuel injection valve and the speed ratio γ of the continuously variable transmission 20, so that the engine 14 is operated such that the operating state of the engine 14 as represented by its output torque $T_E$ and speed $N_E$ follows the maximum fuel economy lines indicated in FIG. 4. Further, the engine control device 100 and the transmission control device 102 controls the throttle actuator 21 and the speed ratio y so as to change the output torque $T_E$ and speed $N_E$ of the engine 14 according to a control command received from the hybrid control device 104.

The hybrid control device 104 includes a first motor/generator control device 116 (MG ECU) for controlling an inverter 114, and a second motor/generator control device 120 (RMG ECU) for controlling an inverter 118. The inverter 114 is provided to control an electric current to be supplied from an electric energy storing device 112 such as a battery to the MG 16, or an electric current to be generated by the MG 16 to charge the electric energy storing device 112. On the other hand, the inverter 118 is provided to control an electric current to be supplied from the electric energy storing device 112 to the RMG 70 or an electric current to be generated by the RMG 70 to charge the electric energy storing device 112. The hybrid control device 104 selects one of a plurality of operating modes of the vehicle indicated in FIG. 5, on the basis of the selected operating position $P_{SH}$ of the shift lever 90, the operating amount $A_{CC}$ of the accelerator pedal 122 (opening angle θ of the throttle valve), the vehicle running speed V and an amount of electric energy SOC stored in the electric energy storing device 112. Further, the hybrid control device 104 selects a regenerative braking mode or an engine braking mode, on the basis of the operating amount $A_{CC}$ of the accelerator pedal 122 and an operating amount $B_F$ of a brake pedal 124. In the regenerative braking mode, the MG 16 or RMG 70 is operated as an electric generator by a kinetic energy of the running vehicle, to generate an electric energy and to apply a regenerative brake to the running vehicle. In the engine braking mode, the engine 14 is driven by the kinetic energy of the running vehicle so as to apply an engine brake to the running vehicle.

When the shift lever 90 is placed in the operating position B or D for starting the vehicle with a comparatively small load or while the vehicle is running at a constant speed, the hybrid control device 104 selects a FORWARD MOTOR DRIVE mode. This FORWARD MOTOR DRIVE mode is established by engaging the first clutch C1 and releasing the second clutch C2 and the brake B1. In this FORWARD MOTOR DRIVE mode, the vehicle is driven in the forward direction primarily by the MG 16. When the residual electric energy amount SOC stored in the electric energy storing device 112 is reduced below a predetermined lower limit or when the engine 14 is started for increasing the vehicle drive force while the vehicle is driven in the MOTOR DRIVE mode, the hybrid control device 104 selects an ETC DRIVE mode or a DIRECT ENGINE DRIVE mode, which will be described, so that the vehicle running is continued in the same state while the MG 16 or RMG 70 is driven by a kinetic energy of the vehicle so as to charge the electric energy storing device 112.

Figure 6:
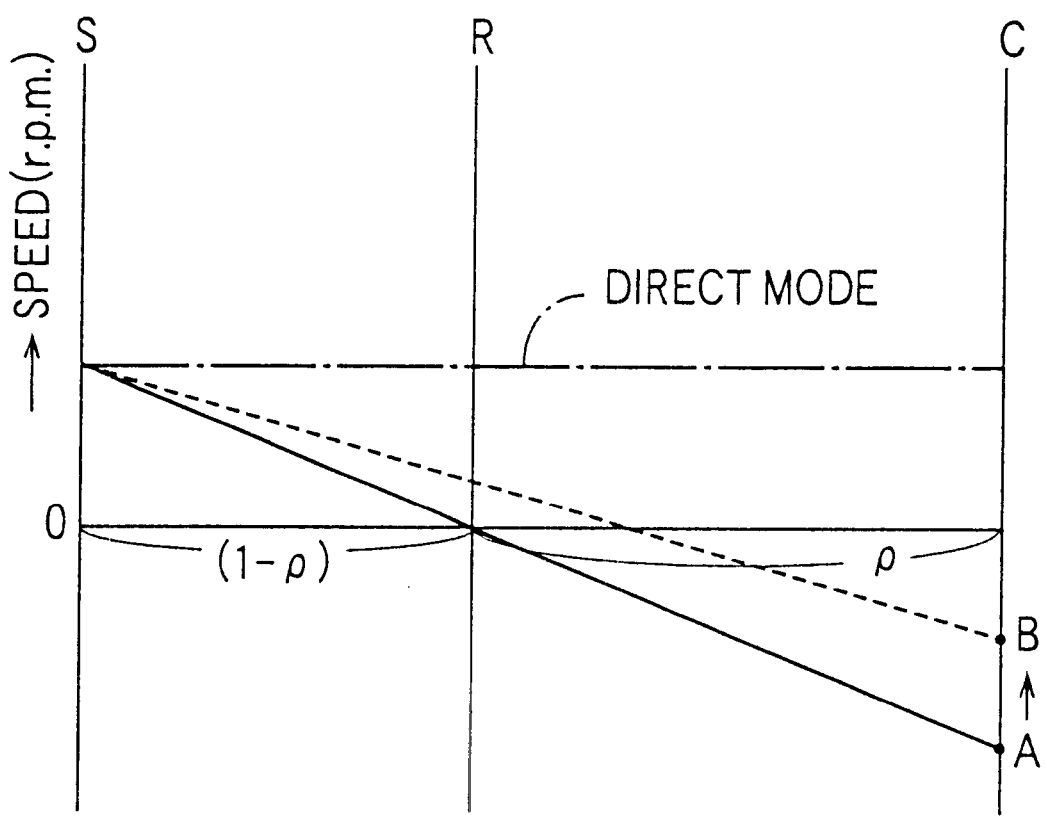
FIG. 6 is a collinear chart wherein axes S, R and C indicative of the respective speeds of sun gear, ring gear and carrier of the planetary gear device shown in FIG. 1 extend in the vertical direction, while an axis indicative of the speed ratio of the planetary gear device extends in the horizontal direction, the collinear chart showing the rotating speeds of the rotary elements of the planetary gear device in DIRECT mode and TC mode.

The DIRECT ENGINE DRIVE mode is selected while the vehicle is driven with an intermediate or a comparatively large load. The DIRECT ENGINE mode is established by engaging the first and second clutches C1 and C2 and releasing the brake B1. In this DIRECT ENGINE DRIVE mode, the rotary elements of the planetary gear device 18 are rotated as a unit, and the vehicle is driven primarily by the engine 14, or by the engine 14 and the MG 16, or primarily by the engine 14 while the MG 16 is driven to charge the electric energy storing device 112. In the DIRECT ENGINE DRIVE mode, the rotating speed of the sun gear 24 (namely, the rotating speed $N_E$ of the engine 14), the rotating speed of the carrier 28 (namely, the rotating speed $N_{MG}$ of the MG 16) and the rotating speed of the ring gear 32 (namely, the rotating speed $N_{IN}$ of the input shaft 26 of the continuously variable transmission 20) are equal to each other. In this case, the speeds of the sun gear 24, carrier 28 and ring gear 32 are indicated by a one-dot chain line in a two-dimensional collinear chart of FIG. 6, wherein the speeds of the sun gear 24, carrier 28 and ring gear 32 are represented by respective three vertical axes S, R and C, while the speed ratio of the planetary gear device 18 is represented by a horizontal axis. In the collinear chart of FIG. 6, a distance between the vertical axes S and C corresponds to "1", and a distance between the axes R and C corresponds to the gear ratio ρ of the planetary gear deice 18 of double-pinion type.

When the vehicle is started, the ETC DRIVE mode (electric torque converter mode or torque boosting mode) is established by engaging the second clutch C2 and releasing the first clutch C1 and the brake B1. In this ETC DRIVE mode, the stationary vehicle can be smoothly started with the engine 14 held at a suitable speed, by gradually increasing the amount of electric energy to be generated by the MG 16, that is, the reaction force of the MG 16 (drive torque for operating the MG 16). Where the vehicle and the MG 16 are driven by the engine 14 as in this case, the output torque of the engine 14 is boosted 1/ρ times, for instance, two times where ρ=0.5, and the thus boosted engine torque is transmitted to the continuously variable transmission 14. Where the speed $N_{MG}$ of the MG 16 is represented by point A in the collinear chart of FIG. 6 (namely, a speed of rotation in the reverse direction for generating an electric energy), the input shaft speed $N_{IN}$ of the continuously variable transmission 20 is zero, so that the vehicle is stationary. When the amount of electric energy generated by the MG 16 is increased with a result of an increase of its speed $N_{MG}$ to a value represented by point B, as indicated by broken line in the collinear chart, the input shaft speed $N_{IN}$ of the transmission 20 is accordingly increased, so that the vehicle is started.

When the shift lever 90 is placed in the operating position N or P, the hybrid control device 104 selects a NEUTRAL mode 1 or 2. In the NEUTRAL MODE 1 or 2, the first and second clutches C1, C2 and the brake B1 are released, and the power transmitting path is disconnected in the planetary gear device 18. When the electric energy amount SOC stored in the electric energy storing device 112 is reduced below a predetermined lower limit while the NEUTRAL MODE 1 or 2 is established, a CHARGING & ENGINE-START mode is established by engaging the brake B1. The CHARGING & ENGINE-START mode is established to start the engine 14 with the MG 16. When the shift lever 90 is placed in the operating position R (reverse drive position), for running the vehicle in the reverse direction with a comparatively small load, for example, the hybrid control device 104 selects the REVERSE MOTOR DRIVE mode, and this mode is established by engaging the first clutch C1 and releasing the second clutch C2 and the brake B1, so that the vehicle is driven in the reverse direction primarily by the MG 16. When the vehicle is driven in the reverse direction with an intermediate or comparatively large load, the hybrid control device 104 selects a FRICTION DRIVE mode, and this mode is established by engaging the first clutch C1 and releasing the second clutch C2 while holding the brake B1 in a slipping state. In the FRICTION DRIVE mode, the output torque of the engine 14 is added to the output torque of the MG 16.

Further, the hybrid control device 104 is adapted to effect a high-μ-road-surface assisting control or a low-μ-road-surface assisting control, as needed. In the high-μ-road-surface assisting control, the RMG 70 is operated to drive the rear wheels 80, 82 to temporarily increase the total vehicle drive force during starting or rapid acceleration of the vehicle by the front drive wheels 66, 68, with a suitable distribution of the front and rear drive forces generated by the respective pairs of front and rear wheels 66, 68, 80, 82. In the low-μ-road-surface assisting control, the RMG 70 is operated to drive the rear wheels 80, 82 while at the same time the front drive force generated by the front wheels 6, 68 is reduced by reducing the speed ratio γ of the continuously variable transmission 20, for instance, for facilitating the starting of the vehicle on a road surface having a relatively low friction coefficient μ such as a frozen or snow-covered road surface.

The battery control device 106 permits the electric energy storing device 112 (e.g., battery or condenser) to be charged with an electric energy generated by the MG 16 or RMG 70 when the residual electric energy amount SOC stored in the electric energy storing device 112 is reduced below the predetermined lower limit $SOC_D$, and inhibits the charting of the electric energy storing device 112 with the electric energy generated by the MG 16 or RMG 70 when the residual electric energy amount SOC exceeds a predetermined lower limit $SOC_U$. Further, the battery control device 106 inhibits the charging of the electric energy storing device 112 when the expected electric power Pb (an amount of energy expected to be consumed+an amount of energy expected to be stored by charging) exceeds an upper limit $W_{IN}$ of electric power or energy input, and inhibits the discharging of the electric energy storing device 112 when the expected electric power Pb becomes smaller than an upper limit $W_{OUT}$ of electric power or energy output. These upper limits $W_{IN}$ and $W_{OUT}$ change as a function of the temperature $T_B$ of the storing device 112.

The brake control device 108 is adapted to effect a traction control (TRC control), an anti-lock control (ABS control) and a vehicle running stability control (VSC control), for controlling wheels brakes 66WB, 68WB, 80WB and 82WB for braking the respective wheels 66, 68,80, 82, as needed, through a hydraulic brake control device 125, for the purpose of improving the running stability of the vehicle or increasing the vehicle traction force, during starting, braking and turning of the vehicle on a road surface having a low friction coefficient $\mu$. For effecting those controls, the brake control device 108 calculates, on the basis of the output signals of wheel speed sensors provided for the wheels 66, 68, 80, 82, peripheral speeds of the wheels 66, 68, 80, 82 (vehicle running speed as calculated on the basis of the rotating speeds of the wheels), namely, a front-right-wheel peripheral speed $V_{FR}$, a front-left-wheel peripheral speed $V_{FL}$, a rear-right-wheel speed $V_{RR}$, and a rear-left-wheel speed $V_{RL}$, and an average front-wheel peripheral speed $V_F=(V_{FR}+V_{FL})/2$ and an average rear-wheel peripheral speed $V_R=(V_{RR}+V_{RL})/2$. Further, the brake control device 108 determines a lowest one of the wheel peripheral speeds ($V_{FR}$, $V_{FL}$, $V_{RR}$, $V_{RL}$) as the vehicle speed V, and calculates slip speeds $\Delta V$ of the front drive wheels 66, 68 as a difference between the peripheral speeds $V_{FR}$, $V_{FL}$ and the peripheral speeds of the rear wheels 80, 82 when the rear wheels 80, 82 are not driven by the RMG 70. The TRC control is initiated when the slip speed $\Delta V$ of either one of the front drive wheels 66, 68 exceeds a TRC initiating threshold $\Delta V1$, that is, when at least one of the front drive wheels 66, 68 has an excessive slipping tendency during starting or running of the vehicle with the front drive wheels 66, 68. In the TRC control, the output torque of the engine 14 is reduced by controlling the throttle actuator 21, while at the same time at least one of the wheel brakes 66WB, 68WB for the front wheels 66, 68 is activated, to reduce the drive force generated by the excessively slipping front drive wheel or wheels 66, 68, so that a slip ratio $RS=(\Delta V/V_R) \times 100\%$ of each front drive wheel 66, 68 is reduced to within a desired amount $R_{S1}$.

The ABS control is effected as needed, during brake application to the vehicle, to control the braking force generated by each of the wheel brakes 66WB, 68WB, 80WB, 82WB for the wheels 66, 68, 80, 82, so that the slip ratio of each wheel under braking is held within an optimum range, for assuring high running stability of the vehicle. During turning of the vehicle, the brake control device 108 determines whether the vehicle has an excessive oversteering or understeering tendency (spinning or drift-out tendency), on the basis of the steering angle of the vehicle detected by a steering angle sensor (not show), the yaw rate of the vehicle detected by a yaw rate sensor (not shown), and the longitudinal and lateral acceleration values of the vehicle detected by a 2-axes acceleration sensor (not shown). The VSC control is effected to eliminate the detected oversteering or understeering tendency, by activating appropriate one or ones of the wheel brakes 66WB, 68WB, 80WB, 82WB and controlling the throttle actuator 21.

Figure 7:
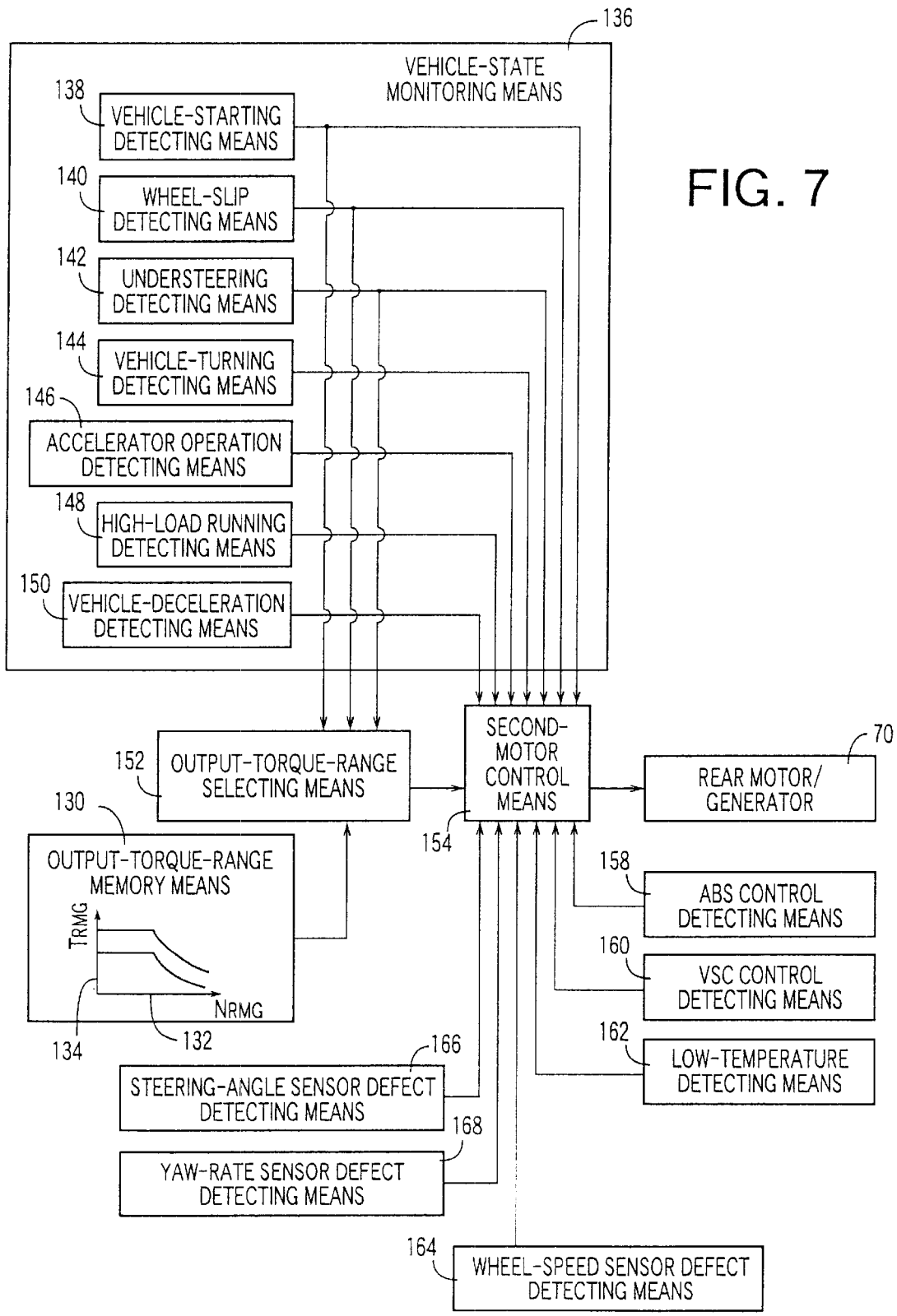
FIG. 7 is a block diagram indicating functional means of the hybrid control device shown in FIG. 3.

Referring next to the block diagram of FIG. 7, there are illustrated functional means of the vehicle control apparatus including the hybrid control device 104. The vehicle control apparatus includes output-torque-range memory means 130, vehicle-state monitoring means 136, output-torque-range selecting means 152, second-motor control means 154, ABS control determining means 158, VSC control determining means 160, low-temperature detecting means 162, wheel-speed sensor defect detecting means 164, steering-angle sensor defect detecting means 166 and yaw-rate sensor defect detecting means 168.

The output-torque-range memory means 130, which is provided in the RAM of the hybrid control device 104, for instance, stores data maps representative of a plurality of output torque ranges of the RMG 70 used for limiting the output torque of the RMG 70. The output torque ranges represented by the stored data maps include two output torque ranges indicated in the graph of FIG. 8, by way of example, in a two-dimensional coordinate system wherein the speed $N_{RMG}$ of the RMG 70 is taken along a speed axis 132 while the output torque $T_{RMG}$ of the RMG 70 is taken along an output-torque axis 134. The two torque ranges consist of a first output torque range whose upper limit is represented by a line A1, and a second output torque range whose upper limit is represented by a line A2 and is smaller than the upper limit of the first output torque range. Thus, the first output torque range is defined by the lines A1 and A2, and the axis 134 while the second output torque range is defined by the line A2 and the axes 132, 134. The upper limit of the first output torque range represents the maximum rating of the RMG 70 in a relatively short time (e.g., five minutes), and the upper limit of the second output torque range represents the maximum rating of the RMG 70 in a relatively long time (e.g., 30 minutes).

The vehicle-state monitoring means 136 includes vehicle-starting detecting means 138, wheel-slip detecting means 140, understeering detecting means 142, vehicle-turning detecting means 144, accelerator operation detecting means 146, high-load running detecting means 148, and vehicle-deceleration detecting means 150. The vehicle-starting detecting means 138 is adapted to determine whether the vehicle is in the process of being started. This determination is effected on the basis of the presently selected operating position of the shift lever 90, the angle of opening $\theta$ of the throttle valve, vehicle running speed V, etc. The vehicle-slip detecting means 140 is adapted to determine whether the wheels 66, 68, 80, 82, particularly the main drive wheels in the form of the front wheels 66, 68 are slipping. This determination is effected on the basis of the front-right-wheel peripheral speed $V_{FR}$, the front-left-wheel peripheral speed $V_{FL}$, the rear-right-wheel speed $V_{RR}$, and the rear-left-wheel speed $V_{RL}$.

The understeering detecting means 142 is adapted to determine whether the vehicle is turning in an understeering state. This determination is effected on the basis of the detected steering angle and yaw rate of the vehicle. The vehicle-turning detecting means 144 is adapted to determine whether the vehicle is turning. This determination is effected by determining whether the steering angle of the vehicle is larger than a predetermined threshold. The accelerator operation detecting means 146 is adapted to determine whether the accelerator pedal 122 is in operation. This determination is effected by determining whether the rate of increase $\theta d/dt$ of the angle of opening $\theta$ of the throttle valve, that is, the operating speed of the accelerator pedal 122 is higher than a predetermined threshold. The high-load running detecting means 148 is adapted to determine whether the vehicle is running under a relatively high load. This determination is effected by determining whether the angle of opening $\theta$ of the throttle valve is larger than a predetermined threshold. The vehicle-deceleration detecting means 150 is adapted to determine whether the vehicle is in a decelerating state without a brake application. This determination is effected on the basis of the opening angle θ of the throttle valve and the vehicle running speed V. Thus, the vehicle-state monitoring means 136 is capable of detecting the various running states of the vehicle, namely, the starting state, wheel slipping state, understeering state, turning state, accelerating state, high-load running state and decelerating state.

The output-torque-range selecting means 152 is adapted to select one of the output torque ranges of the RMG 70 stored in the output-torque-range memory means 130, depending upon whether the vehicle is in a starting state, a wheel slipping state or an understeering state. Described more specifically, the output-torque-range selecting means 152 selects the first output torque range whose upper limit is comparatively higher, when the vehicle-state monitoring means 136 has detected that the vehicle is in the process of being started, that the front wheels 66, 68 driven by the engine 14 are slipping, or that the vehicle is in an understeering state. When the vehicle-state monitoring means 136 has detected that the vehicle is in a turning state, an accelerating state, a high-load running state or a decelerating state, the output-torque-range selecting means 152 selects the second output torque range. Thus, the output-torque-range selecting means 152 selects one of the two output torque ranges. of the RMG 70 in order to control the output torque of the RMG 70 depending upon the running state of the vehicle, with the four wheels 66, 68, 80, 82.

The second-motor control means 154 activates the RMG 70 such that the output torque of the RMG 70 is held within the output torque range selected by the output-torque-range selecting means 152. In principle, the second-motor control means 154 controls the RMG 70 within the selected output torque range so that the rear wheels 80, 82 are driven by the RMG 70 with the drive force which is determined to meet the ratios of distribution of the static and dynamic loads of the rear wheels 80, 82 to the front wheels 66, 68. The RMG 70 is controlled by the second-motor control means 154 so that the output torque of the RMG 70 is held within the selected output torque range, namely, does not exceed the upper limit of the selected range. As described above, the first output torque range is selected by the output-torque-range selecting means 152 while the vehicle is in a starting, wheel slipping or understeering state. In this state, the rear wheels 80, 82 are driven by the RMG 70 with a relatively large drive force, to provide a relatively high four-wheel driving effect on the running stability of the vehicle. While the vehicle is in a turning, accelerating, high-load running or decelerating state in which the second output torque range is selected by the output-torque-range selecting means 152, on the other hand, the rear wheels 80, 82 are driven by the RIM 70 with a relatively small drive force, to maintain a four-wheel driving effect for a relatively long time.

The second-motor control means 154 determines that the four-wheel driving of the vehicle (namely, the operation of the RMG 70) is unnecessary, when output signal of the vehicle-state monitoring means 136 indicates that the vehicle is not in any one of the above-indicated states, namely, starting state, slipping state of the front wheels 66, 8, understeering state, turning state, accelerating state, high-load running state and decelerating state. In this case, the second-motor control means 154 turns off the RMG 70 a predetermined delay time after the moment of determination that the four-wheel driving is unnecessary. The delay time is provided in order to prevent control hunting of the RMG 70.

When the output torque range of the RMG 70 selected by the output-torque-range selecting means 152 is changed from the first output torque range (whose upper limit is comparatively large) to the second output torque range (whose upper limit is comparatively small), the second-motor control means 154 reduces the output torque of the RMG 70 at a rate lower than the rate at which the output torque is increased when the selected output torque range is changed from the second output torque range to the first output torque range. That is, the second-motor control means 154 reduces the output torque of the RMG 70 across a boundary of the first and second output torque ranges, at a rate lower than a rate at which the second-motor control means 154 increases the output torque across the boundary.

The ABS control detecting means 158 is adapted determine that the hydraulic brake control device 125 is in an anti-lock braking pressure control mode under the control of the brake control device 108. In the anti-lock braking pressure control mode, the braking force applied to each slipping wheel during an operation of the brake pedal 124 is controlled on the basis of the output of the wheel speed sensors such that the slip ratio of each wheel is held within a predetermined optimum range. The VSC control detecting means 160 is adapted to determine whether the hydraulic brake control device 125 is in a vehicle turning stability control mode under the control of the brake control device 108. In the vehicle turning stability control mode, a suitable braking force is applied to an appropriate one or ones of the left or right wheels without an operation of the brake pedal 124, for controlling the drive forces of the four wheels so as to prevent an excessively understeering or oversteering state of the vehicle, namely, to prevent a deviation of the running direction of the vehicle from the nominal running or turning path defined by the steering angle of the vehicle, while the vehicle is turning.

The wheel-speed-sensor defect detecting means 164 is adapted to detect a defect of the wheel speed sensors, by comparing the front-right-wheel peripheral speed $V_{FR}$, front-left-wheel peripheral speed $V_{FL}$, rear-right-wheel speed $V_{RR}$ and rear-left-wheel speed $V_{RL}$ with each other. The low-temperature detecting means 162 is adapted to determine whether the ambient temperature as detected by a suitable temperature sensor is lowered below a predetermined lower limit below which the road surface is expected to be frozen, for instance. The steering-angle-sensor defect detecting means 166 is adapted to detect a defect of the steering angle sensor provided to detect the steering angle of the steering wheel. The output signal of this steering angle sensor is used for the vehicle turning stability control (VSC). The yaw-rate-sensor defect detecting means 168 is adapted to detect a defect of the yaw rate sensor whose output signal is also used for the vehicle turning stability control.

The second-motor control means 154 is further adapted to inhibit or terminate the operation of the RMG 70 even while the predetermined condition for driving the vehicle in the four-wheel driving mode is satisfied, if the wheel-speed sensor defect detecting means 164 has detected a defect of any wheel speed sensor, if the ABS control detecting means 158 has detected that the vehicle is in the anti-lock braking pressure control mode, or if the VSC control detecting means 160 has detected that the vehicle is in the vehicle turning stability control mode. The second-motor control means 154 is further adapted to activate the RMG 70 for driving the vehicle in the four-wheel driving mode, if the low-temperature detecting means 162 has detected that the ambient temperature is lower than the predetermined lower limit. The second-motor control means 154 is also adapted to inhibit the operation of the RMG 70 and inhibit the vehicle running in the four-wheel driving mode, even if the understeering detecting means 142 has detected an understeering state of the vehicle, if the steering-angle-sensor defect detecting means 166 has detected a defect of the steering angle sensor, or if the yaw-rate-sensor defect defecting means 168 has detected a defect of the yaw rate sensor.

Figure 9:
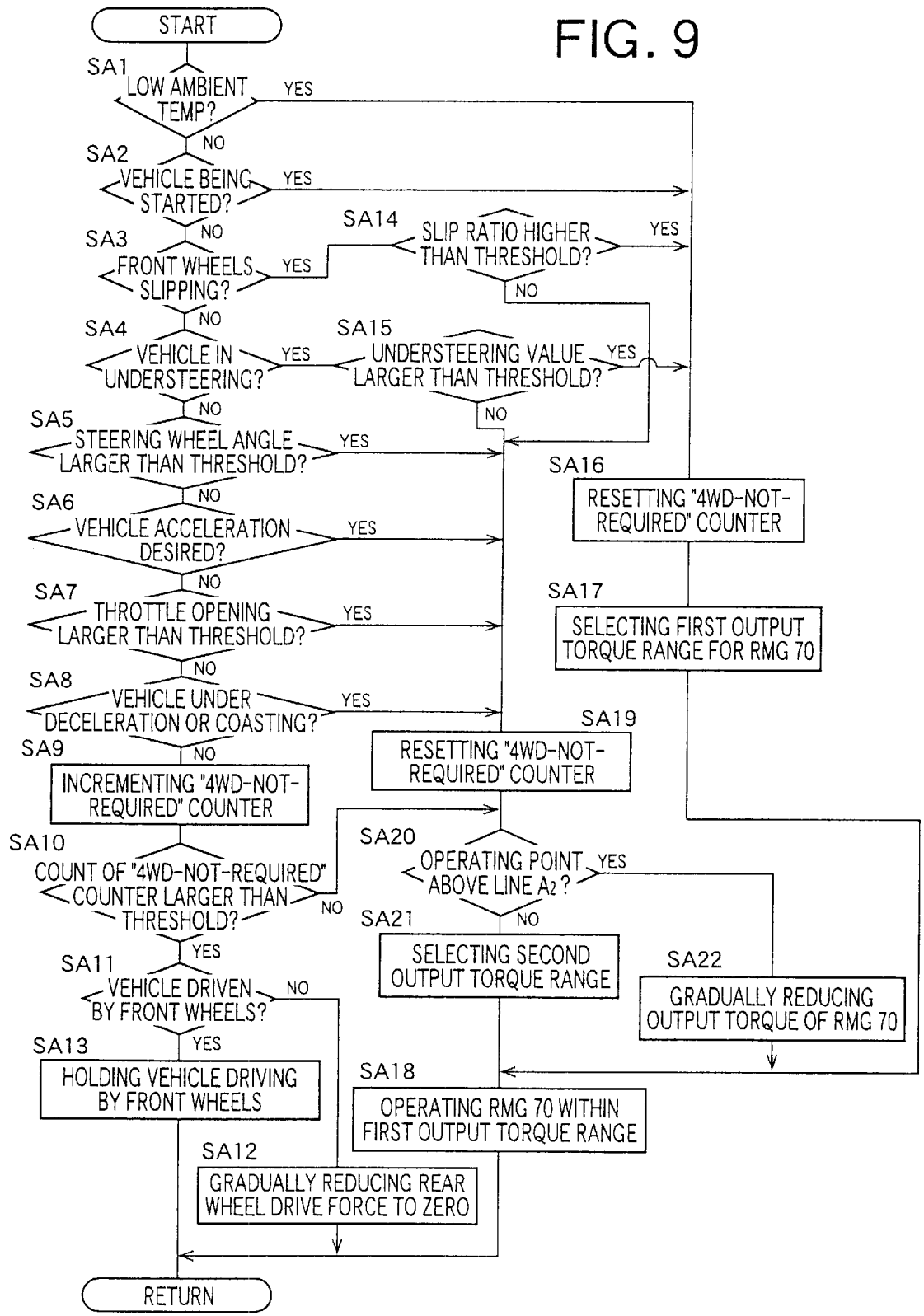
FIG. 9 is a flow chart illustrating a control routine executed by the hybrid control device of FIG. 3 to select the output torque range of the rear motor/generator.
Figure 10:
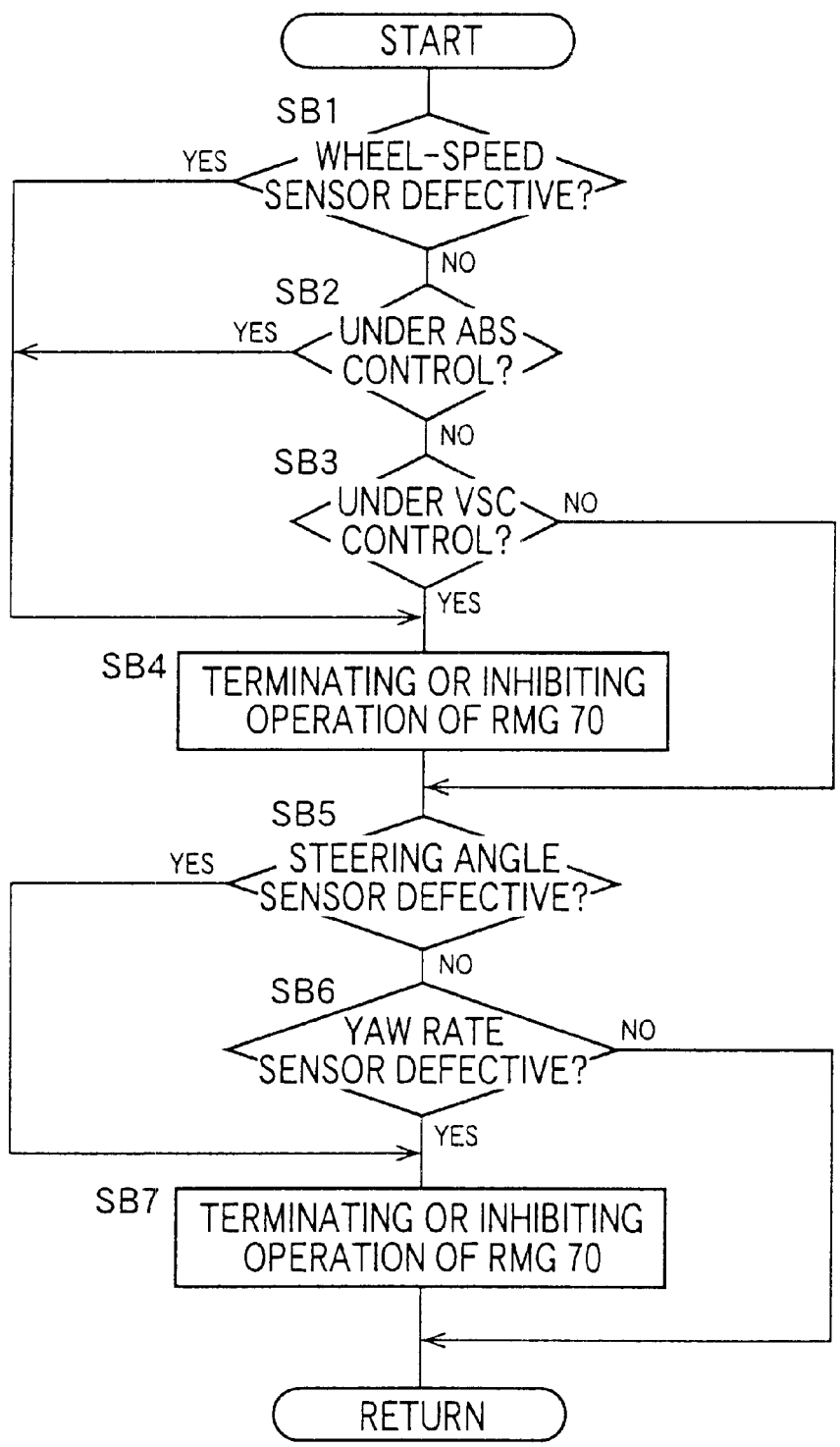
FIG. 10 is a flow chart illustrating a control routine executed by the hybrid control device of FIG. 3 to inhibit a 4-wheel-driving of the vehicle.

The flow charts of FIGS. 9 and 10 show the control operation of the hybrid control device 104. Described more specifically, the flow chart of FIG. 9 illustrates a control routine for switching the output torque range of the RMG 70 during running of the vehicle in the four-wheel driving mode, while the flow chart of FIG. 10 illustrates a control routine for terminating or inhibiting the four-wheel driving of the vehicle when a defect of any wheel speed sensor or a defect of the steering angle sensor or yaw rate sensor has been detected, or when any control interference has been detected.

Figure 8:
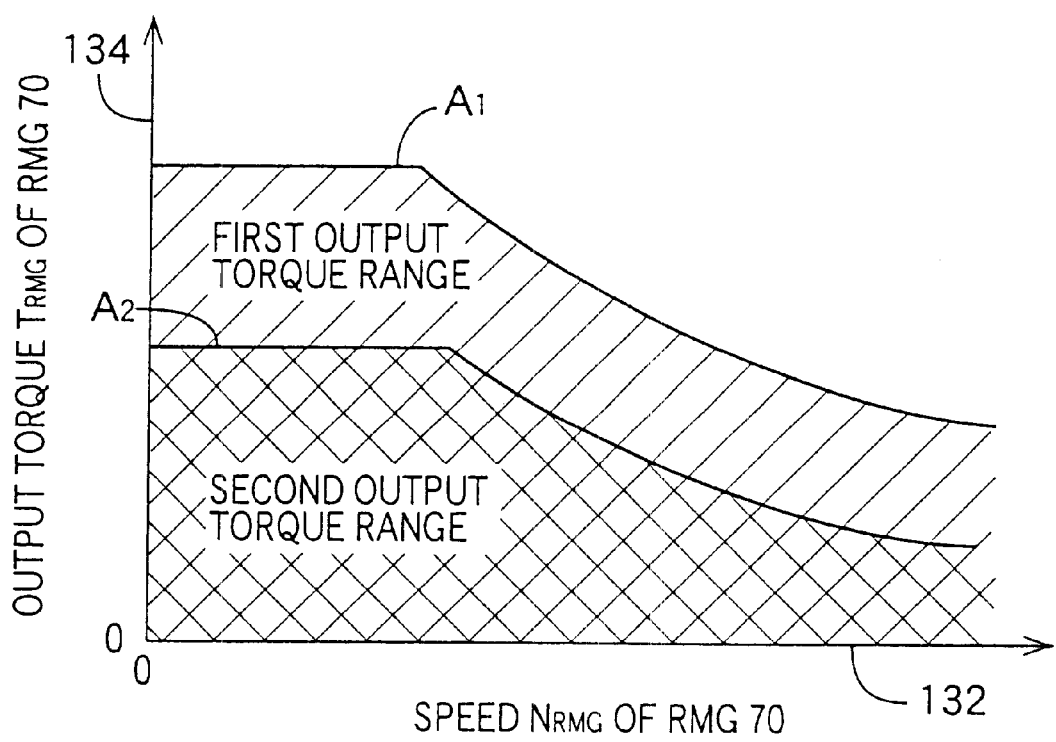
FIG. 8 is a view showing two output torque ranges of a rear motor/generator stored in output-torque-range memory means.

The control routine of FIG. 9 is initiated with step SA1 corresponding to the low-temperature detecting means 162, to determine whether the detected ambient temperature is lower than the predetermined lower limit below which the friction coefficient of the road surface is excessively low due to freezing, for instance. If an affirmative decision (YES) is obtained in step SA1, the control flow goes to step SA16 in which a 4WD-NOT-REQUIRED counter is reset to "0", and then goes to step SA17 corresponding to the output-torque-range selecting means 152, to select the first output torque range whose upper limit is represented by the line A1 (FIG. 8). Step SA17 is followed by step SA18 corresponding to the second-motor control means 154, in which the RMG 70 is operated within the selected first output torque range, to drive the vehicle in the four-wheel driving mode.

If a negative decision (NO) is obtained in step SA1, the control flow goes to step SA2 corresponding to the vehicle-starting detecting means 138, to determine whether the vehicle is in a starting state. This determination is effected on the basis of the operating position of the shift lever 90, the opening angle θ of the throttle valve and the vehicle speed V. If an affirmative decision (YES) is obtained in step SA2, the control flow goes to steps SA16, SA17 and SA18 described above, for driving the vehicle in the four-wheel driving mode with the RMG 70 being operated within the first output torque range. If a negative decision (NO) is obtained in step SA2, the control flow goes to step SA3 corresponding to the wheel-slip detecting means 140, to determine whether the main drive wheels in the form of the front wheels 66, 68 being driven by the engine 14 are slipping or not. If an affirmative decision (YES) is obtained in step SA3, the control flow goes to step SA14 to determine whether the slip ratio of the front wheels 66, 68 is higher than a predetermined threshold. This threshold is determined so that the second output torque range is selected when the slip ratio is lower than the threshold. If an affirmative decision (YES) is obtained in step SA14, the control flow goes to steps SA16–SA18 for driving the vehicle in the four-wheel driving mode with the RMG 70 being operated within the first output torque range. If a negative decision (NO) is obtained in step SA14, the control flow goes to step SA19 to reset the 4WD-NOT-REQUIRED counter to "0", and to step SA20 to determine whether the operating point of the RMG 70 represented by its output torque and speed is located above the line A2 indicated in FIG. 8, which represents the upper limit of the second output torque range. If a negative decision (NO) is obtained in step SA20, the control flow goes to step SA21 to select the second output torque range. If an affirmative decision (YES) is obtained in step SA20, the control flow goes to step SA22 to gradually reduce the output torque of the RMG 70, more specifically, to gradually reduce the upper limit of the output torque of the RMG from the value represented by the line A1 to the value represented by the line A2. It will be understood that steps SA20–SA22 as well as SA17 correspond to the output-torque-range selecting means 152.

If a negative decision (NO) is obtained in step SA3, the control flow goes to step SA4 corresponding to the understeering detecting means 142, to determine whether the vehicle is in an understeering state. This determination is effected on the basis of the detected steering angle, longitudinal and lateral acceleration values and yaw rate of the vehicle. If an affirmative decision (YES) is obtained in step SA4, the control flow goes to step SA14 to determine whether the understeering value is larger than a predetermined threshold. This threshold is determined so that the second output torque range is selected when the understeering value is larger than the threshold. If an affirmative decision (YES) is obtained in step SA15, the control flow goes to steps SA16–SA18 for driving the vehicle in the four-wheel driving mode with the RMG 70 operated in the first output torque range. If a negative decision (NO) is obtained in step SA15, the control flow goes to steps SA19–SA22 and SA18 for driving the vehicle in the four-wheel driving mode with the RMG 70 operated in the second output torque range.

If a negative decision (NO) is obtained in step SA4, the control flow goes to step SA5 corresponding the vehicle-turning detecting means 144, to determine whether the detected angle of the steering wheel is larger than a predetermined threshold. This threshold is determined to determine that the four-wheel driving mode should be established, if the steering angle is larger than the threshold. If a negative decision (NO) is obtained in step SA5, the control flow goes to step SA6 corresponding to the accelerator operation detecting means 1466, to determine whether the operator's desired vehicle drive force as represented by the rate of increase θd/dt of the opening angle θ of the throttle valve is larger than a predetermined threshold. This threshold is also determined to determine that the four-wheel driving mode should be established, if the operator's desired vehicle drive force is larger than the threshold. If a negative decision (NO) is obtained in step SA6, the control flow goes to step SA7 corresponding to the high-load running detecting means 148, to determine whether the opening angle θ of the throttle valve is larger than a predetermined threshold. This threshold is also determined to determine that the four-wheel driving mode should be established, if the opening angle is larger than the threshold. If a negative decision (NO) is obtained in step SA7, the control flow goes to step SA8 corresponding to the vehicle-deceleration detecting means 150, to determine whether the vehicle is in a decelerating state or a non-accelerating state without an operation of the brake pedal 124. This determination is effected on the basis of the selected operating position of the shift lever 90, and the detected opening angle θ of the throttle valve and vehicle running speed V.

If an affirmative decision (YES) is obtained in any one of steps SA5–SA8, the control flow goes to steps SA19–SA22 and SA18 for driving the vehicle in the four-wheel driving mode with the RMG 70 operated in the second output torque range. If the negative decision (NO) is obtained in all of the steps SA5–SA8, the control flow goes to step SA9 to increment the 4WD-NOT-REQUIRED counter. Namely, step SA9 is implemented when none of the following states is present: the ambient temperature being lower than the lower limit; the vehicle in a starting state; the front wheels 66, 68 in a slipping state; the vehicle in an understeering state: the accelerator pedal 122 being operated; the vehicle in a high-load running state; and the vehicle in a decelerating state. Step SA9 is followed by step SA10 to determine whether the count of the 4WD-NOT-REQUIRED counter is equal to or larger than a predetermined threshold. This counter is provided to measure a time lapse after the negative decision (NO) is obtained in step SA8. The threshold used in step SA10 corresponds to a delay time for preventing control hunting associated with the switching of the vehicle driving mode from the four-wheel driving mode to the two-wheel or front-wheel driving mode.

A negative decision (NO) is obtained in step SA10 immediately after the negative decision (NO) is obtained in step SA8, and the control flow goes to steps SA20–SA22 and SA18. If the first output torque range is selected and the operating point of the RMG 70 is located above the line A2 indicated in FIG. 8, the operating point is gradually moved from the first output torque range into the second output torque range. If the first output torque range is selected and the operating point of the RMG 70 is located below the line A2, the first output torque range is immediately changed to the second output torque range. If the second output torque range is selected, this range is maintained.

When an affirmative decision (YES) is obtained in step SA10 as a result of repeated implementation of steps SA9 and SA10, that is, when the count of the 4WD-NOT-REQUIRED counter has reached the predetermined threshold, the control flow goes to step SA11 to determine whether the vehicle is running in the two-wheel or front-wheel driving mode. If a negative decision (NO) is obtained in step SA11, the control flow goes to step SA12 corresponding to the second-motor control means 154, to gradually change the vehicle driving mode from the four-wheel driving mode to the two-wheel driving mode. If an affirmative decision (NO) is obtained in step SA11, the control flow goes to step SA13 to maintain the two-wheel driving mode.

The control routine of the flow chart of FIG. 10 formulated to inhibit or terminate the four-wheel driving of the vehicle is initiated with step SB1 corresponding to the wheel-speed-sensor defect detecting means 164, to determine whether any of the four wheel speed sensors for the respective four wheels 66, 68, 80,82 is defective or abnormal. If a negative decision (NO) is obtained in step SB1, the control flow goes to step SB2 corresponding to the ABS control detecting means 158, to determine whether the hydraulic brake control device 125 is in the anti-lock braking pressure control mode. If a negative decision (NO) is obtained in step SB3 corresponding to the SC control detecting means 160, to determine whether the hydraulic brake control device 125 is in the vehicle turning stability control mode. If an affirmative decision (YES) is obtained in any one of steps SB1, SB2 and SB3, the control flow goes to step SB4 corresponding to the second-motor control means 154, to terminate or inhibit the four-wheel driving of the vehicle, that is, the operation of the RMG 70.

If the negative decision (NO) is obtained in all of steps SB1–SB3, the control flow goes to step SB5 corresponding to the steering-angle-sensor defect detecting means 166, to determine whether the steering angle sensor is defective. If a negative decision (NO) is obtained in step SB5, the control flow goes to step SB6 corresponding to the yaw-rate-sensor defect detecting means 168, to determine whether the yaw rate sensor is defective. If an affirmative decision (YES) is obtained in step SB5 or SB6, the control flow goes to step SB7 also corresponding to the second-motor control means 154, to terminate or inhibit the four-wheel driving of the vehicle, that is, the operation of the RMG 70. If the negative decision (NO) is obtained in steps SB5 and SB6, one cycle of execution of the control routine of FIG. 10 is terminated.

It will be understood from the foregoing description of the present embodiment of the invention that the second-motor control means 154 (step SA18) controls the RMG 70 such that the output torque of the RMG 70 is held within one of a stored plurality of output torque ranges which is selected by the output-torque-range selecting means 152 (steps SA17, SA21, SA22) depending upon the running condition of the vehicle. This arrangement permits the RMG 70 to be operated to provide a minimum output torque required to drive the vehicle in the specific running condition, so that the operation of the RMG 70 is limited to an extent possible under the specific vehicle running condition, while assuring sufficient drivability of the vehicle in the four-wheel driving mode.

The present embodiment is further adapted such that the plurality of output torque ranges of the RMG 70 represented by the data maps stored in the output-torque-range memory means 130 are defined in the two-dimensional coordinate system wherein the speed $N_{RMG}$ of the RMG 70 is taken along the speed axis 132 while the output torque $T_{RMG}$ of the RMG 70 is taken along the output torque axis 134, as indicated in the graph of FIG. 8. These output torque ranges include the first output torque range whose upper limit is comparatively large, and the second output torque range whose upper limit is smaller than that of the first output torque range. One of the output torque ranges including the first and second output torque ranges is selected depending upon the static and dynamic conditions of the vehicle, or the degree in which the vehicle is required to be driven in the four-wheel driving mode, so that the output torque of the RMG 70 is held at the required minimum value, while preventing a continued operation of the RMG 70 within the first output torque range in which the output torque is comparatively large. Accordingly, the overheating of the RMG 70 is avoided.

The second-motor control means 154 (step SA18) in the present embodiment is further arranged such that when the output-torque-range selecting means 152 (steps SA17, SA21, SA22) changes the first output torque range to the second output torque range whose upper limit is smaller than that of the first output torque range, the output torque of the RMG 70 is reduced at a rate which is lower than a rate at which the output torque is increased when the selecting means 152 changes the second output torque range to the first output torque range whose upper limit is larger than that of the second output torque range. This arrangement is effective to prevent a rapid decrease of the drive force of the rear wheels 80, 82 when the selected output torque range of the RMG 70 is changed from the first output torque range to the second output torque range. Accordingly, the stability of running behavior of the vehicle is improved.

The second-motor control means 154 (step SA12) is further arranged such that when the driving mode of the vehicle is changed from the four-wheel driving mode to the two-wheel driving mode without an operation of the RMG 70, the output torque of the RMG 70 is gradually or slowly reduced to zero, so as to prevent a rapid decrease of the drive force of the rear wheels 80, 82 upon switching of the driving mode to the four-wheel driving mode to the two-wheel or front-wheel driving mode. In this respect, too, the stability of running behavior of the vehicle is improved.

It is also noted that the output-torque-range selecting means 152 (steps SA17, SA21, SA22) is arranged to select the first output torque range of the RMG 70 (whose upper limit is larger than that of the second output torque range), when the vehicle is in a starting state, a slipping state of the front wheels 66, 68 (driven by the engine 14), or an understeering state. In this condition of the vehicle, therefore, the drive force of the rear drive wheels 80, 82 driven by the RMG 70 is made large enough to start the vehicle with a sufficient total drive force, or to eliminate the slipping tendency of the front wheels 66, 68 or the understeering condition of the vehicle, while minimizing a risk of overheating of the RMG 70, leading to an advantage of permitting permanent availability of the RMG 70 as one of the vehicle drive sources.

In addition, the present embodiment advantageously includes: the wheel-speed-sensor defect detecting means 164 (step SB1) for detecting a defective state of the wheel speed sensors; the ABS control detecting means 158 (step SB2) for detecting whether the braking system is in the anti-lock braking pressure control mode in which the braking force applied to each of the wheels being braked by an operation of the brake pedal 124 is controlled on the basis of the output signals of the wheels peed sensors, so that the slip ratio of each wheel is held within a predetermined range; and the VSC control detecting means 162 (step SB3) for detecting whether the braking system is in the vehicle turning stability control mode in which a suitable braking force is applied to an appropriate one or ones of the left or right wheels without an operation of the brake pedal 124, for controlling the drive forces of the four wheels so as to prevent an excessively understeering or oversteering state of the vehicle, namely, to prevent a deviation of the running direction of the vehicle from the nominal running or turning path defined by the steering angle of the vehicle, while the vehicle is turning. Further, the second-motor control means 154 (step SA12) is arranged to terminate or inhibit an operation of the RMG 70 when any one of the wheel speed sensors is defective or when the detecting means 158 or 160 detects that the braking system is in the anti-lock braking pressure control mode or vehicle turning stability control mode. That is, the vehicle driving mode is automatically changed from the four-wheel driving mode to the two-wheel driving mode for driving the vehicle with only the front wheels 66, 68, when any wheel speed sensor is defective or when the vehicle is running in the anti-lock braking pressure control mode or vehicle turning stability control mode. This arrangement prevents an abnormality in the anti-lock braking pressure control or vehicle turning stability control which would arise from an error in the detection of the wheel speeds $V_{FR}$, $V_{FL}$, $V_{RR}$, $V_{RL}$, and prevents a control interference due to such an abnormality, resulting in improved reliability of the anti-lock braking pressure control and vehicle turning stability control.

The present vehicle control apparatus has a further advantage owing to the provision of the low-temperature detecting means 162 (step SA1) for deterring whether the ambient temperature is lower than the lower limit below which the friction coefficient of the road surface is expected to be extremely low, so that the second-motor control means 154 (step SA17) operates the RMG 70 within the first output torque range when the ambient temperature is lower than the lower limit. Accordingly, the RMG 70 is automatically activated to drive the vehicle in the four-wheel driving mode for improving the running stability of the vehicle, while the ambient temperature is low.

The present embodiment has a still further advantage owing to the provision of: the vehicle-starting detecting means 138 (step SA2) for determining whether the vehicle is in the process of being started: the wheel-slip detecting means 140 (step SA3) for determining whether the main drive wheels in the form of the front wheels 66, 68 are slipping: the understeering detecting means 142 (step SA4) for determining, on the basis of the detected steering angle and yaw rate of the vehicle, whether the vehicle is in an understeering state; the vehicle-turning detecting means 144 (step SA5) for determining whether the steering angle of the vehicle is larger than the predetermined threshold; the accelerator operation detecting means 146 (step SA6) for determining whether the vehicle is being accelerated, namely, whether the rate of increase θd/dt of the throttle valve opening anlgle θ is higher than the threshold; the high-load-running detecting means 148 (step SA7) for determining whether the vehicle is running under a high load, that is, whether the operating amount of the accelerator pedal 122 the opening anlgle θ of the throttle valve is larger than the threshold; and the vehicle-deceleration detecting means 150 (step SA8) for determining whether the vehicle is being decelerated.

The second-motor control means 154 activates the second drive power source in the form of the RMG 70 for driving the vehicle in the four-wheel driving mode so as to improve the running stability of the vehicle, when any one of the following states is detected: the starting state of the vehicle; the slipping state of the front wheels; the understeering state of the vehicle; the turning state of the vehicle; the accelerating state of the vehicle; the high-load running state of the vehicle; and the decelerating state of the vehicle.

When none of the above-indicated states is not detected, the second-motor control means 154 determines that the four-wheel driving is not necessary, and terminates or inhibits an operation of the RMG 70 for driving the vehicle in the two-wheel driving mode, a predetermined delay time after the moment of the determination that the four-wheel driving is not necessary. Accordingly, the frequency of operation of the RMG 70 is minimized, to prevent overheating of the RMG 70. Further, the above-indicated delay time prevents otherwise possible control hunting associated with the switching between the four-wheel driving mode and the two-wheel driving mode.

The present embodiment is further advantageous owing to the provision of the steering-angle-sensor defect detecting means 166 (step SB5) for detecting a defect of the steering angle sensor, and the yaw-rate-sensor defect detecting means 168 (step SB6) for detecting a defect of the yaw rate sensor. The second-motor control means 154 is adapted not to activate the RMG 70 even when the understeering state of the vehicle is detected by the understeering detecting means 142, if a defect of the steering angle sensor or the yaw rate sensor is detected by the steering-angle-sensor defect detecting means 166 or the yaw-rate-sensor defect detecting means 168. This arrangement has an advantage of preventing the vehicle driving in the four-wheel driving mode due to an erroneous determination that the vehicle is in the understeering state, which erroneous determination would take place due to a defect of the steering angle sensor or yaw rate sensor.

Referring next to the block diagram of FIG. 11, there will be described further functional means also incorporated in the hybrid control device 104. These other functional means include 4WD-initiating condition detecting means 230, actual slip ratio calculating means 232, desired slip ratio setting means 234, torque distribution feedback control means 236, second-motor control means 238, traction control detecting means 240 and feedback control changing means 242.

The 4WD-initiating condition detecting means 230 is adapted to determine whether a predetermined condition for initiating the vehicle driving in the four-wheel driving mode has been satisfied, namely, whether a predetermined condition for switching the vehicle driving mode from the two-wheel driving mode to the four-wheel driving mode has been satisfied. This determination is based on the vehicle running condition. For instance, the predetermined condition is satisfied when any one of the following states described above: a starting state of the vehicle; a slipping state of the front wheels; an understeering state of the vehicle; a turning state of the vehicle; an accelerating state of the vehicle; a high-load running state of the vehicle; and a decelerating state of the vehicle.

The actual slip ratio calculating means 232 is adapted to calculate the rotating speed $N_F$ of the main drive wheels in the form of the front wheels 66, 68 by obtaining an average value of the speed $N_{FL}$ of the front left wheel 66 and the speed $N_{FR}$ of the front right wheel 68, and further calculate the rotating speed $N_R$ of the rear wheels 80, 82 by obtaining an average value of the speed $N_{RL}$ of the rear left wheel 80 and the speed $N_{RR}$ of the rear right wheel 82. The actual slip ratio calculating means 232 is further adapted to calculate a difference ($N_F-N_R$) between the speed NF of the front wheels 66, 68 and the speed NR of the rear wheels 80, 82, and calculate an actual slip ratio $S=100\% \times (N_F-N_R)/\min(N_F, N_R)$ of the wheels 66, 68, 80, 82 by dividing the difference ($N_F-N_R$) by a lower one of the speeds $N_F$ and $N_R$.

The desired slip ratio setting means 234 is adapted to set a desired slip ratio $S^0$ of the wheels 66, 68, 80, 82 for driving the vehicle in the four-wheel driving mode with high stability, the desired slip ratio $S^0$ is stored in a suitable memory. This desired slip ratio S* may be a predetermined constant value, or may be selected from a plurality of different values corresponding to respective different vehicle running states in the four-wheel driving mode.

Figure 13:
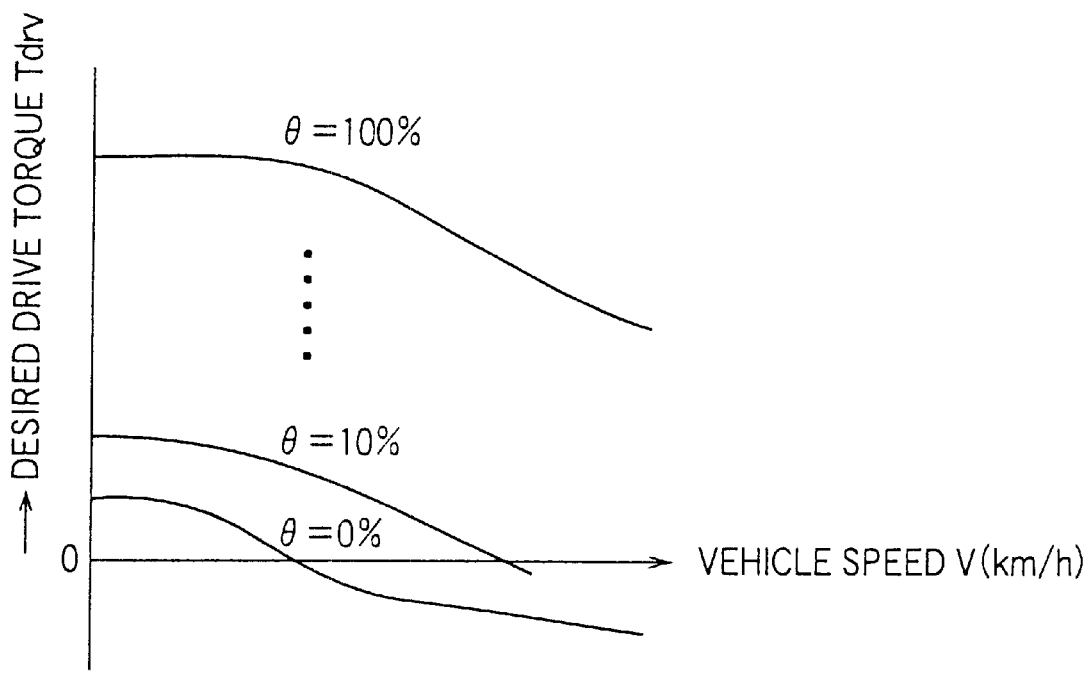
FIG. 13 is a graph indicating a stored data map used by second-motor control means to calculate an operator's desired vehicle drive torque.

The torque distribution feedback control means 236 is adapted to calculate a slip ratio error $\delta_{sr1}=S_1-S^0_1$ between the actual slip ratio S and the desired slip ratio $S^0$, and calculate a rear-wheel torque distribution ratio $R_r$ which eliminates or zeroes the slip ratio error $\delta_{sr1}$, namely, which permits the actual slip ratio S to coincide with the desired value $S^0_1$. The rear-wheel torque distribution ratio $R_r$ is a ratio of the drive torque of the rear wheels 80, 82 to the total vehicle drive torque or force (corresponding to the operator's desired vehicle drive torque) in the four-wheel driving mode. This rear-wheel torque distribution ratio $R_r$ is calculated according to the following equation (1):

$$R_r = WR_r + K_{p1} \cdot \delta_{sr1} + K_{d1} \cdot d\delta_{sr1}/dt + K_{i1} \cdot \delta_{sr1}dt + C_1 \quad (1)$$

wherein $WR_r$: rear-wheel load distribution ratio
$K_{p1}$: proportion constant (proportional item gain)
$K_{d1}$: differentiation constant (differential item gain)
$K_{i1}$: integration constant (integral item gain)
$C_1$: constant The second-motor control means 238 is adapted to control the RMG 70 on the basis of the front-rear torque distribution ratio (represented by the rear-wheel torque distribution ratio $R_r$) and the operator's desired vehicle drive force Tdrv, so that the front-rear torque distribution ratio is established. Described more specifically, a rear-wheel torque (Tdrv×$R_r$) for driving the rear wheels 80, 82 is calculated from the operator's desired vehicle drive torque Tdrv and the rear-wheel torque distribution ratio $R_r$. The RMG 70 is operated to provide the calculated rear-wheel torque (Tdrv×$R_r$). The operator's desired drive torque Tdrv may be obtained on the basis of the vehicle speed V and the opening anlgle θ of the throttle valve and according to a predetermined relationship among these parameters Tdrv, V and θ, as indicated in the graph of FIG. 13.

The traction control detecting means 240 is adapted to determine whether the hydraulic brake control device 125 is in a traction control (TRC) mode for applying a brake to the front wheels 66, 68 driven by the engine 14, under the control of the brake control device 108. The feedback control changing means 242 is operable when the traction control detecting means 240 detects an operation of the braking system in the traction control mode. The feedback control changing means 242 commands the torque distribution feedback control means 236 so that the rear-wheel torque distribution ratio $R_r$ is increased to a value larger than that calculated according to the above equation (1), for increasing the drive force produced by the RMG 70, so as to prevent a decrease in the total vehicle drive force in the four-wheel driving mode, or maintain the total vehicle drive force at a value substantially equal to the operator's desired vehicle drive torque Tdrv.

For instance, the torque distribution feedback control means 236 is commanded by the feedback control changing means 242 in the traction control mode, to change at least one of the slip ratio error $\delta_{sr1}=S_1-S^0_1$ (error value), the desired slip ratio $S^0_1$ (desired value) and the actual slip ratio $S_1$ (actual value) in the above equation (1), so that the torque distribution ratio $R_r$ of the rear wheels 80, 82 (output value of the above equation) is higher than that calculated according to the above equation (1). For instance, the slip ratio error is increased from the value $\delta_{sr1}$ to a value $\delta_{sr2}$ by a predetermined amount, or the actual slip ratio is increased from the value $S_1$ to a value $S_2$ by a predetermined amount. Alternatively, the desired slip ratio is reduced from the value $S^0_1$, to a value $S^0_2$, by a predetermined amount. The rear-wheel torque distribution ratio $R_r$ calculated according to the above equation (1) as modified as described above is increased.

Alternatively, the feedback control changing means 242 may be adapted to command the torque distribution feedback control means 236 to change at least one of the feedback gains $K_{p1}$, $K_{d1}$ and $K_{i1}$ in the above equation (1), so as to increase the torque distribution ratio $R_r$ of the rear wheels 80, 82 to be driven by the RMG 70. For instance, at least one of the feedback gains $K_{p1}$, $K_{d1}$ and $K_{i1}$ is increased by a predetermined amount to a value $K_{p2}$, $K_{d2}$ and $K_{i2}$, respectively. Alternatively, the constant $C_1$ is increased to a value $C_2$. The rear-wheel torque distribution ratio $R_r$ as calculated according to the thus modified equation (1) is increased.

Alternatively, the feedback control changing means 242 may command the torque distribution feedback control means 236 in the traction control mode, to increase the rear-wheel torque distribution ratio Rr as calculated according to the above equation (1), by a predetermined amount.

Figure 11:
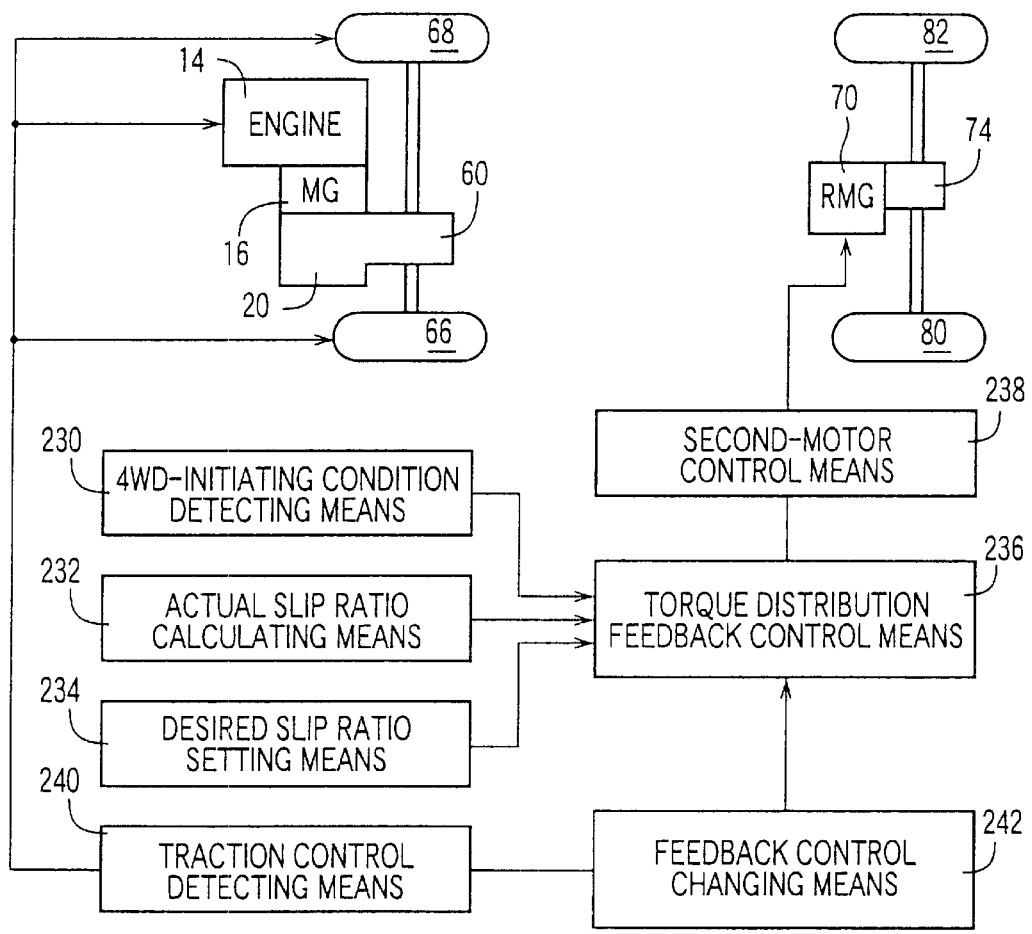
FIG. 11 is a block diagram illustrating further functional means also incorporated in the hybrid control device of FIG. 3.
Figure 12:
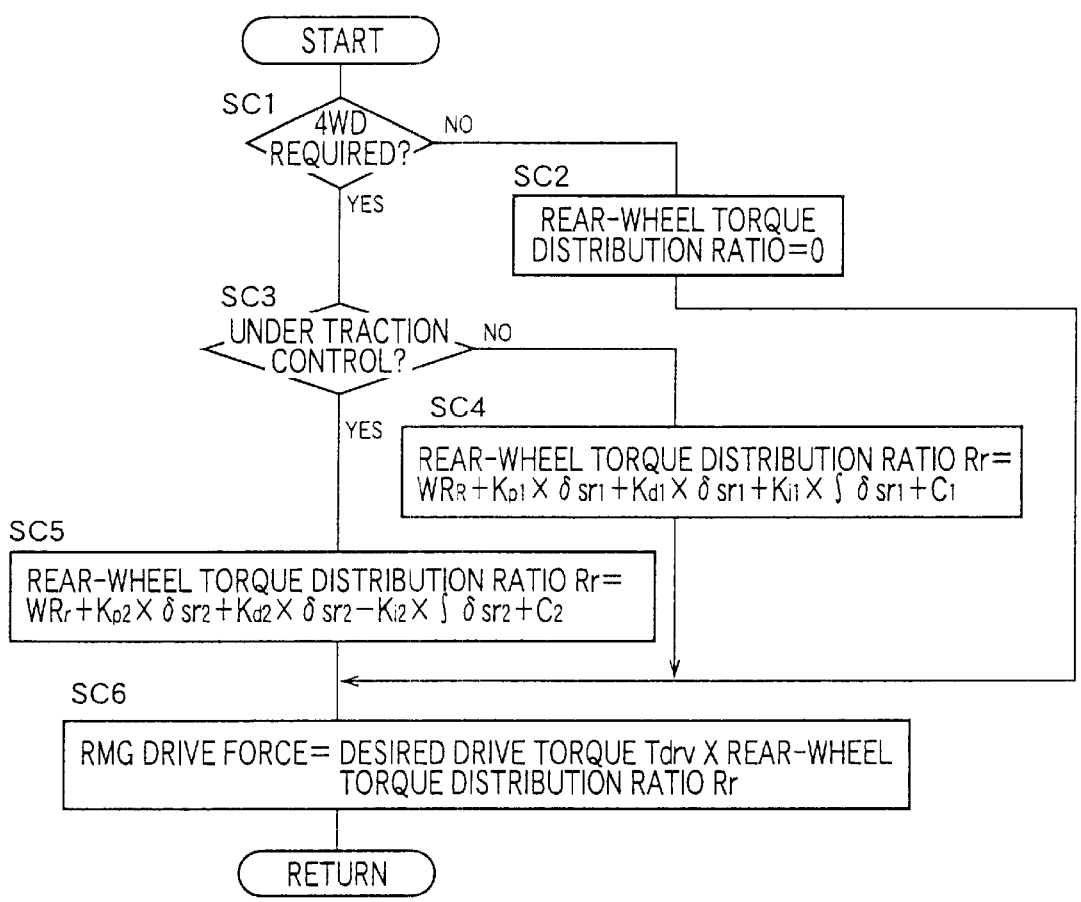
FIG. 12 is a flow chart illustrating a control routine executed by the hybrid control device including the functional means of FIG. 11, to select the output torque range of the rear motor/generator.

Referring to the flow chart of FIG. 12, there is illustrated a control routine executed by the hybrid control device 104 which includes the functional means shown in FIG. 11. This control routine is initiated with step SC1 corresponding to the 4WD-initiating condition detecting means 230, to determine whether the predetermined condition for initiating the vehicle driving in the four-wheel driving mode is satisfied. This determination is effected on the basis of the running state of the vehicle. If a negative decision (NO) is obtained in step SC1, the control flow goes to step SC2 to zero the rear-wheel torque distribution ratio $R_r$, and to step SC6 corresponding to the second-motor control means 238, to calculate the drive torque of the rear wheels 80, 82, on the basis of the operator's desired vehicle drive torque Tdrv and the rear-wheel torque distribution ratio $R_r$, and operate the RMG 70 to produce the calculated drive torque. In this case where the rear-wheel torque distribution ratio $R_r$ has been zeroed in step SC3, the output torque of the RMG 70 is zero, so that the vehicle is driven in the two-wheel driving mode by only the front wheels 66, 68.

If an affirmative decision (YES) is obtained in step SC1, the control flow goes to step SC3 corresponding to the traction control detecting means 240, to determine whether the traction control mode is established by the brake control device 108. If a negative decision (NO) is obtained in step SC3, the control flow goes to step SC4 corresponding to the torque distribution feedback control means 236, to calculate the slip ratio error $\delta_{sr1} = S_1 - S^0_1$ between the actual and desired slip ratio values S and $S^0$, and calculate the rear-wheel torque distribution ratio $R_r$ on the basis of the actual slip ratio error and according to the above equation (1). The calculated rear-wheel torque distribution ratio $R_r$ eliminates the actual slip ratio error $\delta_{sr1}$. Step SC4 is followed by step SC6 corresponding to the second-motor control means 238, to calculate the drive torque (Tdrv×$R_r$) of the rear wheels 80, 82 on the basis of the operator's desired vehicle drive torque Tdrv and the calculated rear-wheel torque distribution ratio $R_r$, and operates the RMG 70 to drive the rear wheels 80, 82 with the calculated drive torque (Tdrv×$R_r$).

While the traction control is effected, an affirmative decision (YES) is obtained in step SC3, and the control flow goes to step SC5 corresponding to the feedback control changing means 242, to command the torque distribution feedback control means 236 to calculate the rear-wheel torque distribution ratio Rr such that the calculated ratio Rr is higher than that calculated in step SC4. For instance, the rear-wheel torque distribution ratio Rr is calculated in step SC5, according to a modified equation including the feedback gains $K_{p2}$, $K_{d2}$ and $K_{i2}$ which are larger by a predetermined amount than $K_{p1}$, $K_{d1}$ and $K_{i1}$. Step SC5 is followed by step SC6 in which the drive torque (Tdrv×$R_r$) of the rear wheels 80, 82 is calculated on the basis of the operator's desired vehicle drive torque Tdrv and the calculated rear-wheel torque distribution ratio $R_r$, and the RMG 70 is operated to drive the rear wheels 80, 82 with the calculated drive torque (Tdrv×$R_r$). Thus, the rear wheels 80, 82 is driven with a larger drive force or torque while a braking force is applied to the front wheels 66, 68 (driven by the engine 14) in the traction control mode, than while the traction control mode is not established.

Referring to the time chart of FIG. 14, the operation of the hybrid control device 104 according to the control routine of FIG. 12 will be described. Suppose the vehicle driving in the four-wheel driving mode is initiated at a point of time t1 on a frozen road surface having a considerably low friction coefficient μ. If the traction control mode is not established at this time, the front wheel speed $N_F$ and the actual slip ratio S are changed due to slipping of the front wheels 66, 68, as indicated by solid lines in FIG. 14, and the rear-wheel torque distribution ratio $R_r$ is increased according to the above equation (1), so as to maintain the operator's desired vehicle drive torque Tdrv, as indicated by solid line. If the slipping tendency of the front wheels 66, 68 is eliminated while the vehicle is driven in this state for some time, the front-wheel speed $N_F$ is lowered, and the rear-wheel torque distribution ratio $R_r$ is reduced to a normal value of about 0.5. If the traction control is effected for the front wheels 66, 68, on the other hand, the amounts of increase of the front wheel speed $N_F$ and the actual slip ratio S are restricted by an effected of the traction control, so that the slip ratio error $\delta_{sr1} = S_1 - S^0_1$ is reduced, and the rear-wheel torque distribution ratio $R_r$ calculated according to the above equation (1) is not increased so much. As a result, the total vehicle drive force is reduced below the operator's desired value Tdrv, and the vehicle cannot be driven with a sufficient degree of drivability. Described in detail, when the RMG 70 is controlled according to the rear-wheel torque distribution ration $R_r$ calculated by the torque distribution feedback control means 236 according to the above equation (1), while the front wheels 66, 68 driven by the engine 14 are under the traction control, the slipping tendency of the front wheels 66, 68 is reduced, and the actual slip ratio of the front and rear wheels 66, 68, 80, 82 is reduced to the desired value, as a result of the traction control. Although the hybrid control device 104 provides an apparent effect of feedback control of the front-rear torque distribution, the rear-wheel torque distribution ratio is actually reduced to reduce the output torque of the RMG 70 for driving the rear wheels 80, 82, so that the drivability of the vehicle is unfavorably deteriorated where the RMG 70 is controlled according to the above equation (1) while the front wheels 66, 68 are subject to the traction control.

In the present embodiment, however, the feedback control changing means 242 (SC5) commands the torque distribution feedback control means 236 to calculate the rear-wheel torque distribution ratio $R_r$ according to a modified equation which includes the feedback gains $K_{p2}$, $K_{d2}$ and $K_{i2}$ which are larger by a predetermined amount than $K_{p1}$, $K_{d1}$ and $K_{i1}$ included in the above equation (1) that is when the traction control mode is not established. Thus, the feedback control of the front-rear torque distribution is changed so as to increase the rear-wheel torque distribution ratio $R_r$ while the traction control is effected. Accordingly, the rear wheels 80, 82 are driven by the RMG 70 by a larger drive torque when the rear-wheel torque distribution ratio $R_r$ is calculated according to the modified equation, than when it is calculated according to the above equation (1). Thus, the feedback control changing means 242 assures improved drivability of the vehicle in the four-wheel driving mode even while the traction control is effected.

Figure 14:
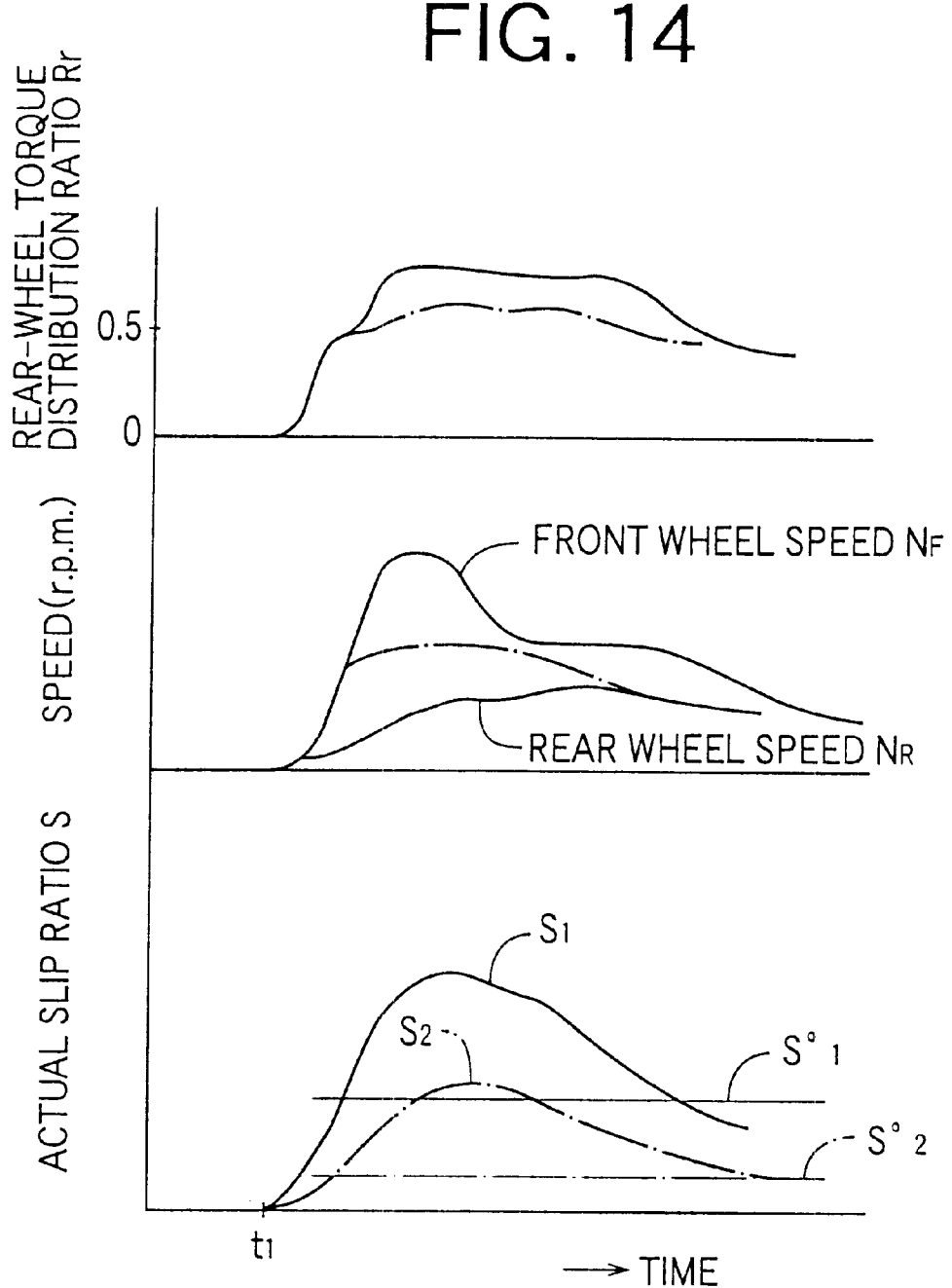
FIG. 14 is a time chart for explaining operations according the control routine of FIG. 13.

In the specific example of FIG. 14, the feedback control changing means 242 is adapted to command the torque distribution feedback control means 236 to use the desired slip ratio $S^0_2$, which is smaller than the value $S^0_1$ by a predetermined amount. In this case, too, the slip ratio error $\delta_{sr2} = S_2 - S^0_2$ is increased, and the rear-wheel torque distribution ratio $R_r$ calculated by the torque distribution feedback control means 236 is increased, so that the rear wheels 80, 82 are driven with an increased drive torque by the RMG 70, for driving the vehicle with improved drivability. A similar effect may be obtained by using the actual slip ratio $S_2$, which is larger than the value $S_1$ used in the above equation (1), or by increasing the slip ratio error $\delta_{sr1}$ as calculated on the basis of the actual and desired slip ratio values $S_1$ and $S^0_1$. Alternatively, the rear-wheel torque distribution ratio $R_r$ as calculated according to the above equation (1) may be increased by a suitable amount.

Referring to the block diagram of FIG. 15, there will be described further functional means incorporated in the hybrid control device 104. These functional means include first-motor control means 330, second-motor control means 332, first-motor operation limiting means 334, second-motor operation limiting means 336, first-motor output increasing means 338 and second-motor output reducing means 340. The first-motor control means 330 is operated in the four-wheel driving mode of the vehicle, to calculate a front-wheel drive torque corresponding to a front-wheel torque distribution ratio $(1-K_{tr})$ which is equal to a front-wheel load distribution ratio. The operator's desired vehicle drive torque Tdrv is a sum of the front-wheel drive torque and a rear-wheel drive torque. The first-motor control means 330 is further adapted to control the MG 16 so as to drive the front wheels 66, 68 with the calculated front-wheel drive torque. Where the MG 16 and the engine 14 are concurrently operated in the DIRECT ENGINE DRIVE mode, the calculated front-wheel drive torque is a total drive torque provided by the MG 16 and the engine 14. The first-motor control means 330 is further adapted to control the MG 16 during an operation of the brake pedal 124 or during a coasting run of the vehicle, to provide a regenerative braking torque to be applied to the front wheels 66, 68. The regenerative braking torque is calculated according to the front-wheel torque distribution ratio $(1-K_{tr})$ and an operator's desired vehicle braking torque which is represented by the operating amount of the brake pedal 124 or a deceleration value of the vehicle during the coasting run.

The second-motor control means 332 is operated in the four-wheel driving mode of the vehicle, to calculate a rear-wheel drive torque corresponding to a rear-wheel torque distribution ratio $K_{tr}$ which is equal to a rear-wheel load distribution ratio. The operator's desired vehicle drive torque Tdrv is a sum of the front-wheel drive torque and the rear-wheel drive torque. The second-motor control means 332 is further adapted to control the RMG 70 so as to drive the rear wheels 80, 82 with the calculated rear-wheel drive torque. The second-motor control means 332 is further adapted to control the RMG 70 during an operation of the brake pedal 124 or during a coasting run of the vehicle, to provide a regenerative braking torque to be applied to the rear wheels 80, 82. The regenerative braking torque is calculated according to the rear-wheel torque distribution ratio $K_{tr}$ and the operator's desired vehicle braking torque represented by the operating amount of the brake pedal 124 or the deceleration value of the vehicle during the coasting run. The operator's desired vehicle drive torque Tdrv is determined on the basis of the detected vehicle speed V and opening angle θ of the throttle valve and according to a predetermined relationship among these parameters Tdrv, V and θ, which relationship is represented by a stored data map. An example of the relationship is shown in the graph of FIG. 13. The front-wheel torque distribution ratio $(1-K_{tr})$ and the rear-wheel torque distribution ratio $K_{tr}$ are desired values determined by a static front-rear load distribution ratio (constant), or by a dynamic front-rear load distribution ratio which is determined as a function of the longitudinal acceleration value G of the vehicle.

Figure 16:
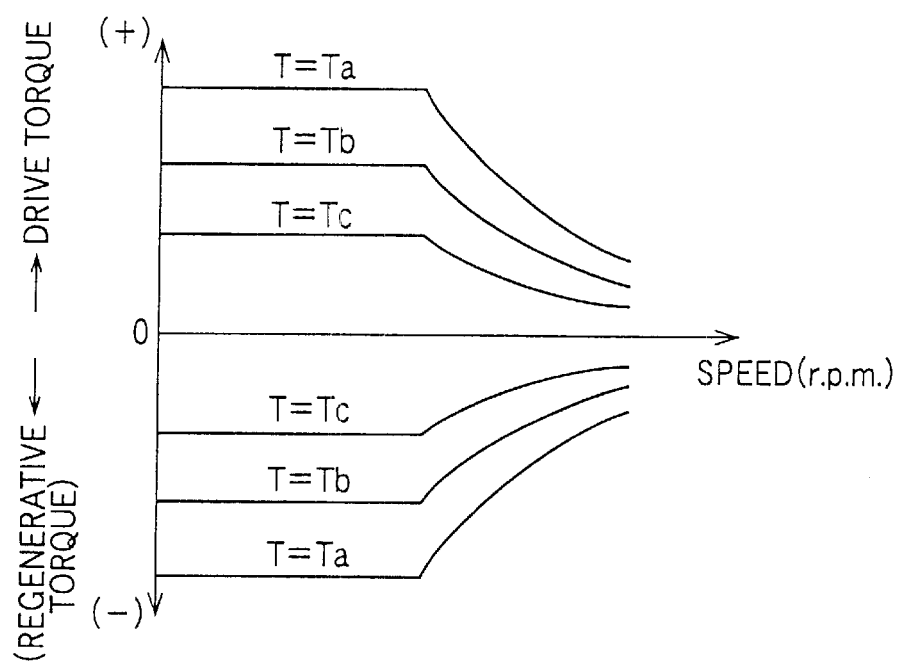
FIG. 16 is a graph indicating an output torque range of front motor/generator MG or rear motor/generator RMG (shown in FIGS. 1 and 3) which varies with its operating temperature.
Figure 17:
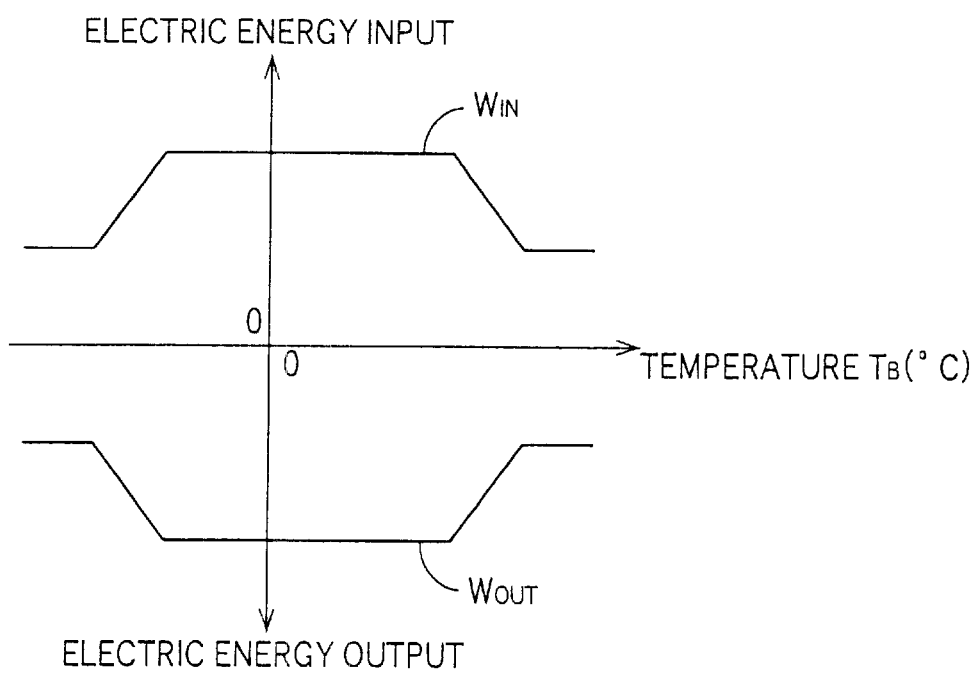
FIG. 17 is a graph indicating temperature characteristics of electric energy input and output limits $W_{IN}$ and $W_{OUT}$ of electric energy storing device shown in FIG. 3.

The operations of the MG 16 and RMG 70 should be limited depending upon their operating temperatures $T_{MG}$ and $T_{RMG}$, in order to maintain a high electrical insulating property of an insulator used for insulating the coils. For instance, the MG 16 and RMG 70 are required to be operated within an output torque range which varies with the operating temperature, as indicated in the graph of FIG. 16. When the operating temperature $T_{MG}$ of the MG 16 or operating temperature $T_{MG}$ of the RMG 70 is Ta, the MG 16 or RMG 70 should be operated such that its output torque is held within a comparatively broad range defined by two lines T=Ta, which represent the maximum drive torque and regenerative torque values (upper limits of the output torque). When the operating temperature $T_{MG}$ of the MG 16 or operating temperature $T_{RMG}$ of the RMG 70 is Tc higher than Ta, the MG 16 or RMG 70 should be operated such that its output torque is held within a comparatively narrow range defined by two lines T=Tc, which represent the maximum drive torque and regenerative torque values (upper limits of the output torque). Similarly, the amount of electric energy output and the amount of electric energy input of the electric energy storing device 112 should be limited depending upon its temperature $T_B$, in order to prevent deterioration of its electrolyte, its internal damages and shortening of its service life. For instance, a maximum electric energy output $W_{OUT}$ and a maximum electric energy input $W_{IN}$ are determined as indicated in the graph of FIG. 17. That is, the electric energy storing device 112 should be used within a range defined by two lines $W_{IN}$ and $W_{OUT}$ Indicated in FIG. 17.

In view of the above, the first-motor operation limiting means 334 is adapted to limit the operation of the MG 16 on the basis of the maximum drive torque and regenerative torque values of the MG 16 which are determined by the operating temperature TMG and a predetermined relationship as indicated in FIG. 16 by way of example, and on the basis of the maximum electric energy output $W_{OUT}$ and maximum electric energy input $W_{IN}$ of the electric energy storing device 112 which are determined by the temperature $T_B$ of the storing device 112 and a predetermined relationship as indicated in FIG. 17 by way of example. Similarly, the second-motor operation limiting means 336 is adapted to limit the operation of the RMG 70 on the basis of the maximum drive torque and regenerative torque values of the RMG 70 determined by the operating temperature $T_{RMG}$ and a predetermined relationship as indicated in FIG. 16, and on the basis of the maximum electric energy output and input $W_{OUT}$, $W_{IN}$ of the electric energy storing device 112 which are determined by the temperature $T_B$ and a predetermined relationship as indicated in FIG. 17.

The first-motor output increasing means 338 is operated when the operation of the RMG 70 is limited by the second-motor operation limiting means 336. The first-motor output increasing means 338 is adapted to increase the drive torque or regenerative torque of the MG 16 by an amount corresponding to the amount of limitation of the operation of the RMG 70, so that the total vehicle drive torque or regenerative braking torque remains unchanged irrespective of the limited operation of the RMG 70. The second-motor output reducing means 340 is operated when the operation of the MG 16 is limited by the first-motor operation limiting means 334. The second-motor output reducing means 340 is adapted to reduce the drive torque or regenerative torque of the RMG 70 by an amount corresponding to the amount of limitation of the operation of the MG 16, in order to maintain the desired front-rear torque distribution ratio, that is, so that the front-rear drive force distribution ratio or the front-rear braking force distribution ratio is maintained at a desired value.

Figure 18:
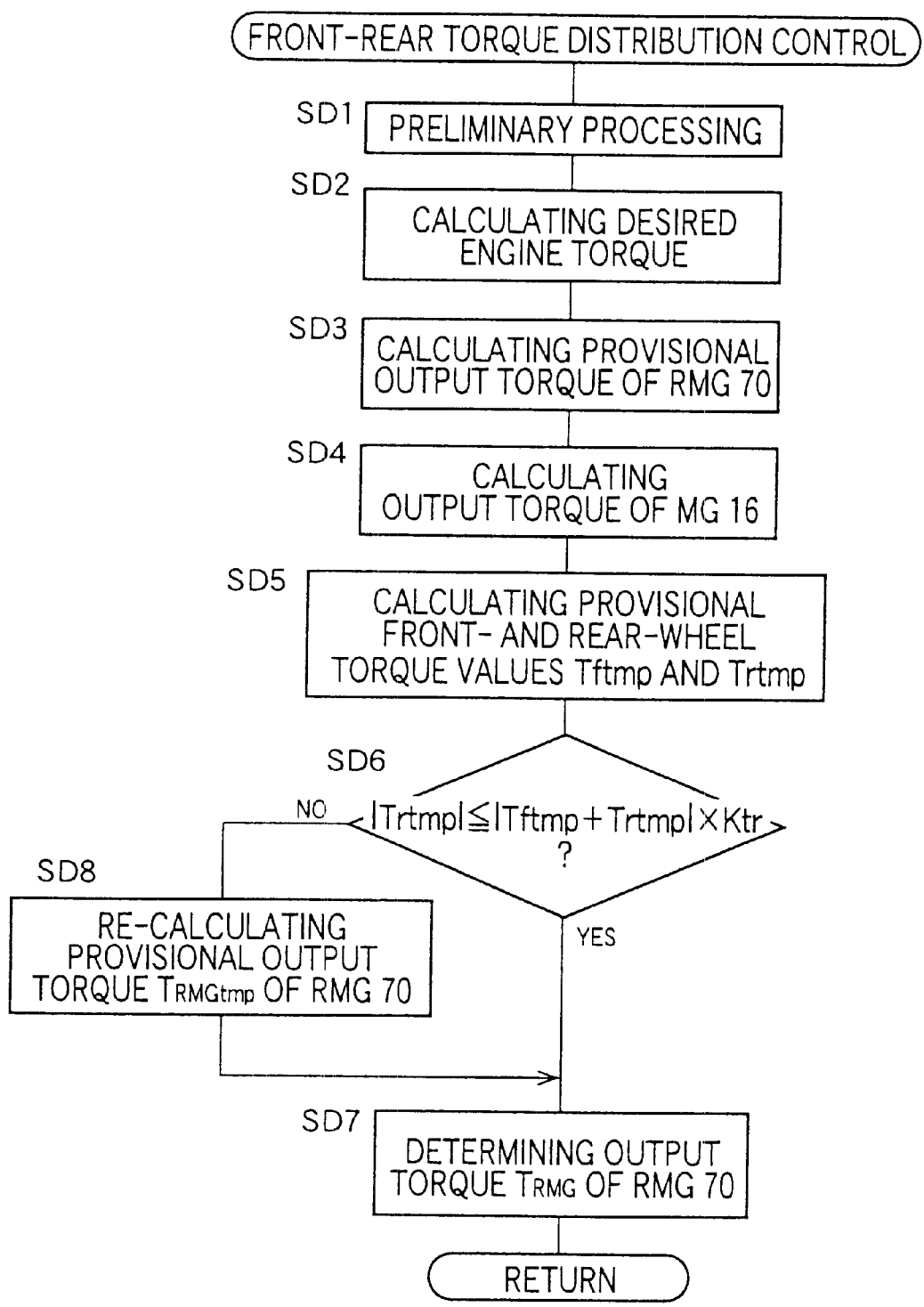
FIG. 18 is a flow chart illustrating a front-rear torque distribution control routine executed by the hybrid control device including the functional means of FIG. 15.

Referring to the flow chart of FIG. 18, there will be described a front-rear torque distribution control routine executed in the DIRECT ENGINE DRIVE mode, by the hybrid control device 104 including the functional means shown in the block diagram of FIG. 15. In the DIRECT ENGINE DRIVE mode, the vehicle is driven by both of the engine 14 and the MG 16. The control routine of FIG. 18 is initiated with step SD1 to effect preliminary processing operations for calculating the maximum electric energy input $W_{IN}$ and the maximum electric energy output $W_{OUT}$ on the basis of the detected temperature $T_B$ of the electric energy storing device 112 and according to the predetermined relationship of FIG. 17, and further calculating a maximum drive torque $T_{MGmax}$ and a maximum regenerative torque $T_{MGmin}$ of the MG 16 on the basis of the temperature $T_{MG}$ and according to the predetermined relationship of FIG. 16, and a maximum drive torque $T_{RMGmax}$ and a maximum regenerative torque $T_{RMGmin}$ of the RMG 70 on the basis of the temperature $T_{RMG}$ and according to the relationship of FIG. 16. The preliminary processing operations further include the calculation of the speed $N_{MG}$ of the MG 16, the speed $N_{RMG}$ of the RMG 70, the speed $N_{IN}$ of the input shaft 22 of the continuously variable transmission 20, on the basis of the output signals of the appropriate sensors. The preliminary processing operations further include the calculation of the operator's desired vehicle drive torque Tdrv on the basis of the vehicle speed V and the opening anlgle θ of the throttle valve and according to the predetermined relationship of FIG. 13, and the calculation of a desired output $P_v$ of the engine 14 on the basis of the calculated operator's desired vehicle drive torque Tdrv, a drive torque required to operate optionally provided devices such as an air-conditioner, and a drive torque required to charge the electric energy storing device 112. While the operator's desired vehicle drive torque Tdrv, the drive torques of the MG 16 and RMG 70 and other drive torque values are represented by a positive value, the operator's desired braking torque, the regenerative braking torques of the MG16 and RMG 70 and other regenerative braking torque values are represented by a negative value. It is noted that the terms "increase", "reduce", etc. which are used in connection with these drive torque values or regenerative torque values are based on their absolute values.

Figure 19:
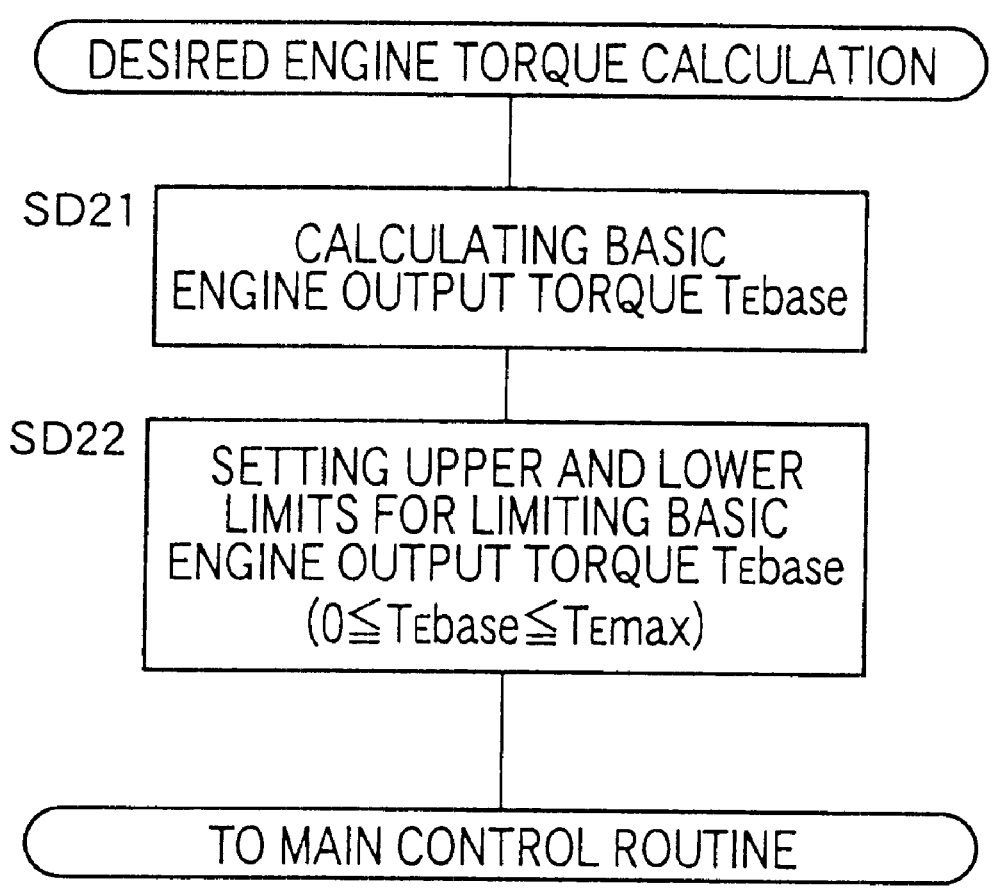
FIG. 19 is a flow chart illustrating a desired-engine-torque calculating sub-routine executed in step SD2 of the control routine of FIG. 18.

Step SD1 is followed by step SD2 to calculate a desired torque value of the engine 14 by implementing a desired-engine-torque calculating sub-routine of FIG. 19. This sub-routine is initiated with step a basic output torque $T_{Ebase}=P_v/N_E$) of the engine 14 on the basis of the above-indicated desired engine output $P_v$ and the engine speed $N_E$. Then, the control flow goes to step SD22 in which an upper limit $T_{Emax}$ and a lower limit 0 of the calculated basic output torque $T_{Ebase}$ are set. These upper and lower limits are determined by the specifications of the engine 14. Namely, if the calculated basic output torque $T_{Ebase}$ is larger than the upper limit $T_{Emax}$, the basic output torque $T_{Ebase}$ is limited to the upper limit $T_E$,max. If the calculated basic output torque $T_{Ebase}$ is smaller than zero, it is limited to zero. That is, $0 \leq T_{Ebase} \leq T_{Emax}$. The thus limited basic output torque $T_{Ebase}$ is used as an engine output torque command $T_E$, SO that the engine 14 is controlled according to the engine output torque command $T_E$.

Figure 20:
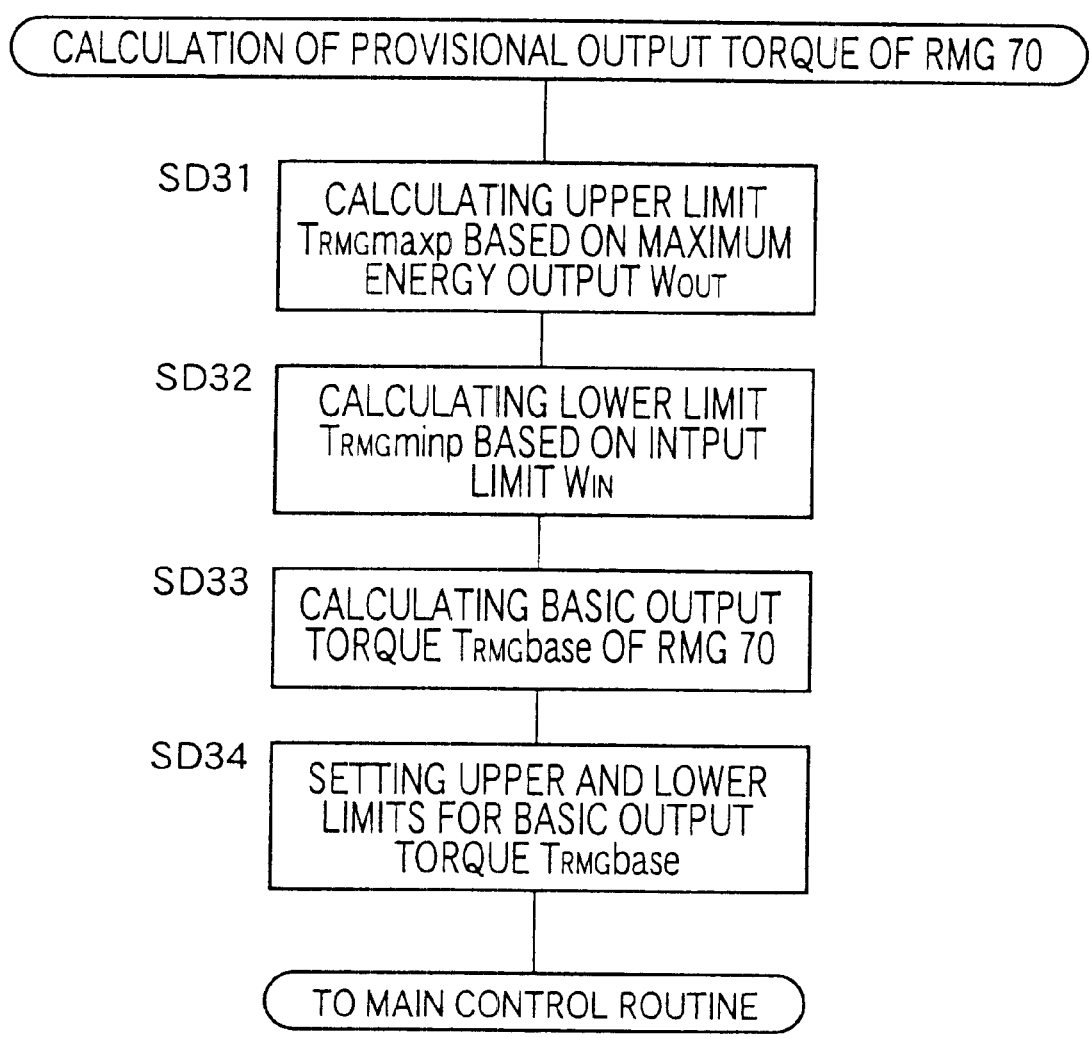
FIG. 20 is a flow chart illustrating a sub-routine for calculating a provisional output torque of the rear motor/generator in step SD3 of the control routine of FIG. 18.

Step SD2 of FIG. 18 is followed by step SD3 to calculate a provisional output torque $T_{RMGtmp}$ of the RMG 70 by implementing a provisional rear-motor torque calculating sub-routine of FIG. 20. This sub-routine is initiated with step SD31 to calculate an upper limit $T_{RMGmax}$ of the output torque of the RMG 70 on the basis of the maximum electric energy output $W_{OUT}$. Described more specifically, a value $P_{RMG}$ is first calculated according to the following equations (2) and (3), and the thus calculated value PRMG is used as a maximum output $P_{RMGmaxp}$ of the RMG 70.

$$P_{MG}+P_{RMG}=W_{OUT} \quad (2)$$

$$[(P_{MG} \times EF_{MG}+N_E \times T_{Ebase}) \times EF_{CVT}]:(P_{RMG} \times EF_{RMG})=(1-K_{tr}):K_{tr} \quad (3)$$

wherein $EF_{MG}$: efficiency of the MG 16

$EF_{FECT}$: efficiency of the transmission 20

$EF_{RMG}$: efficiency of the RMG 70

Then, a value $T_{RMG}$ which satisfying the following equation (4) is obtained from the value $P_{RMGmaxp}$ and the speed $N_{RMG}$ of the RMG 70. The thus obtained value $T_{RMG}$ is used as a maximum output torque $T_{RMGmaxp}$ of the RMG 70.

$$N_{RMG} \times T_{RMG}+P_{RMGloss}(N_{RMG}, T_{RMG})=P_{RMGmaxp} \quad (4)$$

wherein $P_{RMGloss}$ ($N_{RMG}$, $T_{RMG}$): power loss of the RMG 70

Step SD31 is followed by step SD32 to calculate a lower limit $T_{RMGminp}$ of the output torque of the RMG 70 on the basis of the maximum electric energy input $W_{IN}$. Described more specifically, a value $P_{RMG}$ is obtained according to the following equations (5) and (6), and the thus obtained value $P_{RMG}$ is used as a minimum output $P_{RMGminp}$ of the RMG 70.

$$P_{MG}+P_{RMG}=W_{IN} \quad (5)$$

$$[(P_{MG} \times EF_{MG}+N_E \times T_{Ebase}) \times EF_{CVT}]:(P_{RMG} \times EF_{RMG})=(1-K_{tr}):K_{tr} \quad (6)$$

Then, a value $T_{RMG}$ which satisfies the following equation (7) is obtained on the basis of the thus calculated value $P_{RMGminp}$ and the speed $N_{RMG}$ of the RMG 70, and the obtained value $T_{RMG}$ is used as a minimum output torque $T_{RMGminp}$ of the RMG 70.

Then, the control flow goes to step SD33 corresponding to the second-motor control means 332, to calculate a basic output torque $T_{RMGbase}$ of the RMG 70 according to the following equation (8).

$$T_{RMGbase}=Tdrv \times K_{tr}/GRR \quad (8)$$

Wherein GRR: speed reduction ratio of the auxiliary drive device 12 (speed reducing device 72)

The thus calculated basic output torque $T_{RMG}$ base is a basic output torque which would be produced by the RMG 70, if upper and lower limits were not set for the basic output torque $T_{RMGbase}$ in the following step SD34.

Step SD33 is followed by step SD34 corresponding to the second-motor operation limiting means 336, to set the above-indicated values $T_{RMGmaxp}$ and $T_{RMGminp}$ as upper and lower limits of the basic output torque $T_{RMGbase}$ in view of the maximum electric energy output and input $W_{OUT}$ and $W_{IN}$, of the electric energy storing device 112, and set the above-indicated values TRMGmax and TRMGmin as upper and lower limits of the basic output torque TRMGbase in view of the operating temperature of the RMG 70. These settings of the upper and lower limits for the basic output torque $T_{RMGbase}$ are indicated by the following formulas (9) and (10):

$$T_{RMGminp} \leq T_{RMGbase} \leq T_{RMGmaxp} \quad (9)$$

$$T_{RMGmin} \leq T_{RMGbase} \leq T_{RMGmax} \quad (10)$$

The thus limited basic output torque TRMGbase is used as the provisional output torque $T_{RMGtmp}$ of the RMG 70.

Figure 21:
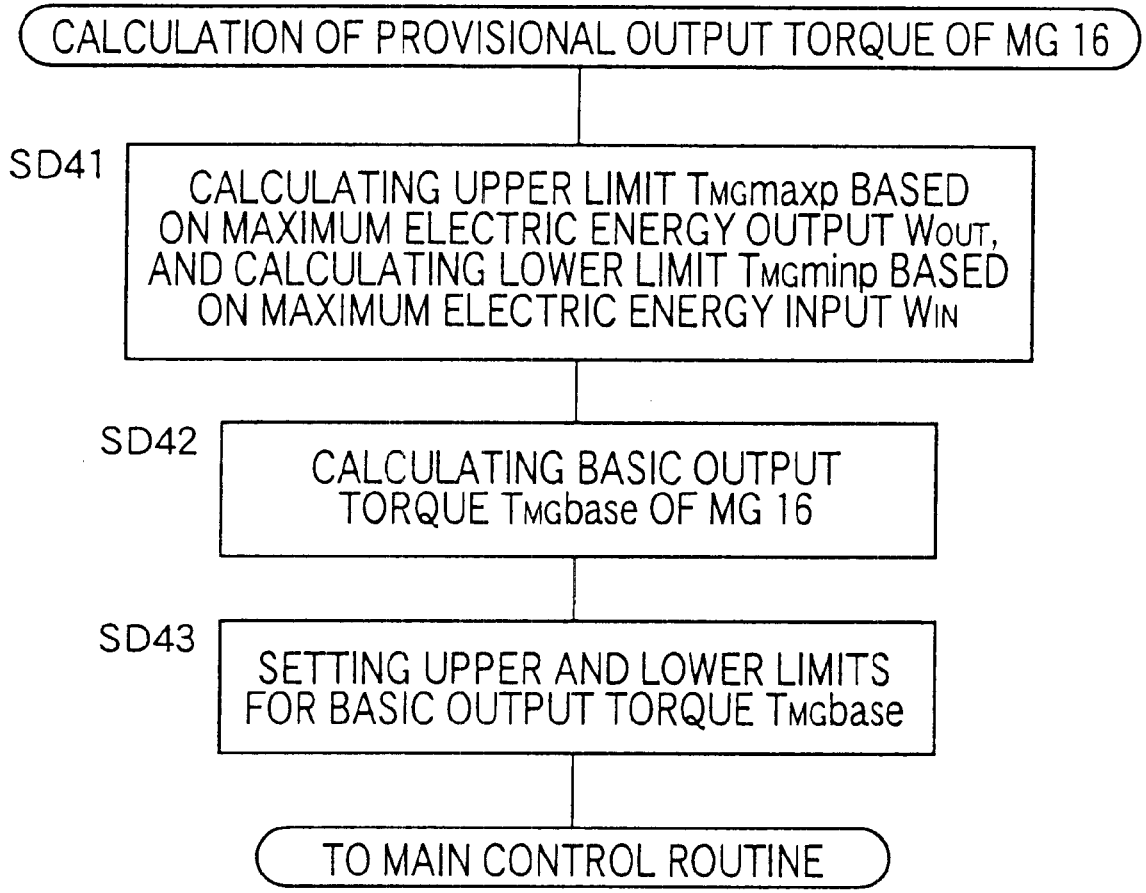
FIG. 21 is a flow chart illustrating a sub-routine for calculating an output torque of the front motor/generator in step SD4 of the control routine of FIG. 18.

Referring back to the control routine of FIG. 18, step SD3 is followed by step SD4 to calculate a provisional output torque $T_{MGtmp}$ of the MG 16 by implementing a provisional front-motor torque calculating sub-routine of FIG. 21. The sub-routine of FIG. 21 is initiated with step SD41 to calculate an upper limit $T_{MGmax}$ of the output torque of the MG 16 on the basis of the maximum electric energy output $W_{OUT}$. Described more specifically, an output $P_{RMG}$ of the RMG 70 is calculated is calculated on the basis of the provisional output torque $T_{RMGtmp}$ of the RMG 70 and according to the following equation (11).

$$P_{RMG}=N_{RMG} \times T_{RMGtmp}+P_{RMGloss}(N_{RMG}, T_{RMG}) \quad (11)$$

Then, a maximum output PMG (=$W_{OUT}-P_{RMG}$) of the MG 16 is calculated on the basis of the calculated output $P_{RMG}$ of the RMG 70, and a maximum output torque $T_{MG}$ of the MG 16 is obtained on the basis of the calculated maximum output PMG and according to the following equation (12).

$$N_{MG} \times T_{MG} + P_{MGloss}(N_{MG}, T_{MG}) = P_{MG} \quad (12)$$

wherein $P_{MGloss}$ ($N_{MG}$, $T_{MG}$): loss of the MG 16

The thus obtained maximum output torque $T_{MG}$ is used as a maximum output torque $T_{MGmaxp}$ of the MG 16.

Further, a minimum output $P_{MG}(=W_{IN}-P_{RMG})$ of the MG 16 is calculated from the output PRMG of the RMG 70, and a minimum output torque $T_{MG}$ of the MG 16 is obtained on the basis of the minimum output $P_{MG}$ of the MG 16 and according to the above equation (12). The thus obtained minimum output $P_{MG}$ is used as a minimum output torque $T_{MGminp}$ of the MG 16.

Then, step SD42 corresponding to the first-motor control means 330 is implemented to calculate a basic output torque $T_{MGbase}$ of the MG 16 on the basis of the operator's desired vehicle drive torque Tdrv, the provisional output torque $T_{RMGtmp}$ of the RMG 70 and the basic output torque $T_{Ebase}$ of the engine 14 and according to the following equation (13).

$$T_{MGbase} = (Tdrv - T_{RMGtmp} \times GRR)/GRF - T_{Ebase} \quad (13)$$

Wherein GRF: speed reduction ratio of the main drive device (planetary gear device 18 and transmission 20)

The first-motor control means 330 controls the MG 16 to produce the calculated basic output torque $T_{MGbase}$. The above equation (13) is formulated to calculate the basic output torque $T_{MGbase}$ of the MG 16 on the basis of a difference of the operator's desired vehicle drive torque Tdrv with respect to a product of the basic output torque $T_{MGbase}$ of the MG 16 and the speed reduction ratio GRR of the auxiliary drive device 12. Therefore, when the output torque of the RMG 70 is limited to the upper limit in step SD34, the basic output torque TMGbase of the MG16 is increased by an amount corresponding to the amount of reduction of the output torque of the RMG 70. Accordingly, the total vehicle drive force or total regenerative braking force is maintained at a value corresponding to the operator's desired vehicle drive force or regenerative braking force. In this respect, it will be understood that step SD42 also corresponds to the first-motor output increasing means 338.

Then, the control flow goes to step SD43 corresponding to the first-motor operation limiting means 334, to set the above-indicated values $T_{MGmaxp}$ and $T_{MGminp}$ as upper and lower limits of the basic output torque $T_{MGbase}$ of the MG 16, in view of the maximum electric energy output $W_{OUT}$ and input $W_{IN}$, and further set the above-indicated values $T_{MGmax}$ and $T_{MGmin}$ as upper and lower limits of the basic output torque $T_{MGbase}$, in view of the operating temperature of the MG 16. These settings of the upper and lower limits for the basic output torque $T_{MGbase}$ are indicated by the following formulas (14) and (15):

$$T_{MGminp} \leq T_{MGbase} \leq T_{MGmax} \quad (14)$$

$$T_{MGmin} \leq T_{MGbase} \leq T_{MGmax} \quad (15)$$

The thus limited basic output torque $T_{MGbase}$ is used as the provisional output torque $T_{MGtmp}$ of the MG 16.

Referring back to the front-rear torque distribution control routine of FIG. 18, step SD4 is followed by step SD5 to calculate a provisional front-wheel (front-axle) torque $T_{ftmp}$ according to the following equation (16), and a provisional rear-wheel (rear-axle) torque $T_{rtmp}$ according the following equation (17).

$$T_{ftmp} = (T_{MG} + T_{Ebase}) \times (N_{IN}/N_{OUT}) \times EF_{CVT} \times GRF \quad (16)$$

$$T_{rtmp} = T_{RMGtmp} \times GRR \quad (17)$$

Step SD5 is followed by step SD6 to determine whether the absolute value of the above-indicated provisional rear-wheel torque $T_{rtmp}$ is equal to or smaller than an absolute value of a product $[(T_{ftmp} + T_{rtmp}) \times K_{tr}]$ of a sum of the provisional front-wheel torque $T_{ftmp}$ and the provisional rear-wheel torque $T_{rtmp}$ and the rear-wheel torque distribution ratio $K_{tr}$, that is, whether a ratio $[T_{rtmp}/(T_{ftmp}+T_{rtmp})]$ of the provisional rear-wheel torque Trtmp to the sum $(T_{ftmp}+T_{rtmp})$ is equal to or lower than the rear-wheel torque distribution ratio $K_{tr}$. If an affirmative decision (YES) is obtained in step SD8, the control flow goes to step SD7 to determine the provisional output torque $T_{RMGtmp}$ as the output torque $T_{RMG}$ of the RMG 70.

Figure 22:
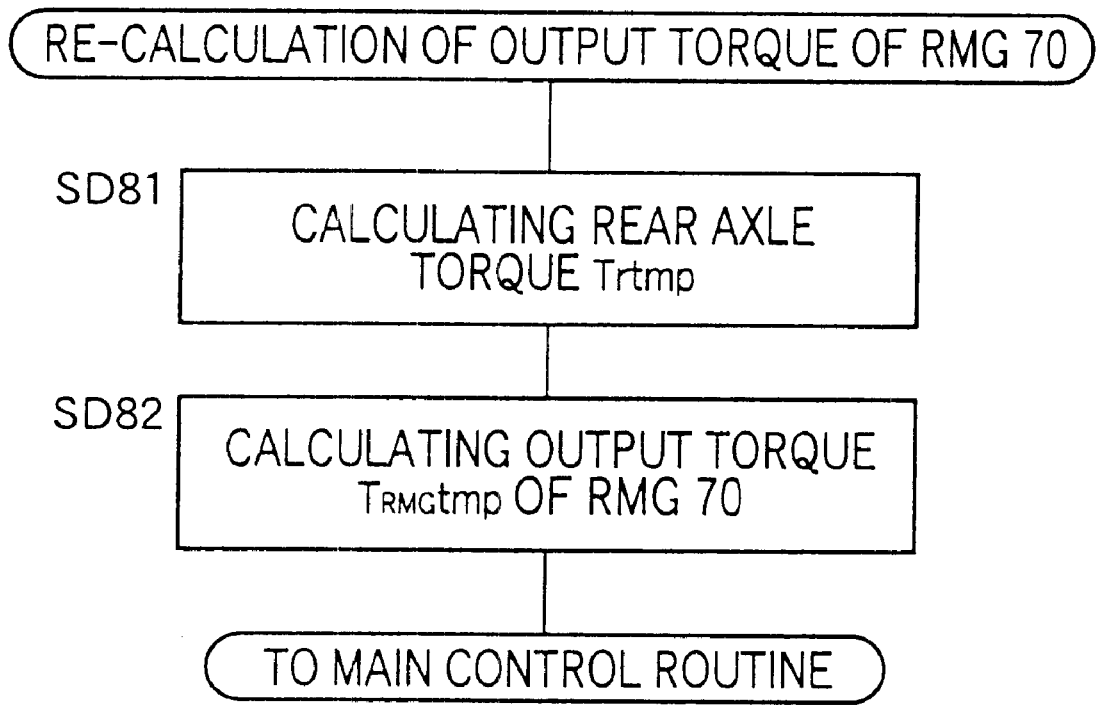
FIG. 22 is a flow chart illustrating a sub-routine for re-calculating the rear motor/generator output torque in step SD8 of the control routine of FIG. 18.

If a negative decision (NO) is obtained in step SD8, the control flow goes to step SD8 to re-calculate the output torque of the RMG 70, before step SD7 is implemented. In step SD8, a rear-motor output-torque re-calculating sub-routine of FIG. 22 is implemented. This sub-routine is initiated with step SD81 to calculate a rear-wheel torque $T_{rtmp}$ on the basis of the provisional front-wheel torque $T_{rtmp}$ and a ratio $[K_{tr}/(1-K_{tr})]$ of the rear-wheel torque distribution ration $K_{tr}$ to the front-wheel torque distribution ratio $(1-K_{tr})$, and according to the following equation (18).

$$T_{rtmp} = T_{rtmp} \times [K_{tr}/(1-K_{tr})] \quad (18)$$

Step SD81 is followed by step SD82 to calculate the provisional output torque $T_{RMGtmp}$ of the RMG 70 on the basis of the rear-wheel torque $T_{rtmp}$ and the speed reduction ratio GRR of the auxiliary drive device 12 and according to the following equation (19).

$$T_{RMGtmp} = T_{ramp} \times GRR \quad (19)$$

If the output torque of the MG 16 is reduced to the upper limit in step SD43, a ratio $[T_{tmp}/(T_{ftmp}+T_{rtmp})]$ of the provisional rear-wheel torque $T_{rtmp}$ to a sum $(T_{ftmp}+T_{rtmp})$ of the provisional front-wheel torque $T_{ftmp}$ and the provisional rear-wheel torque $T_{tmp}$ may be higher than the rear-wheel torque distribution ratio $K_{tr}$. In this case, the provisional rear-wheel torque $T_{rtmp}$ as calculated according to the above equation (18) is reduced by an amount corresponding to the amount of reduction of the output torque of the MG 16 in step SD43, so that the ratio $(T_{rtmp}/T_{ftmp})$ of the provisional rear-wheel torque $T_{rtmp}$ to the provisional front-wheel torque $T_{ftmp}$ is made equal to the desired ratio $[K_{tr}/(1-K_{tr})]$ of the rear-wheel torque distribution ratio $K_{tr}$ to the front-wheel torque distribution ratio $(1-K_{tr})$, namely, so that the actual front-rear drive force distribution ratio or the actual front-rear regenerative braking force distribution ratio coincides with the desired ratio $[K_{tr}/(1-K_{tr})]$. In this respect, it will be understood that step SD8 corresponds to the second-motor output reducing means 340.

Figure 15:
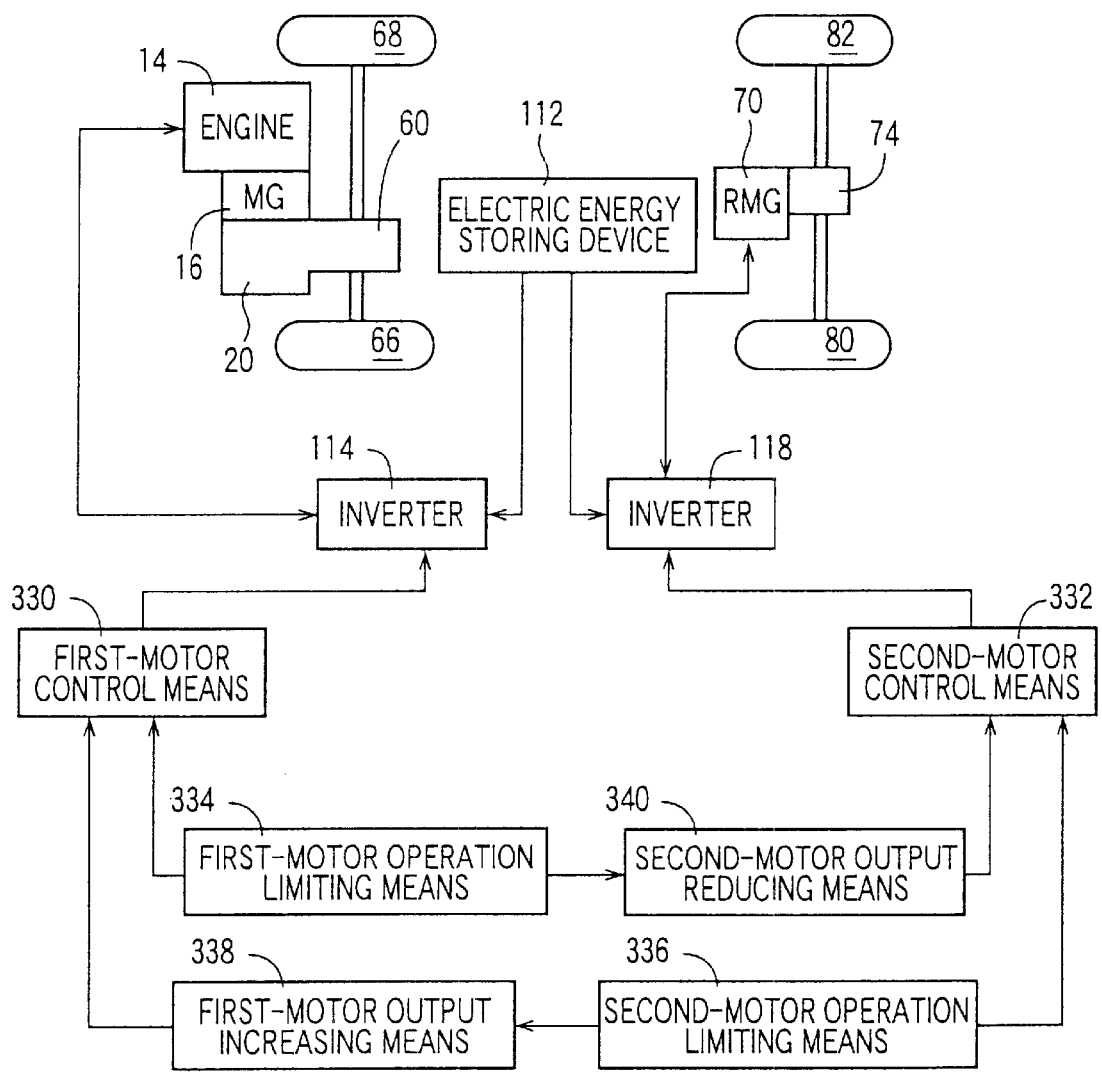
FIG. 15 is a block diagram illustrating further functional means also incorporated in the hybrid control device of FIG. 3.

According to the arrangement of FIG. 15 described above, the first electric motor in the form of the MG 16 and the second electric motor in the form of the RMG 70 are operated and controlled in view of their thermal ratings, so as to drive the front and rear wheels with an adequate front-rear torque distribution ratio for improved stability of drivability of the vehicle.

It is appreciated that the thermal rating of the MG 16 (first electric motor) is higher than that of the RMG 70 (second electric motor), in other words, the thermal rating of the RMG 70 used to drive the rear wheels 80, 82 is lower than that of the MG 16 used to drive the front wheels 66, 68, so that the output of the rear-wheel driving RMG 70 is first limited, and then the output of the front-wheel driving MG 16 is limited, if necessary. In this respect, a reduction of the drive force of the rear wheels 80, 82 has a comparatively small effect on the running stability of the vehicle.

Further, the drive force or regenerative braking force produced by the MG 16 is increased by the first-motor output increasing means 338 (step SD42) when the drive force or regenerative braking force produced by the RMG 70 is limited by the second-motor operation limiting means 336 (step SD34), so that the total vehicle drive force or regenerative braking force is maintained at a desired value, while assuring a comparatively high degree of running stability of the vehicle. When the output of the RMG 70 to drive the rear wheels 80, 82 is limited, for example, the output of the MG 16 to drive the front wheels 66, 68 is increased without a reduction of the total vehicle drive force from the operator's desired vehicle drive force. When the regenerative braking force generated by the RMG 70 is limited, the regenerative braking force generated by the MG 16 is increased without a reduction of the total vehicle braking force. Thus, the vehicle can be driven with high drivability with the desired total vehicle drive force, and can be braked with high stability with the desired total regenerative braking force, even when the output of the RMG 70 is limited.

In addition, when the operation of the MG 16 is limited by the first-motor operation limiting means 334 (step SD43), the operation of the RMG 70 is limited by the second-motor output reducing means 340 (step SD8) so that the front-rear torque distribution ratio is maintained at the desired value, that is, so that the torque distribution ratio of the rear wheels 80, 82 is maintained at the desired value $K_{tr}$. Accordingly, the running stability is not deteriorated even when the operation of the MG 16 is limited. When the drive force of the RMG 70 is limited, for instance, the drive force of the RMG 70 is reduced so that the desired front-rear torque distribution ratio or the desired rear-wheel torque distribution ratio Ktr is maintained, or alternatively, the drive force of the RMG 70 is zeroed to drive the vehicle in the front-wheel driving mode with only the front wheels 66, 68. When the regenerative braking force generated by the MG 16 is reduced, the regenerative braking force generated by the RMG 70 is reduced, for maintaining the running stability of the vehicle. Thus, the desired total vehicle drive force or regenerative braking force is obtained, even when the operation of the MG 16 is limited by the first-motor operation limiting means 334.

Referring next to the flow chart of FIG. 23, there will be described a control routine executed by the hybrid control device 104, according to a second embodiment of this invention, in place of the control routine of FIG. 9 according to the first embodiment. This second embodiment is different from the first embodiment, only in that the control routine of FIG. 23 does not include step SA1, and includes step SA30 which is implemented when the affirmative decision (YES) is obtained in step SA2. The same reference signs as used in FIG. 9 of the first embodiment will be used in FIG. 23, to identify the corresponding steps, and a redundant description of these steps will not be provided.

Step SA30 is implemented to determine whether the ambient temperature is lower than a predetermined lower limit below which the friction coefficient of the road surface is extremely low, and whether the vehicle is being started on an uphill road surface, that is, whether the gradient of the road surface is larger than a predetermined upper limit. The determination as to whether the gradient of the road surface is larger than the upper limit may be effected on the basis of the output signal of the longitudinal vehicle acceleration sensor (G sensor). In this respect, it is noted that the gradient of the road surface is reflected by a difference between a longitudinal acceleration value of the vehicle as detected and stored by the longitudinal acceleration sensor when the vehicle is stationary or coasting without an operation of the accelerator pedal 124, and a longitudinal acceleration value of the vehicle as detected immediately before the initiation of the vehicle starting. Thus, the determination as to whether the vehicle is being started on an uphill road surface can be effected based on the above-indicated difference. This manner of determination does not cause an erroneous determination that the vehicle is being started on an uphill road surface, when the vehicle is in fact being abruptly started on a flat road surface with a relatively high acceleration value.

If an affirmative decision (YES) is obtained in step SA30, the control flow goes to steps SA16–SA18 described above by reference to the flow chart of FIG. 9, so that the first output torque range of the RMG 70 is selected and the RMG 70 is operated within the selected first output torque range, to drive the rear wheels with a relatively large drive force, for thereby driving the vehicle in the four-wheel driving mode with a sufficiently large total drive force. If a negative decision (NO) is obtained in step SA30, the control flow goes to steps SA19–SA22 and SA18, so that the second output torque range of the RMG 70 is selected and the RMG 70 is operated within the second output torque range whose upper limit is smaller than that of the first output torque range. Accordingly, the rear wheels are driven by the RMG 70 with a relatively small drive force which is sufficient to drive the vehicle in the four-wheel driving mode on a flat road surface having a relatively high friction coefficient. In this case, the RMG 70 is operated with a comparatively small load, requiring a comparatively small amount of electric energy consumption.

While step SA30 is formulated to determine whether the ambient temperature is lower than the lower limit while the vehicle is being started on an uphill road surface whose gradient is larger than the upper limit, step SA30 may be modified to determine whether the ambient temperature is lower than the lower limit or the vehicle is being started on an uphill road surface. In this case, steps SA16–SA18 are implemented to operate the RMG 70 within the first output torque range to drive the rear wheels with a comparatively large drive force, if the ambient temperature is lower than the lower limit, or if the vehicle is being started on an uphill road surface. If the ambient temperature is not lower than the lower limit while the vehicle is not being started on an uphill road surface, steps SA19–SA22 and SA18 are implemented to operate the RMG 70 within the second output torque range to drive the rear wheels with a comparatively small drive force.

Figure 23:
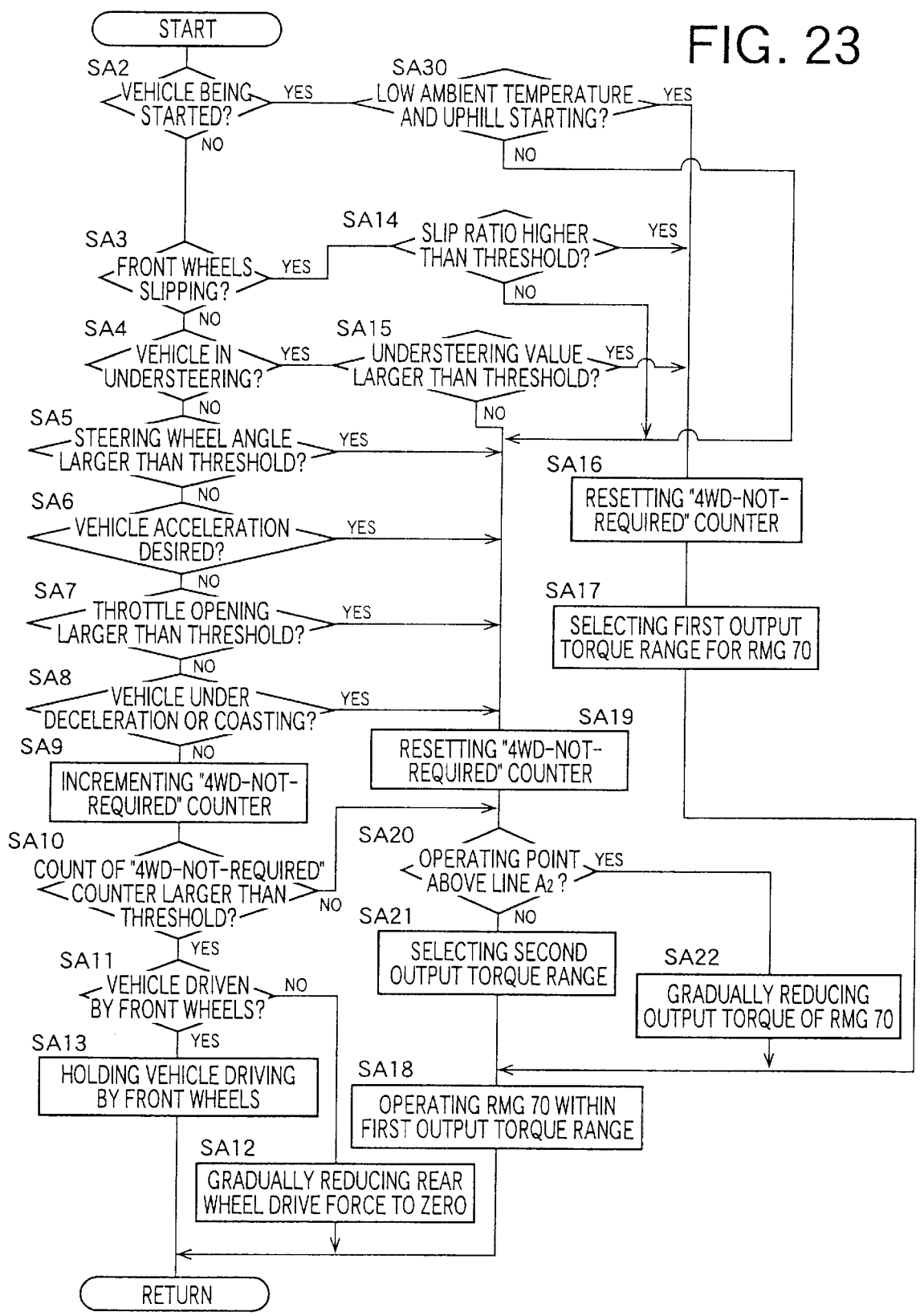
FIG. 23 is a flow chart illustrating a control routine executed in place of the control routine of FIG. 9, according to another embodiment of this invention.
Figure 24:
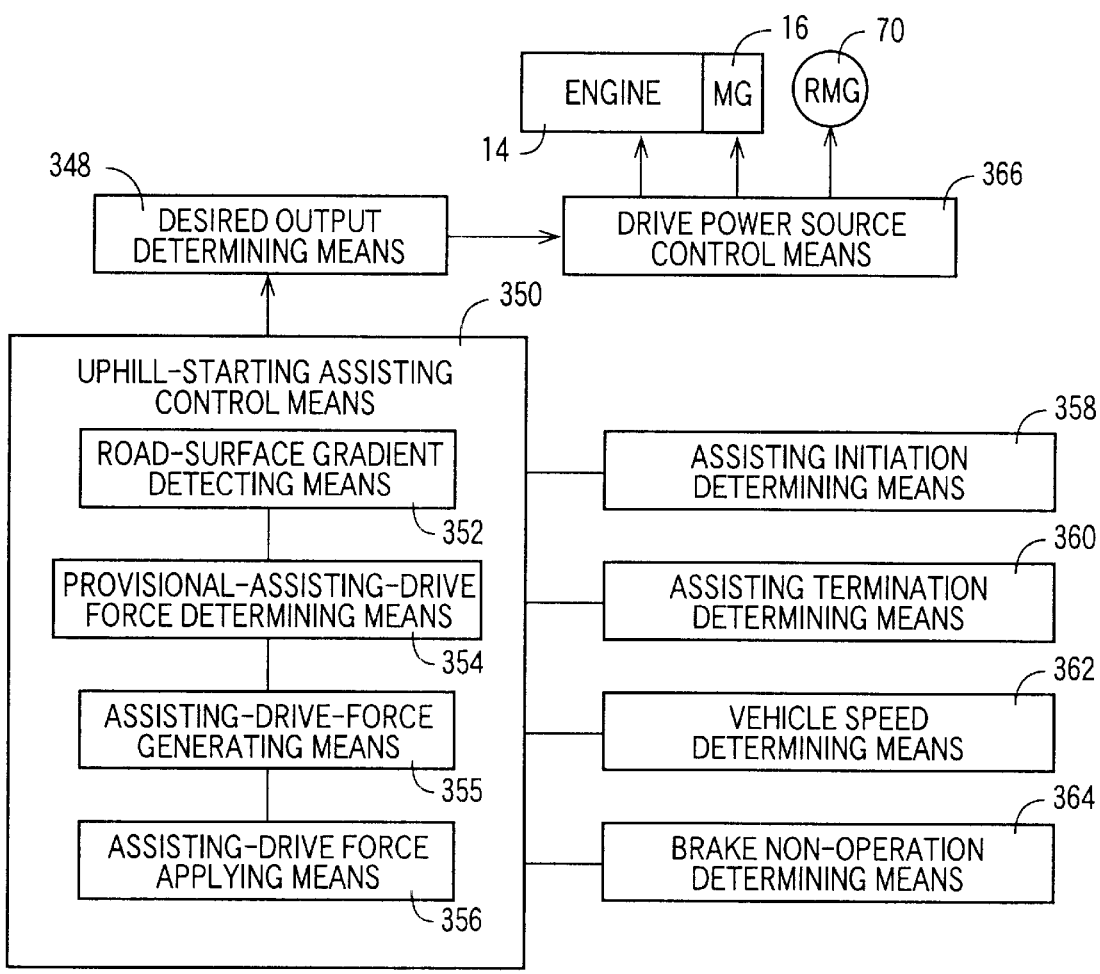
FIG. 24 is a block diagram illustrating further functional means also incorporated in the hybrid control device of FIG. 3.

The hybrid control device 104 according to the first embodiment of FIG. 3 or the second embodiment of FIG. 23 further incorporates functional means as shown in the block diagram of FIG. 24. These functional means are adapted to operate the RMG 70 for driving the rear wheels 80, 82 to provide an assisting drive torque according to a predetermined front-rear torque distribution ration, for temporarily increasing the total vehicle drive force when the vehicle is started with the front wheels 66, 68 on an uphill road surface having a relatively high friction coefficient. The functional means include desired-output determining means 348, uphill-starting assisting control means 350, assisting initiation determining means 358, assisting termination determining means 360, vehicle speed determining means 362, brake non-operation determining means 364 and drive power source control means 366.

Figure 25:
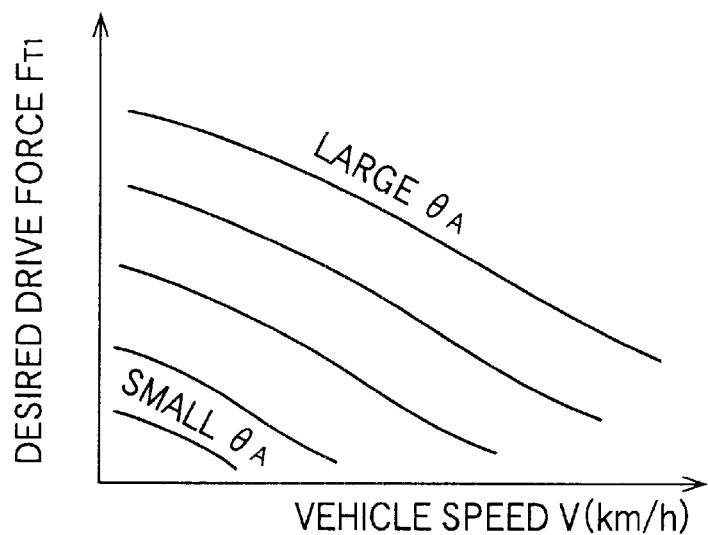
FIG. 25 is a graph indicating a stored data map used by desired output determining means of FIG. 24 to determine a desired drive force.

The desired-output determining means 348 is adapted to an operator's desired vehicle drive force $F_{T1}$, on the basis of the operating amount of the accelerator pedal 122 (opening anlgle $\theta_A$ of the throttle valve) and the vehicle speed V and according to a predetermined relationship (represented by a stored data map) among these parameters $F_{T1}$, $\theta_A$ and V. An example of this relationship is indicated in the graph of FIG. 25. This relationship was obtained by experiments such that the operator's desired vehicle drive force values or vehicle acceleration values is determined by the presently established specific combination of the opening anlgle $\theta_A$ of the throttle valve and the vehicle speed V.

The uphill-starting assisting control means 350 is adapted to apply an assisting drive force to the vehicle before starting of the vehicle on an uphill road surface, so that a descending speed of the vehicle, that is, a speed at which the vehicle is moved down on the uphill road surface in the reverse direction upon initiation of the vehicle starting is held lower than a predetermined small value, for example, about 1–3 km/h. The uphill-starting control means 350 may be modified to aply an assisting drive force to the vehicle before starting of the vehicle on the uphill road surface, so that the acceleration value of the vehicle during downward movement in the reverse direction on the uphill road surface is held lower than a predetermined small value, for example, about 1.0 m/s². The assisting drive force applied to the vehicle by the uphill-starting assisting control means 350 is determined as a function of the gradient of the uphill road surface, and the thus determined assisting drive force is kept applied to the vehicle until the ascending speed of the vehicle has reached a predetermined value as a result of the vehicle starting initiated by an operation of the accelerator pedal 122.

The uphill-starting assisting control means 350 includes road-surface gradient detecting means 352, provisional-assisting-drive-force determining means 354, assisting-drive-force generating means 355, and assisting-drive-force applying means 356. The road-surface gradient detecting means 352 is adapted to detect a longitudinal acceleration value $G_{xstp}$ of the vehicle as detected by the longitudinal acceleration sensor when the vehicle is stationary on the uphill road surface, with an operation of the brake pedal 124. This longitudinal acceleration value $G_{xstp}$ as measured based on the output signal of the longitudinal acceleration sensor, represents the gradient of the uphill road surface on which the vehicle is to be started. The thus detected longitudinal acceleration value $G_{xstp}$ is stored in a suitable memory.

Figure 26:
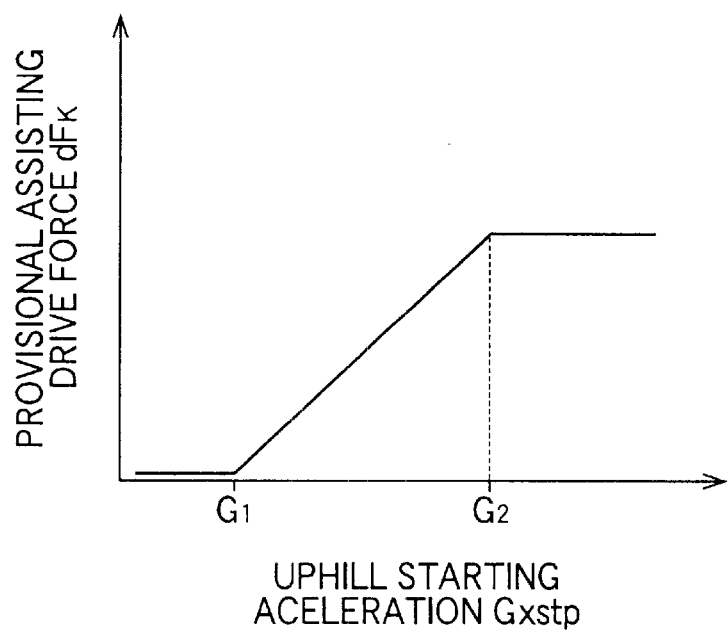
FIG. 26 is a graph indicating a stored data map used by provisional-compensated-drive-force determining means of FIG. 24 to determine a provisional compensated drive force.

The provisional-assisting-drive-force determining means 354 is adapted to determine a provisional assisting drive force $dF_K$ on the basis of the longitudinal acceleration value $G_{xstp}$ (corresponding to the gradient of the uphill road surface) and according to a predetermined relationship between these parameters $dF_K$ and $G_{xstp}$, which relationship is represented by a stored data map and is shown in the graph of FIG. 26 by way of example. The provisional compensated drive force $dF_K$ is a provisionally determined drive force value for reducing the descending speed of the vehicle upon starting on the uphill road surface.

Figure 27:
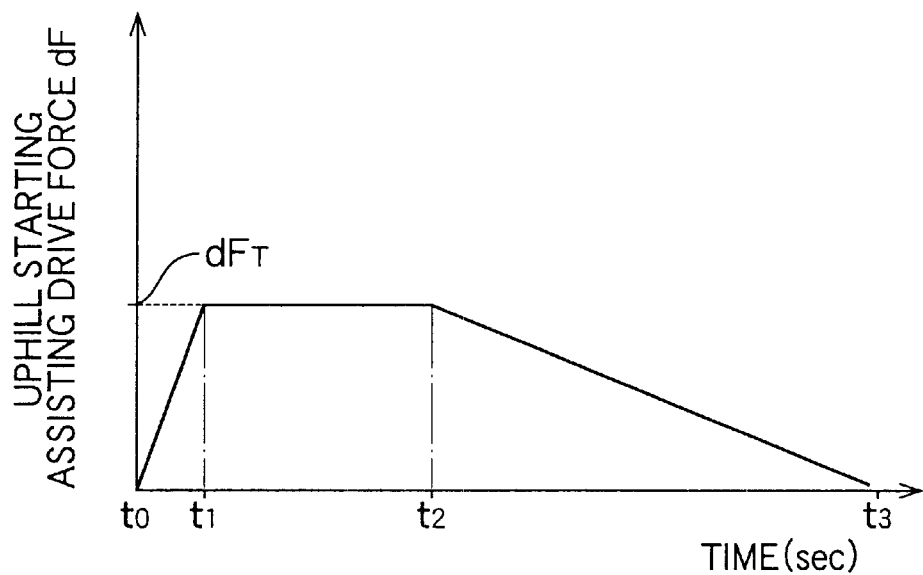
FIG. 27 is a graph indicating a stored data map used by compensated-drive-force generating means to generate a compensated drive force.

The provisional-drive-force generating means 355 is operated on the basis of the provisional assisting drive force $dF_K$ determined by the provisional-assisting-drive-force determining means 354. The assisting-drive-force generating means 355 is adapted to generate an assisting drive force dF which relatively rapidly rises or increases to the determined provisional assisting drive force $dF_K$ for an initial period (t0–t1) of about 0.2 second after initiation of operation of the RMG 70, and which relatively slowly falls or decreases from the provisional assisting drive force $dF_K$ to zero for a terminal period (t2–t3) of about 1–2 seconds during termination of operation of the RMG 70, as illustrated in the graph of FIG. 27.

The provisional-assisting-drive-force applying means 356 is adapted to add the assisting drive force dF to the operator's desired drive force $F_{T1}$, in order to apply the assisting drive force dF to the vehicle. The relationship between the provisional assisting drive force $dF_K$ and the longitudinal acceleration value $G_{xstp}$, as shown in FIG. 26, was obtained by experiments such that the provisional assisting drive force $dF_K$ is determined by the presently detected longitudinal acceleration value $G_{xstp}$ so that the descending speed of the vehicle on the uphill road surface can be limited to within a predetermined range (e.g., about 1–3 km/h) upon starting of the vehicle on the uphill road surface whose gradient is represented by the longitudinal acceleration value Gxstp. As indicated in FIG. 26, the relationship is determined such that the provisional assisting drive force $dF_K$ linearly increases with an increase in the longitudinal acceleration value $G_{xstp}$, within a predetermined range (G1–G2) of the longitudinal acceleration value. When the longitudinal acceleration value $G_{xstp}$ is lower than the lower limit G1 of the above-indicated predetermined range (G1–G2), the descending speed of the vehicle is lower than the lower limit (e.g., about 1 km/h) of the above-indicated predetermined range, even in the absence of the assisting drive force applied to the vehicle. According to the predetermined relationship of FIG. 26, the rate of increase of the provisional assisting drive force $dF_K$ with an increase longitudinal acceleration value Gxstp is made lower when the value $G_{xstp}$ is higher than the upper limit G2, than when the value $G_{xstp}$ is lower than the upper limit G2.

Figure 28:
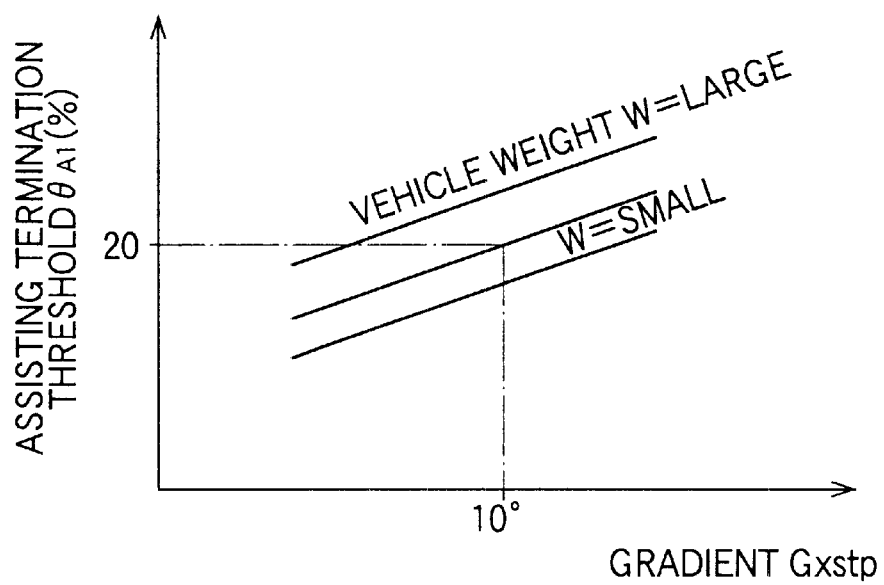
FIG. 28 is a graph indicating a stored data map used by compensation initiation determining means to determine a threshold used for determining whether the compensation is required or not.

The assisting initiation determining means 358 is adapted to determine whether the application of the assisting drive force dF of the RMG 70 to the vehicle is necessary or not. This determination is effected by determining whether the detected opening anlgle $\theta_A$ of the throttle valve (operating amount of the accelerator pedal 122) is larger than a predetermined threshold $\theta_{A1}$, which is determined according to a functional equation $\theta_{A1}=(G_{xstp}, W)$, that is, determined as a function of the detected road surface gradient represented by the longitudinal acceleration value $G_{xstp}$, and a weight W of the vehicle, as indicated in the graph of FIG. 28. In other words, the above-indicated threshold $\theta_{A1}$ is determined on the basis of the longitudinal acceleration value $G_{xstp}$ and the vehicle weight W and according to the predetermined relationship of FIG. 28 among these parameters $\theta_{A1}$, $G_{xstp}$ and W.

The assisting termination determining means 360 is adapted to determine whether the application of the assisting drive force dF to the vehicle should be terminated or not. This determination is effected by determining whether the detected opening angle $\theta_A$ of the throttle valve is larger than a predetermined threshold $\theta_{A2}$, which is determined according to a functional equation $\theta_{A2}=(G_{xstp}, W)$. The uphill-starting assisting control means 350, more precisely, its assisting-drive-force applying means 356 is not operated when the assisting initiation determining means 358 determines that the application of the assisting drive force dF is not necessary, and is operated to initiate the application of the assisting drive force dF when the determining means 358 determines that the application of the assisting drive force dF is necessary, for instance, when the opening anlgle $\theta_A$ of the throttle valve has exceeded the threshold value $\theta_{A1}$ (e.g., about 20%) which corresponds to a threshold (e.g., about 10 degrees) of the uphill road surface gradient above which the application of the assisting drive force dF is considered necessary. The assisting-drive-torque applying means 356 is turned off to terminate the application of the assisting drive force dF when the assisting termination determining means 360 determines that the application should be terminated during the vehicle starting on the uphill road surface, that is, when the opening anlgle $\theta_A$ has exceeded the threshold value $\theta_{A2}$ above which the vehicle drive force is considered to have been sufficiently increased as a result of an increase in the operating amount of the accelerator pedal 122 to start the vehicle on the uphill road surface.

The vehicle-speed determining means 362 is adapted to determine whether the vehicle speed V is higher than a predetermined threshold V1 (e.g., about 1–3 km/h), and the brake non-operation determining means 364 is adapted determine whether the brake pedal 124 is kept in its non-operated position for more than a predetermined time T1. The uphill-starting assisting control means 350, more precisely, its assisting-drive-force applying means 356 applies the assisting drive force dF to the vehicle when the vehicle-speed determining means 362 determines that the vehicle speed V is not higher than the threshold V1, or when the brake non-operation determining means 364 determines that the brake pedal 124 has not been kept in its non-operated position for more than the predetermined time T1. On the other hand, the assisting-drive-force applying means 356 does not apply the assisting drive force dF to the vehicle when the vehicle-speed determining means 362 determines that the vehicle speed V is higher than the threshold V1, or when the brake non-operation determining means 364 determines that the brake pedal 124 has been kept in its non-operated position for more than the predetermined time T1. Thus, the assisting-drive-force applying means 356 applies the assisting drive force dF of the RMG 70 to the vehicle while the vehicle is held stationary or the vehicle speed V is lower than the extremely low value V1, or while the brake pedal 124 is in an operated position or has not been kept in its non-operated position for more than the predetermined time T1.

The drive power source control means 366 is adapted control the drive power source so that the drive power source produces an increased desired vehicle drive force $F_{T2}=F_{T1}+dF$, which is a sum of the operator's desired vehicle drive force $F_{T1}$ and the assisting drive force dF applied by the assisting-drive-force applying means 356. For instance, the drive power source control means 366 operates the engine 14 and/or the MG 16 so as to produce the operator's desired drive force $F_{T1}$ for driving the front wheels 66, 68, and further operates the RMG 70 to produce the assisting drive force $F_{T2}$ for driving the rear wheels 80, 82, in order to start the vehicle on the uphill road surface. As a result, the speed at which the vehicle is moved down on the uphill road surface before an operation of the accelerator pedal 122 is held at a low value of about 1–3 km/h, with the assisting drive force dF being applied to the vehicle through the rear wheels 80, 82. After the accelerator pedal 122 has been operated to initiate the vehicle starting on the uphill road surface, the vehicle is driven in the four-wheel driving mode with the increased desired drive force $F_{T2}$.

Referring to the flow charts of FIGS. 29 and 30, there will be described an operation of the hybrid control device 104 having the functional means shown in FIG. 24. The flow chart of FIGS. 29 illustrates a drive force control routine, while the flow chart of FIG. 30 illustrates a sub-routine implanted in step SE of the control routine of FIG. 29, for calculating the assisting drive force produced upon starting of the vehicle on an uphill road surface.

Figure 29:
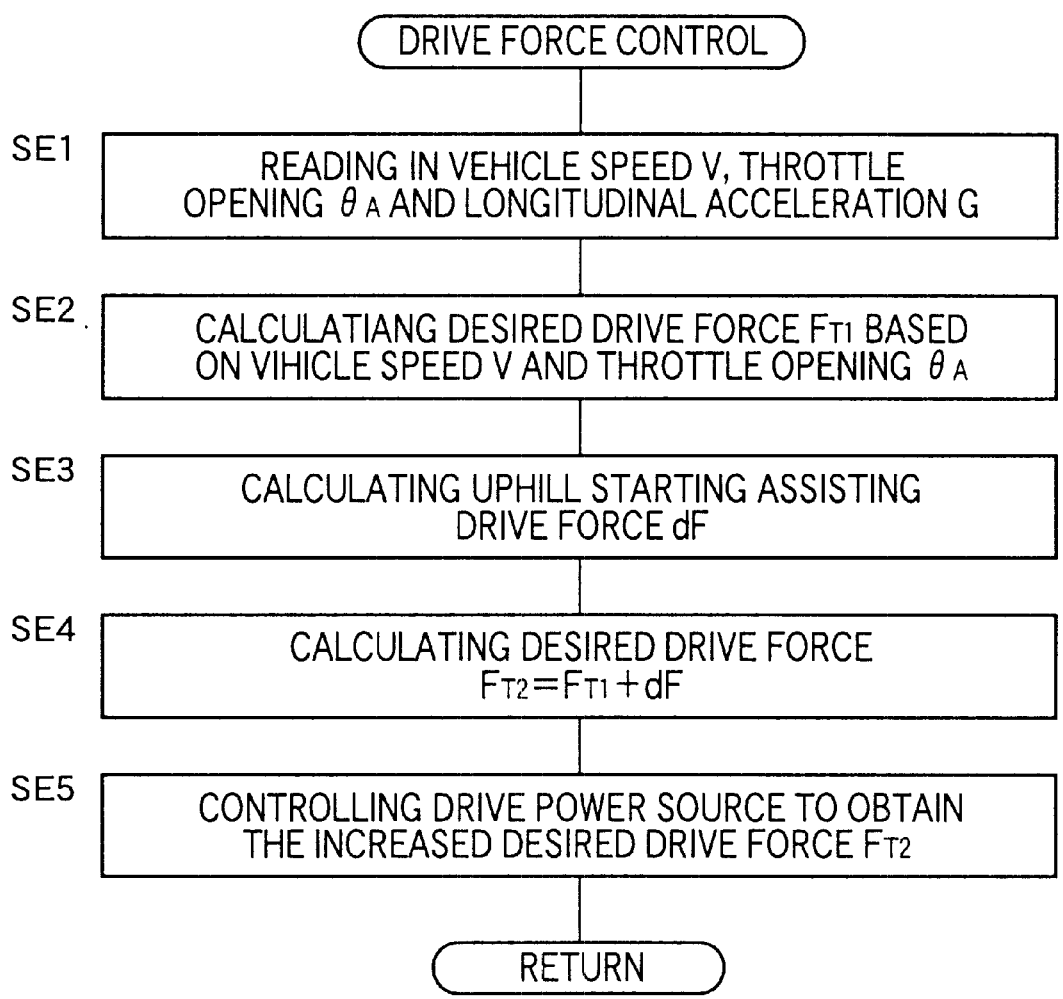
FIG. 29 is a flow chart illustrating a drive force control routine executed by the hybrid control device having the functional means of FIG. 24.

The drive force control routine of FIG. 29 is initiated with step SE1 to read in the output signals of the various sensors such as those representative of the vehicle speed V, the opening anlgle $\theta A$ of the throttle valve (corresponding to the operating amount of the accelerator pedal 122), the longitudinal acceleration value Gx of the vehicle. Step SE1 is followed by step SE2 corresponding to the desired output determining means 348, to calculate the operator's desired vehicle drive force $F_{T1}$ on the basis of the opening anlgle $\theta A$ of the throttle valve and the vehicle speed V and according to the predetermined relationship of FIG. 25. Then, the control flow goes to steps SE3 and SE4 corresponding to the uphill-starting assisting control means 350, to calculate the assisting drive force dF corresponding to the gradient of the uphill road surface, and the increased desired drive force $F_{T2}=F_{T1}+dF$. As described above, the assisting drive force dF is applied before the vehicle starting is initiated and until the vehicle speed has increased to a predetermined value as a result of the vehicle starting initiated by an operation of the accelerator pedal 122. The calculated assisting drive force dF permits the descending speed of the vehicle on the uphill road surface to be held below the relatively low upper limit (e.g., 1–3 km/h).

Figure 30:
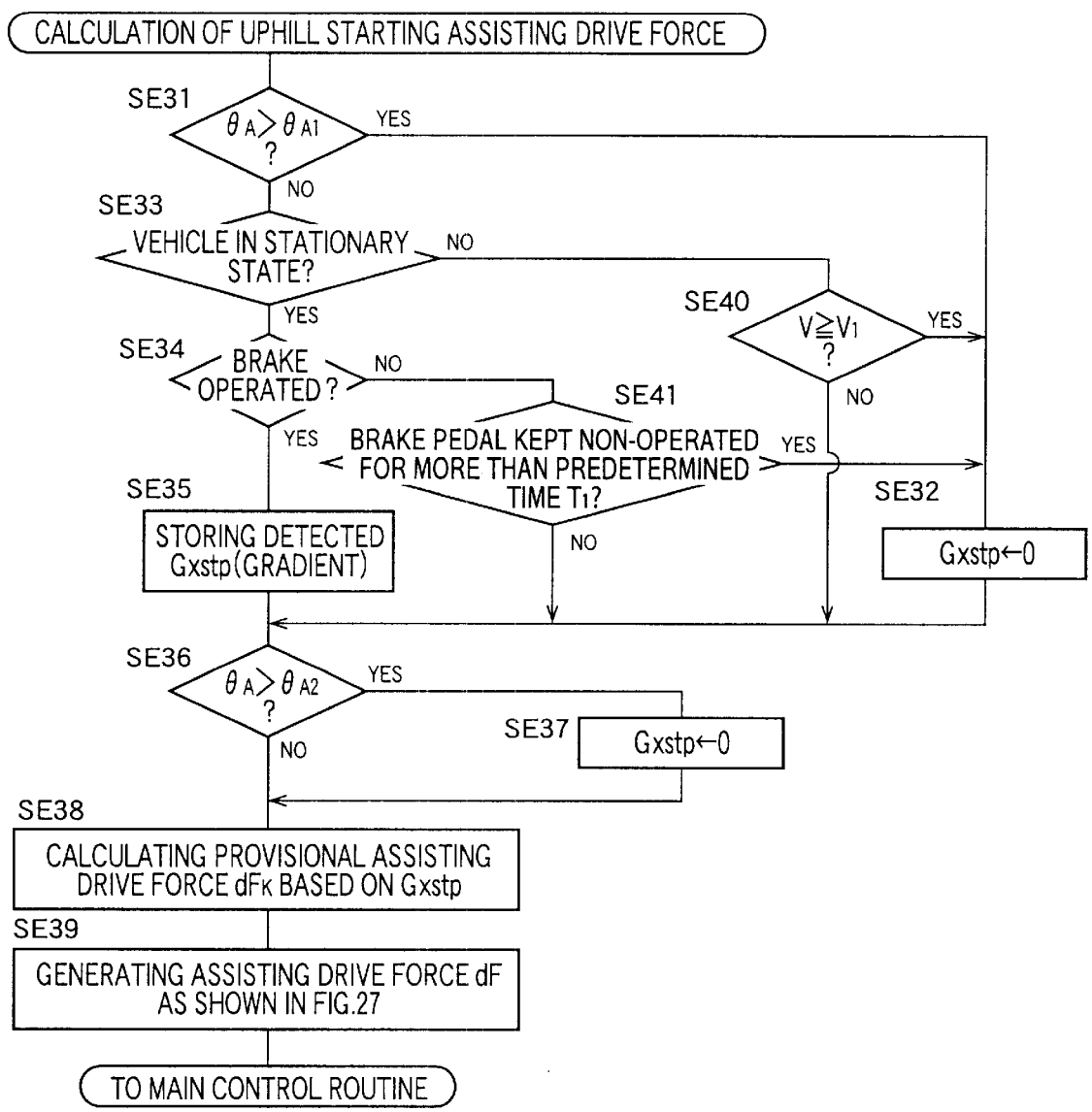
FIG. 30 is a flow chart illustrating a control routine executed by the hybrid control device to calculate an uphill starting compensated drive force.

In step SE3, the sub-routine illustrated in the flow chart of FIG. 30 is implemented to calculate the assisting drive force dF. This sub-routine is initiated with step SE31 corresponding to the assisting initiation determining means 358, to determine whether the application of the assisting drive force dF to the vehicle is necessary. This determination is effected by determining whether the opening anlgle $\theta_A$ of the throttle valve has exceeded the threshold $\theta_{A1}$, which is determined on the basis of the detected road surface gradient $G_{xstp}$ and vehicle weight W and according to the predetermined relationship of FIG. 28. Namely, the threshold $\theta_{A1}$ is determined as a function of the longitudinal acceleration value (representing the road surface gradient $G_{xstp}$) and the weight W. If an affirmative decision (YES) is obtained in step SE31, it means that the accelerator pedal 122 has been operated by a comparatively large amount (e.g., to a 20% position). In this case, the control flow goes to step SE32 in which the memory storing the detected longitudinal acceleration value $G_{xstp}$ is reset to zero so that the assisting drive force dF is zeroed, with a result of inhibiting the calculation of the assisting drive force dF.

If a negative decision (NO) is obtained in step SE1, it means that the accelerator pedal 122 has not been operated to start the vehicle. In this case, the control flow goes to steps SE33, SE34 and SE35 corresponding to the road-surface gradient detecting means 352. Step SE33 is provided to determine whether the vehicle is stationary. This determination is effected on the basis of the detected vehicle speed V. Step SE34 is provided to determine whether the brake pedal 124 is in an operated position. This determination is made on the basis of the output signal of a brake switch provided to detect an operation of the brake pedal 124. Step SE35, which is implemented when an affirmative decision (YES) is obtained in both steps SE33 and SE34, is provided to store the presently detected longitudinal acceleration value Gxstp in the appropriate memory, as a value representative of the road surface gradient.

Step SE35 is followed by step SE36 corresponding to the assisting termination determining means 360, to determine whether the application of the assisting drive force dF to the vehicle has become unnecessary, as a result of an increase of the vehicle drive force caused by an operation of the accelerator pedal 122 to start the vehicle on the uphill road surface. This determination is effected by determining whether the opening angle $\theta_A$ of the throttle valve has exceeded the threshold $\theta_{A1}$. If an affirmative decision (YES)

is obtained in step SE36, the control flow goes to step SE37 in which the memory storing the longitudinal acceleration value $G_{xstp}$ is reset to zero, so that the assisting drive force dF is zeroed, with a result of inhibiting the calculation of the assisting drive force dF.

If a negative decision (NO) is obtained in step SE36, the control flow goes to step SE38 corresponding to the provisional-drive-force determining means 354, to calculate the provisional assisting drive force $dF_K$ for reducing the descending speed of the vehicle on the uphill road surface, on the basis of the longitudinal acceleration value Gxstp representative of the gradient of the uphill road surface and according to the predetermined relationship of FIG. 26. Then, step SE39 corresponding to the assisting-drive-force generating means 355 is implemented to calculate and generate the assisting drive force dF from time to time, on the basis of the determined provisional assisting drive force $dF_K$, such that the assisting drive force dF relatively rapidly rises or increases to the determined provisional assisting drive force $dF_K$ for the initial period (t0–t1) of about 0.2 second after initiation of the application of the assisting drive force dF, and relatively slowly falls or decreases from the provisional assisting drive force $dF_K$ to zero for the terminal period (t2–t3) of about 1–2 seconds during termination of the application, as illustrated in the graph of FIG. 27.

If a negative decision (NO) is obtained in step SE33, the control flow goes to step SE40 corresponding to the vehicle-speed determining means 362, to determine whether the vehicle speed V has increased to the predetermined upper limit V1 (e.g., about 1–3 km/h). If a negative decision (NO) is obtained in step SE40, it means that the vehicle speed V has not been increased to a sufficiently high value as a result of the vehicle starting on the uphill road surface. In this case, the control flow go steps SE36–SE39 for continuing the application of the assisting drive force dF to the vehicle. If an affirmative decision (YES) is obtained in step S40, it means that the vehicle has been started with a result of an increase of the vehicle speed V to a sufficiently high value. In this case, the application of the assisting drive force dF is no longer necessary, and the control flow goes to step SE32 for terminating the application of the assisting drive force dF.

If a negative decision (NO) is obtained in step SE34, the control flow goes to step SE41 corresponding to the brake non-operation determining means 364, to determine whether the brake pedal 124 has been kept in its non-operated position for more than the predetermined time T1 (e.g., about one second). If a negative decision (NO) is obtained in step SE41, it means that the vehicle operator may have an intention of starting the vehicle. In this case, the control flow goes to steps SE36–S39 for continuing the application of the assisting drive force dF for starting the vehicle on the uphill road surface. If an affirmative decision (YES) is obtained in step SE41, it is considered that the vehicle operator does not have an intention of starting the vehicle on the uphill road surface. In this case, the application of the assisting drive force dF is not necessary, and the control flow goes to step SE32 to terminate the application of the assisting drive force dF.

Referring back to the drive force control routine of FIG. 29, step SE3 is followed by step SE4 corresponding to the assisting-drive-force applying means 356, wherein the assisting drive force dF calculated by the assisting-drive-force generating means 356 is added to the operator's desired vehicle drive force $F_{T1}$, to obtain the increased desired vehicle drive force $F_{T2}$. Step SE4 is followed by step SE5 corresponding to the drive power source control means 366, in which the drive power source (14, 16, 70) of the vehicle is controlled so as to generate the increased desired vehicle drive force $F_{T2}$, calculated in step SE4, namely, a sum ($F_{T1}$+dF) of the vehicle operator's desired vehicle drive force $F_{T1}$ and the assisting drive force dF calculated in step SE39. For instance, the engine 14 and/or the MG 16 is/are operated to drive the front wheels 66, 68 with the operator's desired vehicle drive force $F_{T1}$, while the RMG 70 is operated to drive the rear wheels 80, 82 with the assisting drive force dF, so that the total vehicle drive force is equal to the increased desired vehicle drive force $F_{T2}$.

As described above, the longitudinal acceleration value $G_{xstp}$ stored in the memory is zeroed in step SE32 or SE37 so that the assisting drive force dF calculated in step SE39 is zeroed to terminate or inhibit the application of the assisting drive force dF, in the following four cases: 1) when the affirmative decision is obtained in step SE31, namely, when the assisting initiation determining means 358 determines that the application of the assisting drive force dF is unnecessary; 2) when the affirmative decision is obtained in step SE36, namely, when the assisting termination determining means 360 determines that the opening anlgle $\theta_A$ of the throttle valve has exceeded the threshold $\theta_{A2}$ during application of the assisting drive force dF; 3) when the affirmative decision is obtained in step SE40, namely, when the vehicle-speed determining means 362 determines that the vehicle speed V is equal to or higher than the threshold V1; and 4) when the affirmative decision is obtained in step SE41, namely, when the brake non-operation determining means 364 determines that the brake pedal 124 has been kept in its non-operated position for more than the predetermined time T1.

Figure 31:
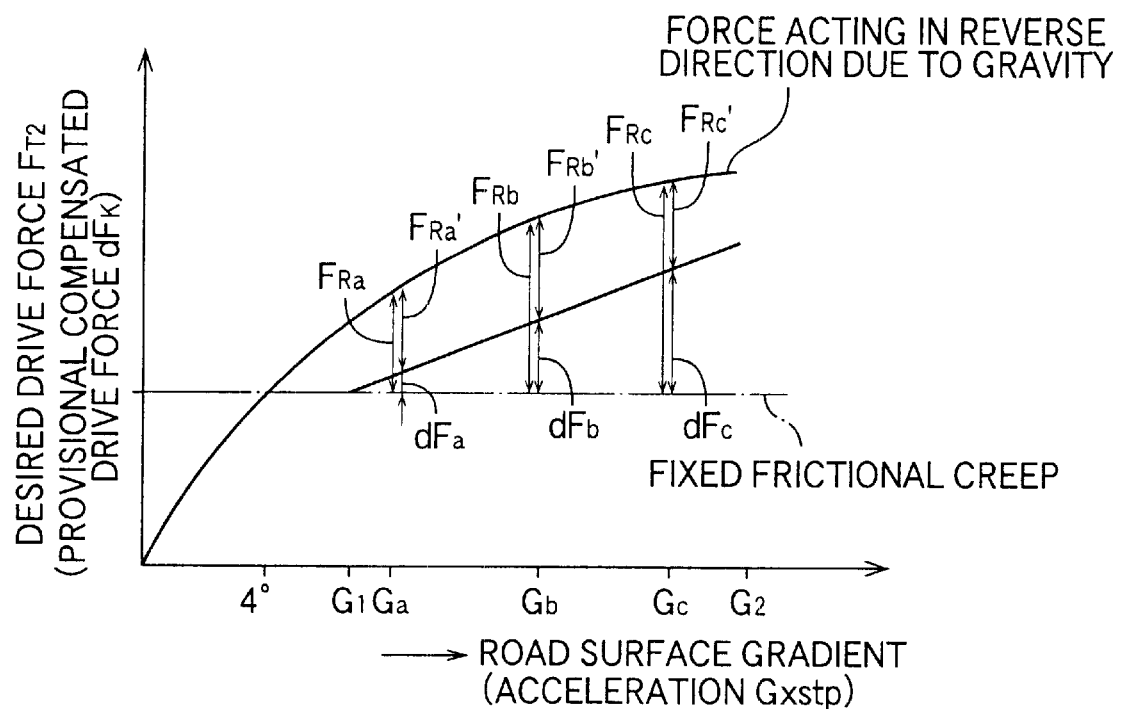
FIG. 31 is a graph indicating a relationship between the road surface gradient and the force acting on the vehicle in the reverse direction.

The hybrid control device 104 including the uphill-starting control means 350 is arranged to control the vehicle drive force such that the assisting drive force dF corresponding to the gradient of the uphill road surface as represented by the longitudinal acceleration value $G_{xstp}$ detected while the vehicle is stationary is applied to the drive wheels, in this specific example, the rear wheels 80, 82, and such that the assisting drive force dF is determined such that the speed at which the vehicle is moved down on the uphill road surface upon starting of the vehicle is held lower than a predetermined upper limit, by application of the increased desired vehicle drive force $F_{T2}$ which is a sum of the operator's desired vehicle drive force $F_{T1}$ and the assisting drive force dF. In this arrangement, when the vehicle operator releases the brake pedal 124 for starting the vehicle and before the accelerator pedal 122 is operated, the vehicle is moved down on the uphill road surface at a low speed lower than the upper limit. The vehicle operator is able to recognize, upon starting of the vehicle, that the vehicle is on the uphill road surface, and operates the accelerator pedal 122 by an amount corresponding to the uphill road surface gradient, before the vehicle is moved down a large distance. In this respect, it is noted that a force $F_R$ which acts on a conventional vehicle in the reverse direction on an uphill road surface is a difference between a force acting on the vehicle in the reverse direction due to gravity and a fixed frictional creep force due to friction between the wheels and the road surface. As indicated in the graph of FIG. 31, the force $F_R$ increases with an increase in the gradient of the road surface as represented by the output signal of the longitudinal acceleration sensor which represents the longitudinal acceleration value $G_{xstp}$ of the vehicle detected while the vehicle is stationary on the uphill road surface. Since the present hybrid control device 104 is adapted such that the assisting drive force dF which is applied to the vehicle in the forward direction is determined to increase with an increase in the longitudinal acceleration value $G_{xstp}$ according to the predetermined relationship as indicated in FIG. 26, an actual force $F_R'$ acting in the reverse direction is equal to a difference between the above-indicated force based on the gravity and the increased desired vehicle drive force $F_{T2}$ (provisional assisting drive force $dF_K$ while the vehicle is stationary). This actual force $F_R'$ acting on the vehicle in the reverse direction according to the present arrangement is smaller than the force $F_R$ acting on the conventional vehicle, and is held constant. For instance, the conventional force $F_R$ acting in the reverse direction is $F_{Ra}$, $F_{Rb}$ and $F_{Rc}$ when the longitudinal acceleration value $G_{xstp}$ is equal to, Ga, Gb and Gc (which increase in the order of description), respectively, as indicated in FIG. 31. In the present embodiment of the invention, however, the force $F_R'$ acting in the reverse direction is $F_{Ra}'$, $F_{Rb}'$ and $F_{Rc}'$ which are smaller than $F_{Ra}$, $F_{Rb}$ and $F_{Rc}$, respectively, by an amount equal to the provisional assisting drive force $dF_K$, and these values $F_{Ra}$, $F_{Rb}$ and $F_{Rc}$ are substantially equal to each other.

Further, the application of the assisting drive force dF corresponding to the longitudinal acceleration value Gxstp is terminated when the brake non-operation determining means 364 determines upon starting of the vehicle on the uphill road surface that the brake pedal 122 has been kept in the non-operated position for more than the predetermined time T1 (e.g., about one second). Thus, the vehicle is permitted to be moved down on the uphill road surface when the vehicle operator does not have an intention of starting the vehicle. Accordingly, the vehicle operator is able to perceive the gradient of the uphill road surface.

In addition, the assisting-drive-force applying means 356 rapidly increases the assisting drive force dF to a value corresponding to the gradient of the uphill road surface, immediately after the application of the assisting drive force dF is initiated, and slowly reduces the assisting drive force dF to zero when the application is terminated. This arrangement permits effective reduction of the descending speed of the vehicle upon starting of the vehicle on the uphill road surface, and smooth termination of the application of the assisting drive force dF, without a sudden removal of the assisting drive force dF,.

The hybrid control device 104 having the arrangement of FIG. 24 is advantageously applicable to the vehicle drive power source system wherein the engine 14 and the MG 16 are operated to drive the front wheels 66, 68, while the RMG 70 is operated to the rear wheels 80, 82, or vice versa. In the four-wheel driving mode, the desired drive force determining means 350 determines the operator's desired vehicle drive force $F_{T1}$ on the basis of the operating amount of a manually operated vehicle accelerating member in the form of the accelerator pedal 122, for example, which represents the opening anlgle $\theta_A$ of the throttle valve. Further, the assisting-drive-force generating means 355 generates the increased desired vehicle drive force $F_{T2}$, which is a sum of the operator's desired vehicle drive force $F_{T1}$ and the assisting drive force dF which is determined on the basis of the gradient of the uphill road surface as represented by the longitudinal acceleration value $G_{xstp}$ detected when the vehicle is stationary upon starting of the vehicle on the uphill road surface, so that the thus generated increased desired vehicle drive force $F_{T2}$ is applied to the front wheels 66, 68 and the rear wheels 80, 82. Accordingly, the vehicle is started with the increased vehicle drive force $F_{T2}$ based on the operator's desired vehicle drive force $F_{T1}$, and the ratio of front-rear distribution of the vehicle drive force during starting of the vehicle is determined by the gradient of the uphill road surface, that is, determined by the assisting drive force dF, which is applied to the rear wheels, for instance.

Further, the provisional-assisting-drive-force determining means 354 determines the provisional assisting drive force $dF_K$ as a function of the gradient of the uphill road surface as represented by the longitudinal acceleration value $G_{xstp}$, so that the descending speed of the vehicle upon starting of the vehicle does not exceed a predetermined limit, as long as the the longitudinal acceleration value $G_{xstp}$ is in a predetermined range between G1 and G2, as indicated in FIG. 26. Since the provisional assisting drive force $dF_K$ which is determined based on the gradient of the uphill road surface is not increased after the longitudinal acceleration value exceeds the upper limit G2, the vehicle operator can feel some movement of the vehicle in the reverse direction on the uphill road surface upon starting of the vehicle on an uphill road surface having a large gradient corresponding to the longitudinal acceleration value $G_{xstp}$ larger than the upper limit G2. Therefore, the vehicle operator can recognize the large gradient of the uphill road surface with a relatively high degree of accuracy.

It is appreciated that the increased desired vehicle drive force $F_{T2}=F_{T1}+dF$ is determined, generated and applied to the vehicle, by the provisional-assisting-drive-force determining means 354, assisting-drive-force generating means 355 and assisting-drive-force applying means 356, such that the descending speed of the vehicle upon starting of the vehicle on the uphill road surface is held lower than the predetermined value which is as low as 1–3 km. Accordingly, the vehicle can be smoothly started without a considerable reverse descending movement on the uphill road surface upon starting of the vehicle.

It is also appreciated that the application of the assisting drive force dF is terminated by the assisting termination determining means 360 when the operator's desired vehicle drive force $F_{T1}$ has exceeded a predetermined upper limit, that is, when the opening anlgle $\theta_A$ of the throttle valve which represents the operator's desired vehicle drive force $F_{T1}$ has exceeded the predetermined upper limit $\theta_{A2}$. In other words, the assisting drive force dF which increases with the gradient of the uphill road surface is applied to the vehicle only while the operator's desired vehicle drive force $F_{T1}$ is not larger than the predetermined upper limit, namely, only while the opening angle $\theta_A$ of the throttle valve which represents the operator's desired vehicle drive force $F_{T1}$ is not larger than the predetermined upper limit $\theta_{A2}$. In this respect, it is noted that there is not a risk of a descending movement of the vehicle after the opening angle of the throttle valve has exceeded the upper limit, that is, after the operator's desired vehicle drive force $F_{T1}$ has been considerably increased.

Referring next to the block diagram of FIG. 32, there will be described further functional means incorporated in the hybrid control device 104. These functional means include desired vehicle drive force calculating means 380, rear-distribution-ratio reducing-coefficient calculating means 382, ideal-rear-distribution ratio calculating means 384, vehicle-start determining means 386, rear-distribution-ratio calculating means 388, front drive force calculating means 390, rear drive force calculating means 392 and motor operation control means 394.

Figure 33:
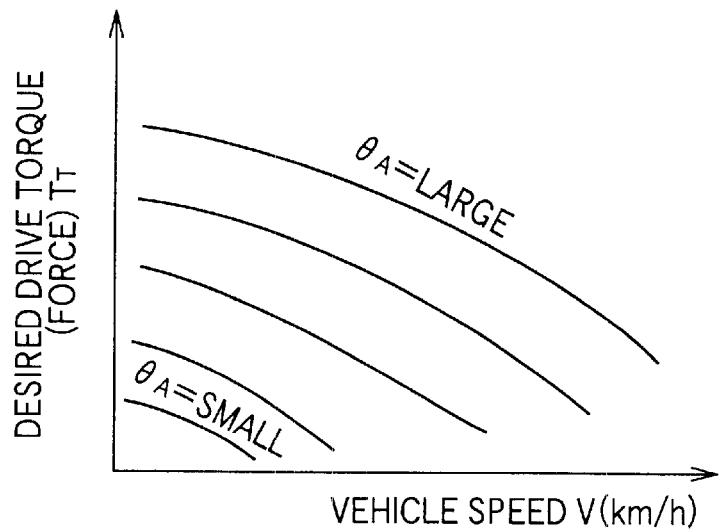
FIG. 33 is a graph indicating a stored data map used by desired drive force calculating means of FIG. 32 to calculate a desired vehicle drive force.
Figure 34:
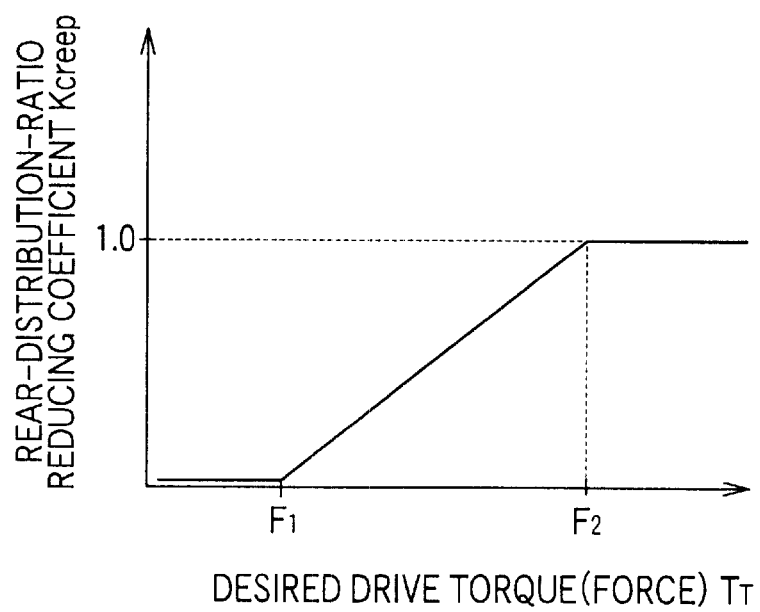
FIG. 34 is a graph indicating a stored data map used by rear-distribution-ratio reducing-coefficient calculating means of FIG. 32 to calculate rear-distribution-ratio reducing coefficient.

The desired vehicle drive force calculating means 380 is adapted to determine an operator's desired drive force or torque $T_T$ on the basis of the operating amount of the accelerator pedal 122 (opening anlgle $\theta_A$ of the throttle valve) and the vehicle speed V and according to a stored predetermined relationship among these parameters $T_T$, $\theta_A$ and $V$. An example of this relationship is indicated in the graph of FIG. 33. The relationship is obtained by experiments. The rear-distribution-ratio reducing-coefficient calculating means 382 is adapted to calculate a rear-distribution-ratio reducing coefficient $K_{creep}$ on the basis of the operator's desired drive torque $T_T$ calculated by the desired vehicle drive force calculating means 380 and according to a stored predetermined relationship between these parameter $K_{creep}$ and $T_T$. An example of this relationship is indicated in the graph of FIG. 34. The relationship is obtained by experiments so as to provide characteristics shown in FIG. 35 that the output of the RMG 70 is reduced with a decrease in the operator's desired drive force $T_T$.

The ideal-rear-distribution ratio calculating means 384 is adapted to calculate an ideal rear-wheel torque distribution ratio $K_{tro}$ for achieving an ideal distribution of the vehicle drive force to the front and rear wheels, on the basis of an actual front-rear load distribution, according to the equation used in step SC4 of the control routine of FIG. 12, for instance. The vehicle start determining means 386 is adapted to determine whether the vehicle is being started. This determination is effected on the basis of the opening angle $\theta_A$ of the throttle valve and the vehicle speed V The rear-distribution-ratio calculating means 388 is operated when the vehicle start determining means 386 determines that the vehicle is being started. The rear-distribution-ratio calculating means 388 calculates a rear-wheel torque distribution ratio $K_{tr}$ by multiplying the rear-distribution-ratio reducing coefficient $K_{creep}$ calculated by the rear-distribution-radio reducing-coefficient calculating means 382, by the ideal rear-wheel distribution ratio $K_{tro}$ calculated by the ideal-rear-distribution-ratio calculating means 384.

The front drive force calculating means 390 is adapted to calculate the front drive force (torque) $T_F=T_T\times(1-K_{tr})$ on the basis of the operator's desired drive torque $T_T$ and the rear-wheel torque distribution ratio $K_{tr}$. The rear drive force calculating means 392 is adapted to calculate the rear drive force (torque) $T_R=T_T\times K_{tr}$ on the basis of the operator's desired drive torque $T_T$ and the rear-wheel torque distribution ratio $K_{tr}$. The motor operation control means 394 controls the engine 14 and the MG 16 so as to provide the front drive force or torque $T_F$ calculated by the front drive force calculating means 390, and controls the RMG 70 so as to provide the rear drive force or torque $T_R$ calculated by the rear drive force calculating means 392, so that the vehicle is driven in the four-wheel driving mode.

Figure 35:
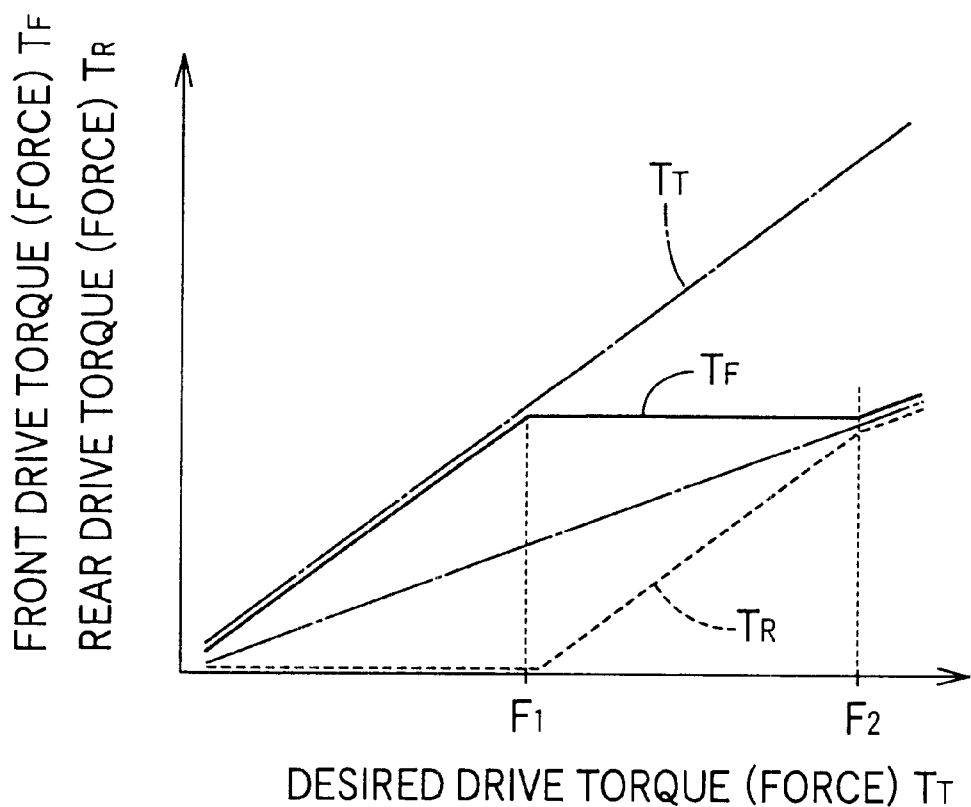
FIG. 35 is a graph indicating a relationship among the desired vehicle drive force calculated by the desired drive force calculating means, a front-wheel drive force calculated by the front drive force calculating means, and a rear-wheel drive force calculated by the rear drive force calculating means.

The graph of FIG. 35 indicates a relationship among the above-indicated operator's desired vehicle drive force $T_T$, front drive force $T_F$ and rear drive force $T_R$. According to the relationship of FIG. 34 used to obtain the rear-distribution-ratio reducing coefficient $K_{creep}$, the reducing coefficient $K_{creep}$ is held zero until the operator's desired vehicle drive torque $T_T$ has been increased to a predetermined value F1, and is linearly increased as the operator's desired drive torque $T_T$ is increased from the value F1 to a predetermined value F2 larger than the value F1. The relationship of FIG. 34 is further formulated such that the reducing coefficient $K_{creep}$ is held constant at the value corresponding to the value F2, while the operator's desired drive torque $T_T$ is larger than the value F2. This predetermined value F2 of the operator's desired drive force $T_T$ is determined to be an upper limit above which the front and rear wheels 66, 68, 80, 82 are expected to slip on a frozen, snow-covered or other road surface having a considerably low friction coefficient $\mu$. While the operator's desired drive force $T_T$ s larger than this upper limit F2, the front wheels 66, 68 and the rear wheels 80, 82 are driven with an ideal front-rear torque distribution ratio. While the operator's desired vehicle drive force $T_T$ is in a range between F1 and F2, the front-wheel distribution ratio is made higher than the rear-wheel distribution ratio. The graph of FIG. 35 shows the relationship where the ideal rear-wheel torque distribution ratio is 0.5.

Figure 36:
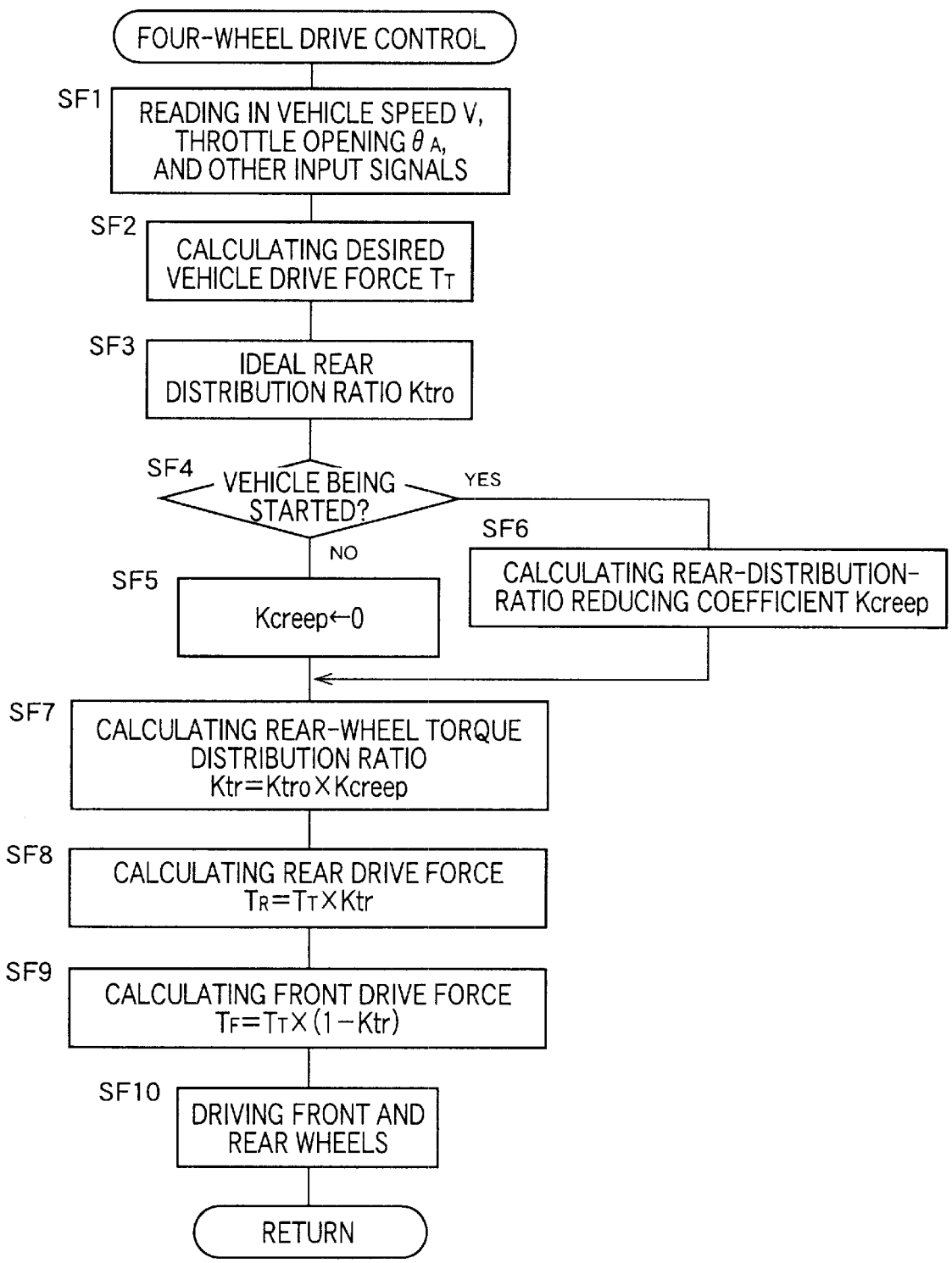
FIG. 36 is a flow chart illustrating a four-wheel-drive control routine executed by the hybrid control device to drive the vehicle in the four-wheel driving mode.

Referring next to the flow chart of FIG. 36, there will be described a four-wheel-drive control executed by the hybrid control device 104 which incorporates the functional means of FIG. 32 which have been described above. This four-wheel-drive control routine of FIG. 36 is initiated with step SF1 to read in the opening angle $\theta_A$ of the throttle valve, the vehicle speed V and other input signals. Step SF1 is followed by step SF3 corresponding to the desired drive force calculating means 380, to calculate the operator's desired vehicle drive force $T_T$, on the basis of the opening anlgle $\theta_A$ and the vehicle speed V and according to the relationship of FIG. 33. Then, the control flow goes to step SF3 corresponding to the ideal-rear-distribution-ratio calculating means 384, to calculate the ideal rear-wheel torque distribution ratio $K_{tro}$ for achieving the ideal distribution of the vehicle drive force to the front and rear wheels, on the basis of the actual front-rear load distribution, according to the equation used in step SC4 of the control routine of FIG. 12, for instance. Then, the control flow goes to step SF4 corresponding to the vehicle-start determining means 386, to determine whether the vehicle is in the process of being started. If a negative decision (NO) is obtained in step SF4, the control flow goes to step SF5 in which the rear-distribution-ratio reducing coefficient $K_{creep}$ is zeroed.

If an affirmative decision (YES) is obtained in step SF4, the control flow goes to step SF6 corresponding to the rear-distribution-ratio reducing-coefficient calculating means 382, to calculate the rear-distribution-ratio reducing coefficient $K_{creep}$ on the basis of the operator's desired vehicle drive torque $T_T$ calculated in step SF2 and according to the predetermined relationship of FIG. 34, in preparation of the vehicle driving in the four-wheel driving mode with the front wheels 66, 68 and the rear wheels 80, 82. Step SF4 or SF6 is followed by step SF7 corresponding to the rear-distribution-ratio calculating means 388, to calculate the rear-wheel torque distribution ratio $K_{tr}$ by multiplying the ideal rear-wheel torque distribution ratio $K_{tro}$ by the rear-distribution-ratio reducing-coefficient $K_{creep}$. Step SF7 is followed by step SF8 corresponding to the rear drive force calculating means 392, to calculate the rear drive force $T_R=T_T\times K_{tr}$) on the basis of the operator's desired vehicle drive force $T_T$ and the rear-wheel torque distribution ratio $K_{tr}$. Then, the control flow goes to step SF9 corresponding to the front drive force calculating means 390, to calculate the front drive force $T_F=T_T\times(1-K_{tr})$ on the basis of the operator's desired vehicle drive force $T_T$ and the rear-wheel torque distribution ratio $K_{tr}$. Step SF9 is followed by step SF10 corresponding to the motor operation control means 394, to control the engine 14 and the MG 16 for driving the front wheels 66, 68 with the calculated front drive force $T_F$, and controls the RMG 70 for driving the rear wheels 80, 82 with the calculated rear drive force $T_R$ whereby the vehicle is driven in the four-wheel driving mode. As indicated in FIG. 35, the rear drive force $T_R$ produced by the RMG 70 is linearly reduced with a decrease of the operator's desired drive force $T_T$ from the value F2 to the value F1, so that the amount of electric energy consumption and heat loss of the RMG 70 are significantly reduced, resulting in reduction of the operating restrictions of the RMG 70 due to the electric energy amount stored in the electric energy storing device 112 and the operating temperature of the RMG 70.

Figure 32:
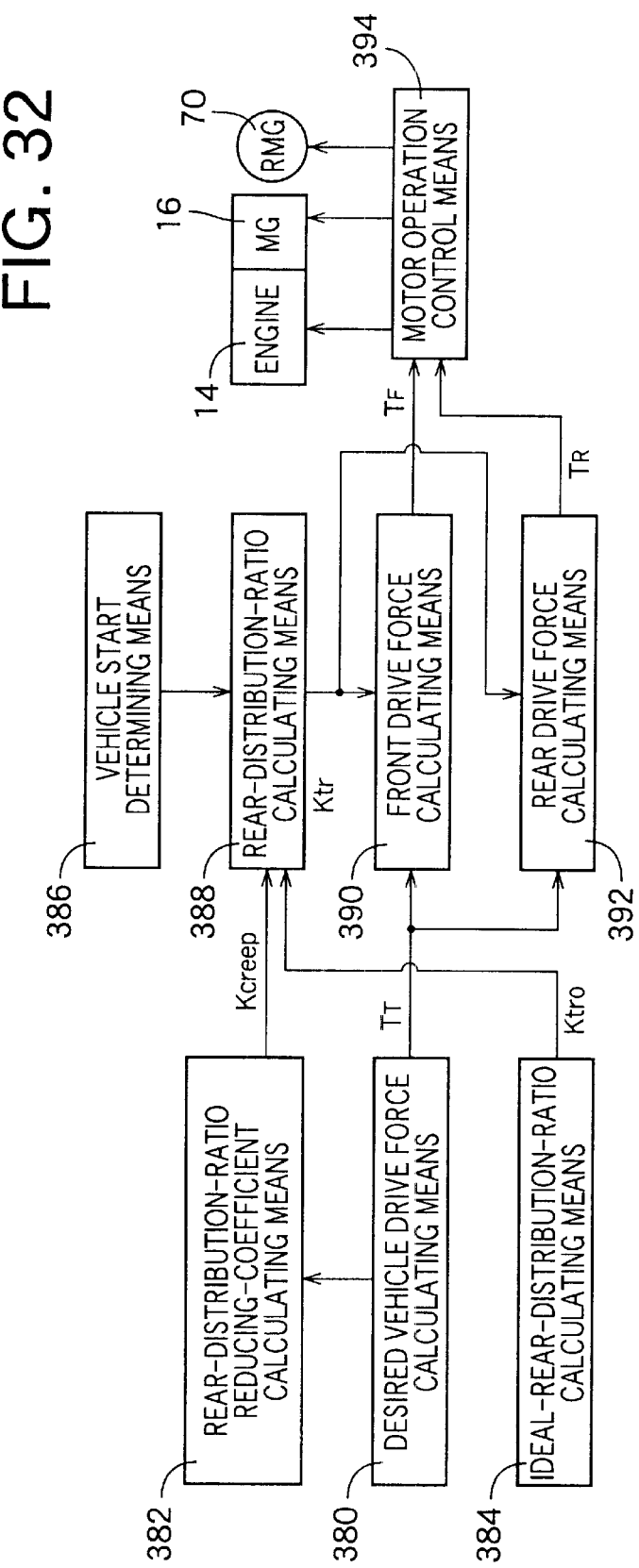
FIG. 32 is a block diagram illustrating further functional means also incorporated the hybrid control device of FIG. 24.

In the arrangement of the hybrid control device 104 including the functional means shown in FIG. 32, the front drive force $T_F$ and the rear drive force $F_R$ are controlled depending upon the static state of the vehicle (e.g., rear load distribution ratio), the dynamic or running state of the vehicle (a difference between the speed of the front and rear wheels, and the longitudinal acceleration value), and the state of the road surface (friction coefficient and gradient), to drive the vehicle in the four-wheel driving mode by driving the front wheels and the rear wheels so that the actual total vehicle drive force is made equal to the operator's vehicle drive force $T_T$ which is determined on the basis of the operating amount of the accelerator pedal 122 (opening angle of the throttle valve) and the vehicle speed V and according to the predetermined relationship as indicated in FIGS. 13, 25 or 33. Thus, the vehicle can be driven in the four-wheel driving mode with the operator's desired vehicle drive force or torque $T_T$, with the front and rear drive forces $T_F$, $T_R$ being determined so as to reflect the static and dynamic states of the vehicle and the road surface condition.

The drive power system according to the arrangement of FIG. 32 includes a first drive power source consisting of a plurality of power sources, more specifically, two power sources of different types in the form of the engine 14 and the MG 16. This arrangement permits the engine 14 to be operated in an operating condition in which the efficiency is relatively high, so that the fuel economy of the engine 14 can be improved.

Further, the drive power system further includes a second drive power source in the form of the RMG 70 which selectively functions as an electric motor and an electric generator. The RMG 70 is operated as the electric motor to drive the rear wheels 80, 82 to drive the vehicle in the four-wheel driving mode. However, the second drive power source may include a plurality of motor/generator units.

It is also noted that the hybrid control device 104 shown in FIG. 32 is arranged to change the front-rear torque distribution in the form of the ideal rear-wheel torque distribution ratio $K_{tro}$ on the basis of the operator's desired vehicle drive force $T_T$. For instance, when the operator's desired vehicle drive force $T_T$ becomes smaller than the value F2, the ideal rear-wheel torque distribution ratio $K_{tro}$ is changed by multiplying it by the rear-distribution-ratio reducing-coefficient $K_{creep}$, so that the operation of the RMG 70 is restricted or limited when the operator's desired vehicle drive force $T_T$ is relatively small, making it possible to reduce the temperature rise of the RMG 70.

While the vehicle is being started, the front-rear torque distribution is changed on the basis of the operator's desired vehicle drive force $T_T$. Namely, the front-rear torque distribution while the vehicle is started in the four-wheel driving mode is suitably changed depending upon the operator's desired vehicle drive force $T_T$.

In addition, the ideal rear-wheel torque distribution ratio $K_{tr}$ o representing the torque distribution of the front and rear wheels is changed during the vehicle starting, such that the torque distribution ratio of the rear wheels 80, 82 driven by the RMG 70 a temperature rise of which is desirably reduced or avoided is made lower while the operator's desired vehicle drive force $T_T$ is smaller than the predetermined value F2 than while it is larger than this value F2. Accordingly, the thermal load of the RMG 70 is reduced to permit the vehicle driving in the four-wheel-drive mode for a relatively long time.

In other words, the temperature rise of the RMG 70 is reduced due to its operation during vehicle starting, since the drive force generated by the RMG 70 is made smaller by controlling the rear-wheel torque distribution ratio $K_{tr}$ such that this distribution ratio $K_{tr}$ associated with the second drive power source (RMG 70) is lower when the operator's desired vehicle drive force $T_T$ is smaller than the value F2 than when it is larger than the value F2.

It is further noted that the predetermined value F2 of the operator's desired vehicle drive force $T_T$ is a maximum vehicle drive force below which the drive wheels 66, 68, 80, 82 do not slip on a road surface having a relatively low friction coefficient. Accordingly, the output of the second drive power source in the form of the RMG 70 is reduced by reducing the ideal rear-wheel torque distribution ratio $K_{tro}$ when the operator's desired vehicle drive force $T_T$ is smaller than the threshold F2, that is, when the drive wheels are not likely to slip on the road surface. Thus, the threshold F2 used for reducing the rear-wheel torque distribution ratio $K_{tro}$ is determined to effectively prevent overheating of the RMG 70.

In the embodiment of FIG. 9 wherein the hybrid control device 104 includes at least the functional means shown in FIG. 7, the vehicle is driven in the four-wheel driving mode with the front and rear wheels, in one of the following three conditions: where the vehicle is in the process of being started (step SA2); where the vehicle is required to be accelerated (steps SA6 and SA7); and where the vehicle is driven on a road surface having a comparatively low friction coefficient. In the other conditions, the vehicle is driven in the two-wheel driving mode is with only the two front wheels or two rear wheels, for instance, the front-wheel driving mode. Thus, the four-wheel driving mode is automatically selected or established to drive the vehicle with the front and rear wheels when the vehicle is started, accelerated or driven on a road surface having a low friction coefficient. This arrangement is effective to avoid an unnecessary operation of the second drive power source (RMG 70) to drive the vehicle in the four-wheel driving mode, and an undesirable temperature rise of the second drive power source.

The hybrid control device 104 according to the embodiment of FIGS. 7 and 9 adapted for use on the four-wheel-drive hybrid vehicle is further adapted to automatically select the four-wheel driving mode when the vehicle is running under a relatively small load, namely, when the vehicle is in a decelerating state or in a coasting state without operations of the accelerator pedal 122 and the brake pedal 124.

In the drive power system according to the arrangements shown in FIGS. 3, 11, 14, 24 and 32, the first and second drive power sources respectively include the MG 16 and the RMG 70 each of which is capable of selectively functioning as an electric generator and an electric motor, and the first drive power source further includes the engine 14. The MG 16 and RMG 70 can be operated to drive the vehicle, together with the engine 14, such that the engine 14 is operated with high efficiency.

Further, the vehicle can be started in the FORWARD MOTOR DRIVE mode with only the MG 16 included in the first drive power source, as described above by reference to FIG. 5, or with only the RMG 70 of the second drive power source, without an operation of the engine 14, so that the fuel economy of the engine 14 is improved.

When the vehicle is braked or is in a coasting state, the MG 16 or RMG 70 is operated as an electric generator, so as to provide a regenerative braking torque and charge the electric energy storing device 112. Accordingly, the energy efficiency is improved, and the fuel economy of the vehicle can be increased.

Further, the four-wheel-drive vehicle can be driven with a sufficiently large drive force, in the DIRECT ENGINE DRIVE mode with only the engine 14, or in the ETC DRIVE mode with both the engine 14 and the MG 16 operated as an electric motor, when the vehicle load is larger than a given upper limit.

Referring next to the block diagram of FIG. 37, there will be described the hybrid control device 104 arranged according to a further embodiment of this invention, which is a modification of the first embodiment of FIG. 7. The present hybrid control device 104 of FIG. 37 does not include the vehicle-start monitoring means 138 and the low-temperature detecting means 162, but includes vehicle speed determining means 151 and uphill-road detecting means 153.

The vehicle speed determining means 151 is adapted to determine whether the detected vehicle speed V is lower than a predetermined first threshold V1 (e.g., about km/h), and to determine whether the vehicle speed V is lower than a predetermined second threshold V2 (e.g., about 10 km/h) higher than the first threshold V1. If the detected vehicle speed V is lower than the first threshold V1, it means that the vehicle is being started. If the vehicle speed V is lower than the second threshold V2, it means a possibility that the vehicle is running on a steep uphill road surface. In this case, a determination as to whether the vehicle is running on a steep uphill road surface, as described below.

The uphill-road-detecting means 153 is adapted to determine whether the vehicle is running on a steep uphill road surface, that is, whether the gradient of the road surface is larger than a predetermined threshold. This determination is effected by determining whether the longitudinal acceleration value of the vehicle detected by the longitudinal acceleration sensor is lower than a predetermined upper limit by a predetermined amount. The upper limit is determined by the opening anlgle $\theta_A$ of the throttle valve and the vehicle speed V. Alternatively, the determination is effected on the basis of the output signal of a gradient sensor provided to detect the angle of inclination of the road surface, or on the basis of the longitudinal acceleration value $G_{xstp}$ detected while the vehicle is stationary.

The output-torque-range selecting means 152 is adapted to select the first output torque range of the RMG 70 (whose upper limit is comparatively large, as indicated in FIG. 8), when the vehicle speed determining means 151 determines that the vehicle speed V is lower than the second threshold V2 and when the uphill-road detecting means 153 determines that the vehicle is running on a steep uphill road surface. In this case, the vehicle is driven in the four-wheel driving mode with the RMG 70 being operated within the first output torque range to drive the rear wheels 80, 82. Thus, the first output torque range of the RUM 70 is selected when the vehicle is driven on a steep uphill road surface having a comparatively high gradient. The second output torque range whose upper limit is comparatively low is selected when the vehicle is driven on an ordinary flat road surface. The RMG 70 is kept operated to drive the vehicle in the four-wheel driving mode until the vehicle speed V has been raised to the second threshold V2.

The output-torque-range selecting means 152 is further adapted to select the second output torque range of the RMG 70 when the detected vehicle speed V is within a range between the first and second thresholds (e.g., within a range of 5–10 km/h), that is, when the uphill-road detecting means 153 determines that the vehicle is not running on a steep uphill road surface and when the vehicle speed determining means 151 determines that the vehicle speed V is lower than the second threshold V2 and higher than the first threshold V1. Thus, the output-torque-range selecting means 152 selects the second output torque range (whose upper limit is relatively small, as also indicated in FIG. 8) when the vehicle is driven on a flat road surface at a relatively low speed. The output-torque-range selecting means 152 is further adapted to select the second output torque range when the vehicle is running on a flat road surface at a relatively high speed, that is, when the vehicle speed determining means 151 determines that the vehicle speed V is equal to or higher than the second threshold V2. However, the selecting means 152 selects the first output torque range when the front wheels 66, 68 driven by the engine 14 are slipping or when the vehicle is in an understeering state, even while the vehicle is running on a flat road surface at a relatively high speed higher than the second threshold V2. The selecting means 152 is further adapted to select the second output torque range when the vehicle speed V is lower than the first threshold V1.

The second-motor control means 154 operates the RMG 70 such that the output torque of the RMG 70 is held within one of the first and second output torque ranges which is selected by the output-torque-range selecting means 152, depending upon the running condition of the vehicle (including the running speed V and the gradient of the road surface). When the vehicle is driven on a steep uphill road surface at a speed lower than the second threshold V2, for instance, the second-motor control means 154 controls the RMG 70 to drive the rear wheels 80, 82 with a drive force determined by the front-rear load distribution ratio, such that the output torque of the RMG 70 is held within the first output torque range, namely, does not exceed the upper limit A1 indicated in FIG. 8. The second-motor control means 154 continues to operate the RMG 70 within the first output torque range until the vehicle speed V driven on the steep uphill road surface has increased to the second threshold V2. When the vehicle is not running on a steep uphill road surface, but is running on a flat road surface at a relatively low speed within a range between the first and second thresholds V1, V2 (e.g., between 5 km/h and 10 km/h), the second-motor control means 154 controls the RMG 70 to drive the rear wheels 80, 82 such that its output torque is held within the second output torque range, namely, does not exceed the upper limit A2 indicated in FIG. 8. When the vehicle is running on a flat road surface at a relatively high speed higher than the second threshold V2, the second-motor control means 154 controls the RMG 70 within the second output torque range, to drive the rear wheels 80, 82.

Referring to the flow chart of FIG. 38, there will be described control routine executed by the hybrid control device 104 including the functional means shown in FIG. 37. The control routine of FIG. 38 is different from the control routine of FIG. 9, only in that steps SA40–SA42 are provided in the control routine of FIG. 38, in place of the steps SA1 and SA2 provided in the control routine of FIG. 9 for detecting the lower ambient temperature and the vehicle starting state. Step SA40 is provided for determining whether the vehicle speed V is lower than the second threshold V2. Step SA41 is provided to determine whether the vehicle is running on a steep uphill road surface, and step SA42 is provided to determine whether the vehicle speed V is lower than the first threshold V1.

The control routine of FIG. 38 is initiated with step SA40 corresponding to the vehicle speed determining means 151, to determine whether the detected vehicle speed V is lower than the predetermined second threshold V2 (e.g., about 10 km/h). If an affirmative decision (YES) is obtained in step SA40, the control flow goes to step SA41 corresponding to the uphill-road detecting means 153, to determine whether the vehicle is running on a steep uphill road surface. If an affirmative decision (YES) is obtained in step SA41, the control flow goes to steps SA16–SA18 to select the first output torque range of the RMG 70 whose upper limit is indicated at A1 in FIG. 8, so that the RMG 70 is operated within the selected first output range to drive the vehicle in the four-wheel driving mode with the rear wheels 80, 82 being driven with a relatively large output torque. If a negative decision (NO) is obtained in step SA41, the control flow goes to step SA42 also corresponding to the vehicle speed determining means 151, to determine whether the vehicle speed V is lower than the predetermined first threshold V1 (e.g., about 5 km/h). If an affirmative decision (YES) is obtained in step SA42, the control flow goes to steps SA19–SA22 and SA18 to select the second output range of the RMG 70 whose upper limit is indicated at AS in FIG. 8, so that the RMG 70 is operated within the selected second output range to drive the vehicle in the four-wheel driving mode with the rear wheels 80, 82 driven with a relatively small output torque. If a negative decision (NO) is obtained in step SA42, the control flow goes to step SA3 and the following steps. That is, the control flow goes to steps SA16–SA18 to operate the RMG 70 within the first output torque range, if the front wheels 77, 68 are slipping (if the affirmative decision is obtained in steps SA3 and SA14), or if the vehicle is in an understeering state (if the affirmative decision is obtained in steps SA4 and SA15). In the other cases, the control flow goes to steps SA19–SA22 and SA18 so that the vehicle is driven in the four-wheel driving mode with the RMG 70 being operated within the second output torque range.

Figure 37:
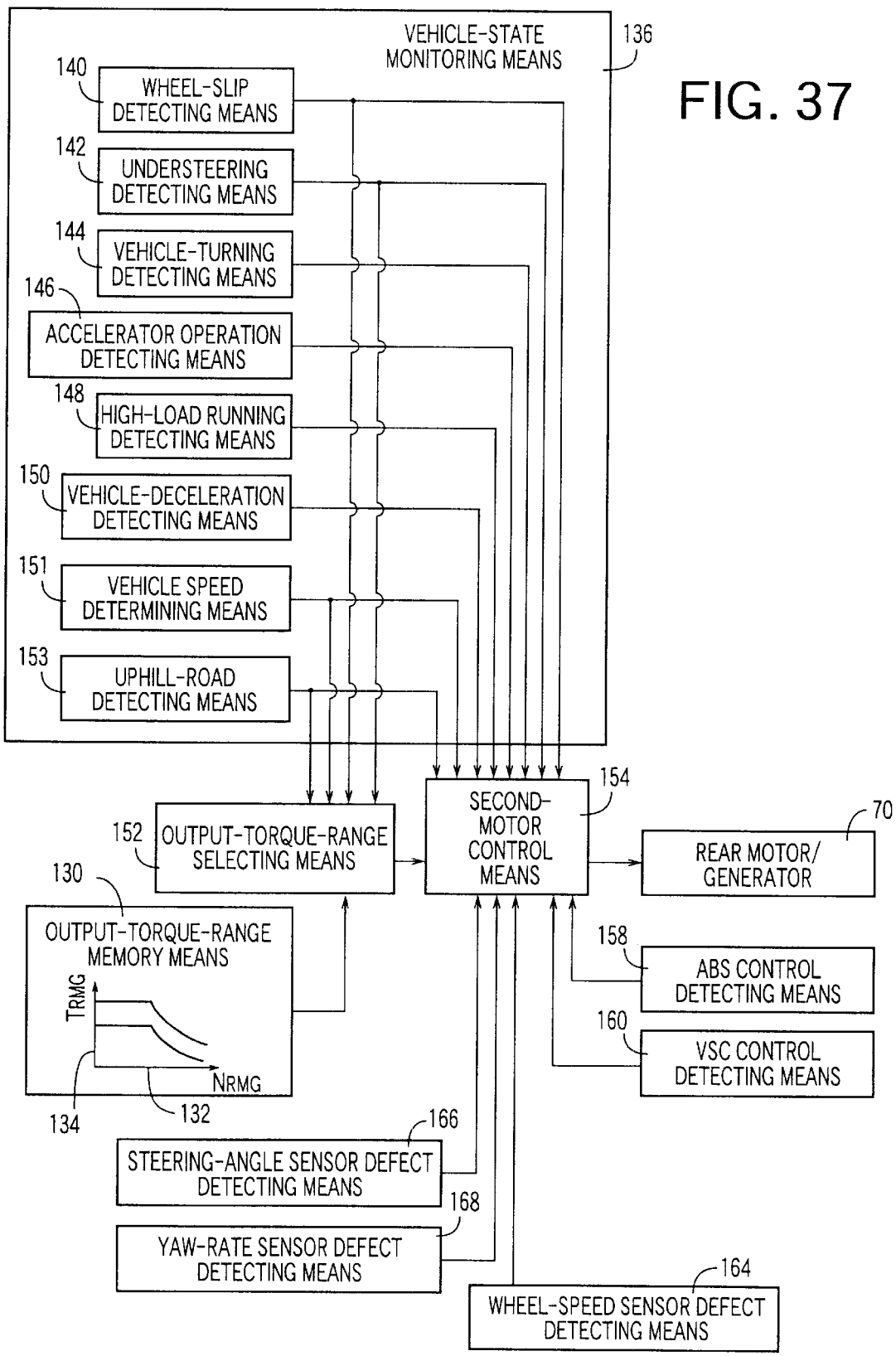
FIG. 37 is a block diagram illustrating functional means of a hybrid control device according to another embodiment of this invention.
Figure 38:
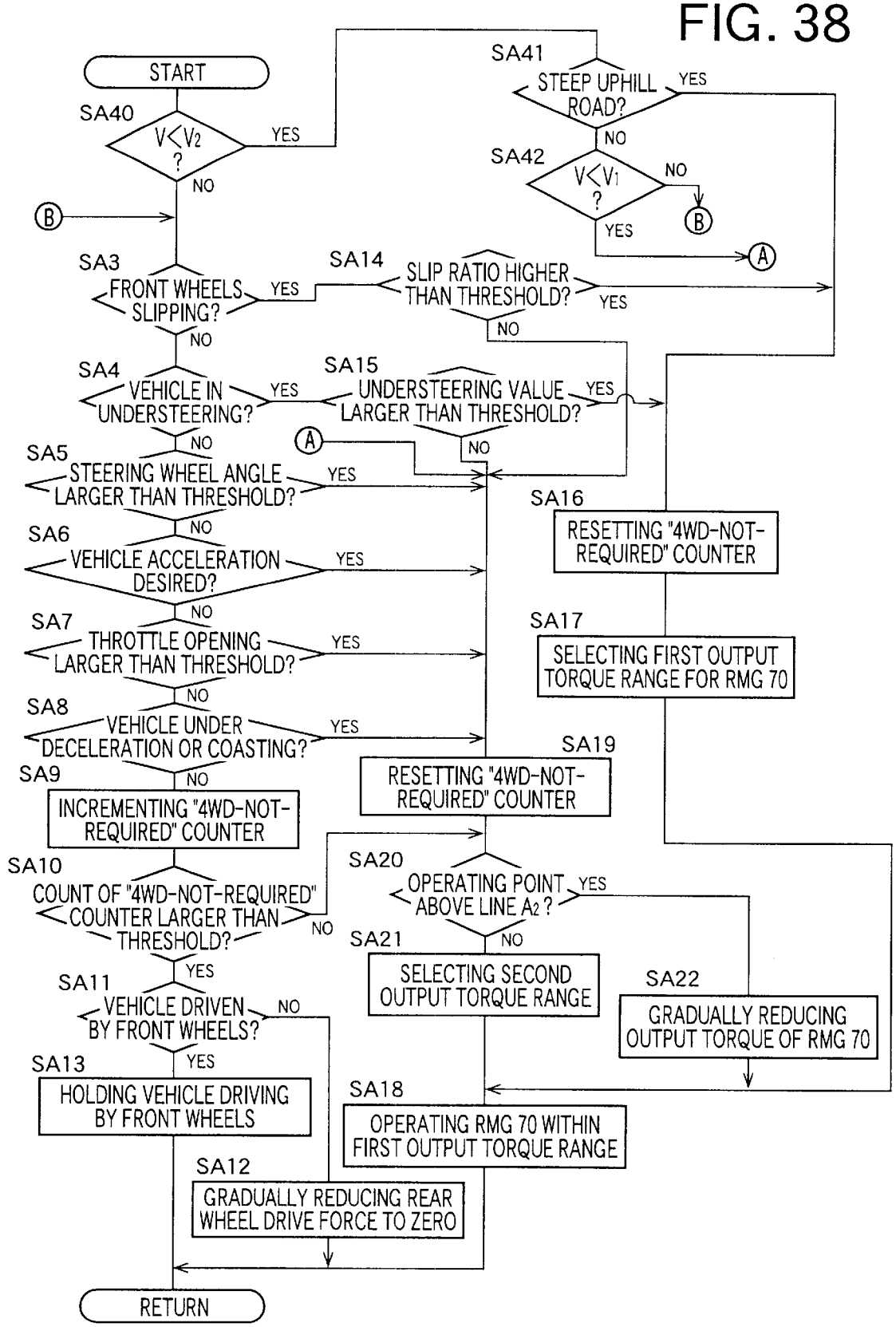
FIG. 38 is a flow chart illustrating a control routine executed by the hybrid control device of FIG. 37.

In the present embodiment of FIGS. 37 and 38 described above, the RMG 70 is operated within the first output torque range to drive the rear wheels with a relatively large drive torque when the uphill-road detecting means 153 determines that the vehicle is running on a steep uphill road surface. If the detecting means 153 determines that the vehicle is not running on a steep uphill road surface, that is, if the gradient is not higher than the predetermined upper limit, the RMG 70 is operated within the second output torque range to drive the rear wheels to provide a relatively small drive torque. This arrangements permits high drivability of the vehicle on an uphill road surface and increased frequency of operation of the second drive power source in the form of the RMG 70 with a relatively small output torque, assuring improved efficiency of operation of the RMG 70 while preventing its overheating.

Further, the RMG 70 is operated to provide a relatively large drive torque within the first output torque range when the uphill-road detecting means 153 (step SA41) determines that the vehicle is running on a steep uphill road surface having a relatively large gradient. In this case, the RMG 70 is kept operated within the first output torque range, to drive the vehicle in the four-wheel driving mode, until the vehicle speed determining means 151 (step SA40) determines that the vehicle speed V has been raised to the second threshold V2. Thus, the vehicle is kept driven in the four-wheel driving mode on a steep uphill road surface, until the vehicle speed is raised to a higher level, than on a non-steep uphill road surface or a flat road surface.

While some presently preferred embodiments of the present invention have been described above in detail by reference to the accompanying drawings, for illustrative purpose only, it is to be understood that the present invention may be otherwise embodied.

In the illustrated embodiments, the front wheels 66, 68 are driven by the main drive device 10 consisting of the engine 14 and the MG 16, while the rear wheels 80, 82 are driven by the second drive device 12 consisting of the RMG 70. However, the drive power system may be modified such that the front wheels 66, 68 are driven by an auxiliary drive device consisting of a motor/generator, while the rear wheels 80, 82 are driven by a main drive device consisting of the engine 14 and another motor/generator. The main or auxiliary drive device may include at least one drive power source, such as an engine, an electric motor and a hydraulic motor.

While the hybrid control device 104 which has been described include various functional means shown in the block diagrams 11, 15, 24 and 32 as well and the functional means shown in FIG. 7 or 37, all of these functional means need not be provided in a control apparatus of the present invention. The functional means disclosed herein may be provided in any desired combination so as to attain the desired control functions.

In the illustrated embodiments, the front wheels 66, 68, and the rear wheels 80, 82 are driven by the respective different drive power sources. However, the front wheels and the rear wheels may be driven by a common drive power source device. In this case, the front wheel and the rear wheels are operatively connected to the common drive power source device, which is connected to a suitable power distribution clutch arranged to control the distribution of the vehicle drive force to the front and rear wheels. In a four-wheel-drive vehicle having such an arrangement, the front-wheel drive torque and the rear-wheel drive torque may be determined on the basis of the operator's desired vehicle drive force $T_T$ which is obtained on the basis of the operating amount of a manually operated vehicle accelerating member such as an accelerator pedal (which operating amount is reflected on the opening anlgle $\theta_A$ of the throttle valve) and the vehicle running speed V. In this arrangement, too, the vehicle can be driven in the four-wheel driving mode, so as to provide the total vehicle drive force as desired by the vehicle operator, and in a manner reflecting the specific running condition of the vehicle.

In the arrangement of FIG. 24, the assisting drive force dF for starting the vehicle on an uphill road surface is obtained by the assisting-drive-force generating means 355, and the thus obtained assisting drive force dF is added to the operator's desired vehicle drive force $F_{T1}$, by the assisting-drive-force applying means 356. However, the operator's desired vehicle drive force $F_{T1}$, may be increased by multiplying it by a suitable compensating coefficient (larger than 1), so that the vehicle is started on an uphill road surface with a vehicle drive force larger than the operator's desired vehicle drive force.

The drive-power-source control means 366 is adapted to operate the RMG 70 for driving the rear wheels 80, 82 with the assisting drive force dF. However, the drive-power-source control means 366 may operate the engine 14 or the MG 16 for driving the front wheels 66, 68 with the assisting drive force dF. Alternatively, the control means 366 may control both the RMG 70 and the engine 14 or MG 16 for driving the rear and front wheels 80, 82, 66, 68, so as to increase the total vehicle drive force by the amount equal tot he assisting drive force dF.

Although the power transmitting system includes the continuously variable transmission 20, this transmission 20 may be replaced by any other type of transmission, such as a planetary gear type or a parallel two-axes type having a plurality of speed ratios.

While the hybrid control device 104 including the functional means shown in FIG. 24 is adapted to execute the control routines of FIGS. 29 and 30 for controlling the vehicle drive force, any other control routines may be executed by the hybrid control device 104.

In the illustrated embodiments, the energy produced by the engine 14 is converted by the MG 16 into an electric energy which is used by the RMG 70 for driving the rear wheels 80, 82. However, the energy produced by the engine 14 may be converted by a hydraulic pump into a hydraulic energy which is used by a hydraulic motor for driving the rear wheels 80, 82.

Although the hybrid control device 104 including the functional means shown in FIG. 7 or 37 uses the two-dimensional data maps representing the first and second output torque ranges of the RMG 70 as shown in FIG. 8, the hybrid control device 104 may use data maps representing three more output torque ranges of any configuration or pattern, or two or more one-dimensional or three-dimensional output torque ranges.

In the hybrid drive system shown in FIGS. 11–14 for the four-wheel-drive vehicle, the main drive device 10 for driving the main drive wheels in the form of the front wheels 66, 68 includes the internal combustion engine 14 operated by combustion of an air-fuel mixture, the motor/generator (MG) 16 which selectively functions as an electric motor and an electric generator, the planetary gear device 18 of double-pinion type, and the continuously variable transmission 20 whose speed ratio is continuously variable, such that these devices 14, 16, 18 and 20 are arranged coaxially with each other. However, the front wheels 66, 68 are driven primarily by the engine 14 only, or the motor-generator 16 only.

In the first embodiment of FIGS. 7–10, the second-motor control means 154 may be adapted to switch the vehicle driving mode from the four-wheel driving mode to the front-wheel driving mode when the braking system is brought into the anti-lock braking pressure control mode (ABS mode) or vehicle running stability control mode (VSC mode) under the control of the brake control device 108.

The second-motor control means 154 may be adapted to operate the RMG 70 in a predetermined manner while the ambient temperature is lower than a predetermined lower limit.

It is to be understood that the present invention may be embodied with various other changes, modifications and improvements, which may occur to those skilled in the art, in the light of the foregoing teachings.

What is claimed is:

1. A vehicle control apparatus for controlling a four-wheel-drive automotive vehicle of a type which comprises a first drive power source for driving one of a pair of front wheels and a pair of rear wheels, and a second drive power source for driving the other of said pairs of front and rear wheels, said vehicle control apparatus being operable to control a front drive force for driving said pair of front wheels and a rear drive force for driving said pair of rear wheels, depending upon a static and a dynamic state of the vehicle such that a sum of said front drive force and said rear drive force is equal to an operator's desired value of a vehicle drive force for driving said automotive vehicle, which operator's desired value is obtained on the basis of an amount of operation of a manually operated vehicle accelerating member and a running speed of the vehicle.

2. A vehicle control apparatus according to claim 1, wherein said first drive power source consists of a plurality of drive power sources.

3. A vehicle control apparatus according to claim 1, wherein said first drive power source consists of a plurality of drive power sources of different types.

4. A vehicle control apparatus according to claim 1, wherein said second drive power source consists of at least one electric motor.

5. A vehicle control apparatus according to claim 4, wherein said second drive power source is provided to drive said pair of rear wheels of said four-wheel-drive automotive vehicle.

6. A vehicle control apparatus according to claim 5, wherein said static state of the vehicle includes a starting state of the vehicle, and said ratio of said front drive force and said rear drive force in said starting state of the vehicle is controlled such said rear drive force for driving said pair of rear wheels driven by said second drive power source is smaller when said operator's desired value of said vehicle drive force is smaller than a predetermined threshold than when said operator's desired value is not smaller than said predetermined threshold.

7. A vehicle control apparatus according to claim 1, wherein a ratio of said front drive force and said rear drive force with respect to each other is determined on the basis of said operator's desired value of the vehicle drive force.

8. A vehicle control apparatus according to claim 7, wherein said static state of the vehicle includes a starting state of the vehicle, and said ratio of said front drive force and said rear drive force in said starting state of the vehicle is controlled on the basis of said operator's desired value of the vehicle drive force.

9. A vehicle control apparatus according to claim 1, wherein said static state of the vehicle includes a starting state of the vehicle, and said ratio of said front drive force and said rear drive force in said starting state of the vehicle is controlled such that one of said front and rear drive forces which is used for driving one of said pairs of front and rear wheels which is driven by one of said first and second drive power sources whose performance is more adversely influenced by a rise of its operating temperature is smaller when said operator's desired value of the vehicle drive force is smaller than a predetermined threshold than when said operator's desired value is not smaller than said predetermined threshold.

10. A vehicle control apparatus according to claim 9, wherein said predetermined threshold of said operator's desired value of the vehicle drive force is determined by a maximum value of the vehicle drive force below which said front and rear wheels are not likely to slip on a road surface having a predetermined low value of friction coefficient.

11. A vehicle control apparatus according to claim 1, wherein said first drive power source includes a first electric motor for driving said pair of front wheels while said second drive power source includes a second electric motor for driving said pair of rear wheels, said vehicle control apparatus being operable to control said first and second electric motors according to a predetermined relationship between thermal ratings of said first and second electric motors.

12. A vehicle control apparatus according to claim 1, wherein said first drive power source includes a first electric motor for driving said pair of front wheels while said second drive power source includes a second electric motor for driving said pair of rear wheels, said vehicle control apparatus including first-motor output increasing means operable when an output of said second electric motor is limited, to increase an output of said first electric motor.

13. A vehicle control apparatus according to claim 1, wherein said first drive power source includes a first electric motor for driving said pair of front wheels while said second drive power source includes a second electric motor for driving said pair of rear wheels, said vehicle control apparatus including second-motor output reducing means operable when an output of said first electric motor is limited, to reduce an output of said second electric motor so that a ratio of a front drive force for driving said front wheels and a rear drive force for driving said rear wheels with respect to each other coincides with a desired value.

14. A vehicle control apparatus according to claim 1, which is adapted to apply an assisting drive force to the automotive vehicle on an uphill road surface, such that said assisting drive force corresponds to a gradient of said uphill road surface, said vehicle control apparatus including means for generating said assisting drive force such that said assisting drive force rapidly increases to a desired value for an initial period of the application of said assisting drive force, and slowly decreases from the desired value to zero for a terminal period of the application of said assisting drive force.

15. A vehicle control apparatus according to claim 1, wherein said front drive force for driving said pair of front wheels and said rear drive force for driving said pair of rear wheels are controlled, during starting of the vehicle, on the basis of a gradient of a road surface on which the vehicle is started.

16. A vehicle control apparatus for controlling a four-wheel-drive automotive vehicle of a type which comprises a first drive power source for driving one of a pair of front wheels and a pair of rear wheels, and a second drive power source for driving the other of said pair of front and rear wheels, said vehicle control apparatus being operable to drive said automotive vehicle in a four-wheel driving mode in which said pairs of front and rear wheels are driven by said first and second drive power sources, when said automotive vehicle is placed in any one of a starting state in which the vehicle is being started, an accelerating state in which the vehicle is being accelerated, and a low-$\mu$ running state in which the vehicle is running on a road surface whose friction coefficient is lower than a predetermined threshold, said vehicle control apparatus being operable to drive said automotive vehicle in a two-wheel driving state in which one of said pairs of front and rear wheels are driven, when the vehicle is not placed in any one of said starting state, accelerating state and said low-$\mu$ running state.

17. A vehicle control apparatus according to claim 16, which is operable to drive said automotive vehicle in said four-wheel driving mode when a load acting on the vehicle is smaller than a predetermined threshold.

18. A vehicle control apparatus according to claim 16, wherein said first and second drive power sources include at least one electric motor.

19. A vehicle control apparatus according to claim 18, which is operable to drive said automotive vehicle with only at least one of said at least one electric motor which is included in one of said first and second drive power source.

20. A vehicle control apparatus according to claim 18, which is operable to operate at least one of said at least one electric motor as an electric generator so as to provide a regenerative braking torque, when the automotive vehicle is being braked or in a coasting state.

21. A vehicle control apparatus according to claim 18, wherein said first drive power source includes an engine.

22. A vehicle control apparatus according to claim 21, which is operable to drive the automotive vehicle in one of an engine drive mode and an engine-and-motor drive mode, when a load acting on the vehicle is larger than a predetermined threshold, the vehicle being driven with only said engine of said first drive power source in said engine drive mode, and with both said engine and said electric motor of said first drive power source in said engine-and-motor drive mode.

23. A vehicle control apparatus according to claim 16, wherein said first or second drive power source includes a drive power source capable of generating an electric energy.

24. A vehicle control apparatus according to claim 23, which is operable when the automotive vehicle is in said starting state, to drive the automotive vehicle with only an electric motor of said first or second drive power source, which electric motor is operable as an electric generator capable of generating an electric energy.

25. A vehicle control apparatus according to claim 23, which is operable to operate said drive power source capable of generating an electric energy, so as to provide a regenerative braking torque, when the automotive vehicle is being braked or in a coasting state.

26. A vehicle control apparatus according to claim 23, wherein said first drive power source includes an engine.

27. A vehicle control apparatus according to claim 26, which is operable to drive the automotive vehicle with only said engine of said first drive power source, or with both said engine and said drive power source capable of generating an electric energy, when a load acting on the vehicle is larger than a predetermined threshold.

28. A vehicle control apparatus according to claim 1, wherein said automotive vehicle has traction control means for reducing a drive force of said one of said pairs of front and rear wheels, so that a slip ratio of said one pair of wheels driven by said first drive power source is held within a predetermined optimum range, said vehicle control apparatus comprising (a) torque distribution feedback control means for controlling a front-rear torque distribution ratio which is a ratio of a front-wheel drive torque for driving said front wheels and a rear-wheel drive torque for driving said rear wheels with respect to each other, such that an actual state of slipping of said one pair of wheels with respect to that of said other pair of wheels coincides with a desired state of slipping, and (b) feedback control changing means operable when said traction control means is in operation, for commanding said torque distribution feedback control means to change said front-rear torque distribution ratio to a value different from that used when said traction control means is not in operation.

29. A vehicle control apparatus according to claim 16, wherein said automotive vehicle has traction control means for reducing a drive force of said one of said pairs of front and rear wheels, so that a slip ratio of said one pair of wheels driven by said first drive power source is held within a predetermined optimum range, said vehicle control apparatus comprising (a) torque distribution feedback control means for controlling a front-rear torque distribution ratio which is a ratio of a front-wheel drive torque for driving said front wheels and a rear-wheel drive torque for driving said rear wheels with respect to each other, such that an actual state of slipping of said one pair of wheels with respect to that of said other pair of wheels coincides with a desired state of slipping, and (b) feedback control changing means operable when said traction control means is in operation, for commanding said torque distribution feedback control means to change said front-rear torque distribution ratio to a value different from that used when said traction control means is not in operation.

30. A vehicle control apparatus according to claim 16, wherein said first drive power source includes a first electric motor for driving said pair of front wheels while said second drive power source includes a second electric motor for driving said pair of rear wheels, said vehicle control apparatus being operable to control said first and second electric motors according to a predetermined relationship between thermal ratings of said first and second electric motors.

31. A vehicle control apparatus according to claim 16, wherein said first drive power source includes a first electric motor for driving said pair of front wheels while said second drive power source includes a second electric motor for driving said pair of rear wheels, said vehicle control apparatus including first-motor output increasing means operable when an output of said second electric motor is limited, to increase an output of said first electric motor.

32. A vehicle control apparatus according to claim 16, wherein said first drive power source includes a first electric motor for driving said pair of front wheels while said second drive power source includes a second electric motor for driving said pair of rear wheels, said vehicle control apparatus including second-motor output reducing means operable when an output of said first electric motor is limited, to reduce an output of said second electric motor so that a ratio of a front drive force for driving said front wheels and a rear drive force for driving said rear wheels with respect to each other coincides with a desired value.

33. A vehicle control apparatus according to claim 1, which is adapted to apply an assisting drive force to the automotive vehicle upon starting of the automotive vehicle on an uphill road surface, such that said assisting drive force corresponds to a gradient of said uphill road surface, said vehicle control apparatus including means for inhibiting the application of said assisting drive force to the automotive vehicle if a brake operating member for applying a brake to the automotive vehicle has been kept in its non-operated position for more than a predetermined time.

34. A vehicle control apparatus according to claim 16, which is adapted to apply an assisting drive force to the automotive vehicle upon starting of the automotive vehicle on an uphill road surface, such that said assisting drive force corresponds to a gradient of said uphill road surface, said vehicle control apparatus including means for inhibiting the application of said assisting drive force to the automotive vehicle if a brake operating member for applying a brake to the automotive vehicle has been kept in its non-operated position for more than a predetermined time.

35. A vehicle control apparatus according to claim 16, which is adapted to apply an assisting drive force to the automotive vehicle on an uphill road surface, such that said assisting drive force corresponds to a gradient of said uphill road surface, said vehicle control apparatus including means for generating said assisting drive force such that said assisting drive force rapidly increases to a desired value for an initial period of the application of said assisting drive force, and slowly decreases from the desired value to zero for a terminal period of the application of said assisting drive force.

36. A vehicle control apparatus according to claim 16, wherein said front drive force for driving said pair of front wheels and said rear drive force for driving said pair of rear wheels are controlled, during starting of the vehicle, on the basis of a gradient of a road surface on which the vehicle is started.

37. A vehicle control apparatus for controlling a four-wheel-drive automotive vehicle of a type which comprises a first drive power source for driving one of a pair of front wheels and a pair of rear wheels, and a second drive power source for driving the other of said pairs of front and rear wheels, said vehicle control apparatus comprising:

output-torque-range selecting means for selecting one of a plurality of output torque ranges in which said second drive power source is operated, on the basis of an operating state of the automotive vehicle; and second-power-source control means for operating said second drive power source such that an output torque of said second drive power source is held within the selected output torque range.

38. A vehicle control apparatus according to claim 37, wherein said plurality of output torque ranges include at least a first range of the output torque and a second range of the output torque whose upper limit is smaller than that of said first range.

39. A vehicle control apparatus according to claim 38, wherein said second-power-source control means reduces said output torque of said second drive power source across a boundary of two adjacent ones of said plurality of output torque ranges, at a rate lower than a rate at which said second-power-source control means increases said output torque across said boundary.

40. A vehicle control apparatus according to claim 38, wherein said output-torque-range selecting means selects said first range when the automotive vehicle is placed in any one of a starting state, a slipping state of its drive wheels and an understeering state, and selects said second range when the automotive vehicle is placed in any other states.

41. A vehicle control apparatus according to claim 38, wherein said output-torque-range selecting means selects said first range when a gradient of a road surface on which the automotive vehicle lies is larger than a predetermined threshold, and selects said second range when said gradient is not larger than said predetermined threshold.

42. A vehicle control apparatus according to claim 41, wherein said second-drive-source control means operates said second drive power source during starting of the automotive vehicle on an uphill road surface, such that the automotive vehicle is kept driven in a four-wheel driving mode with said pairs of front and rear wheels, until the running speed of the vehicle is raised to a higher value when the gradient of said uphill road surface is relatively large, than when said gradient is relatively small.

43. A vehicle control apparatus according to claim 37, wherein said automotive vehicle has traction control means for reducing a drive force of said one of said pairs of front and rear wheels, so that a slip ratio of said one pair of wheels driven by said first drive power source is held within a predetermined optimum range, said vehicle control apparatus comprising (a) torque distribution feedback control means for controlling a front-rear torque distribution ratio which is a ratio of a front-wheel drive torque for driving said front wheels and a rear-wheel drive torque for driving said rear wheels with respect to each other, such that an actual state of slipping of said one pair of wheels with respect to that of said other pair of wheels coincides with a desired state of slipping, and (b) feedback control changing means operable when said traction control means is in operation, for commanding said torque distribution feedback control means to change said front-rear torque distribution ratio to a value different from that used when said traction control means is not in operation.

44. A vehicle control apparatus according to claim 37, wherein said first drive power source includes a first electric motor for driving said pair of front wheels while said second drive power source includes a second electric motor for driving said pair of rear wheels, said vehicle control apparatus being operable to control said first and second electric motors according to a predetermined relationship between thermal ratings of said first and second electric motors.

45. A vehicle control apparatus according to claim 37, wherein said first drive power source includes a first electric motor for driving said pair of front wheels while said second drive power source includes a second electric motor for driving said pair of rear wheels, said vehicle control apparatus including first-motor output increasing means operable when an output of said second electric motor is limited, to increase an output of said first electric motor.

46. A vehicle control apparatus according to claim 37, wherein said first drive power source includes a first electric motor for driving said pair of front wheels while said second drive power source includes a second electric motor for driving said pair of rear wheels, said vehicle control apparatus including second-motor output reducing means (340) operable when an output of said first electric motor is limited, to reduce an output of said second electric motor so that a ratio of a front drive force for driving said front wheels and a rear drive force for driving said rear wheels with respect to each other coincides with a desired value.

47. A vehicle control apparatus according to claim 37, which is adapted to apply an assisting drive force to the automotive vehicle upon starting of the automotive vehicle on an uphill road surface, such that said assisting drive force corresponds to a gradient of said uphill road surface, said vehicle control apparatus including means for determining the assisting drive force such that a speed or an acceleration value at which the automotive vehicle is moved down in a reverse direction on said uphill road surface is lower than a predetermined threshold.

48. A vehicle control apparatus according to claim 37, which is adapted to apply an assisting drive force to the automotive vehicle upon starting of the automotive vehicle on an uphill road surface, such that said assisting drive force corresponds to a gradient of said uphill road surface, said vehicle control apparatus including means for inhibiting the application of said assisting drive force to the automotive vehicle if a brake operating member for applying a brake to the automotive vehicle has been kept in its non-operated position for more than a predetermined time while the vehicle is stationary.

49. A vehicle control apparatus according to claim 37, which is adapted to apply an assisting drive force to the automotive vehicle on an uphill road surface, such that said assisting drive force corresponds to a gradient of said uphill road surface, said vehicle control apparatus including means for generating said assisting drive force such that said assisting drive force rapidly increases to a desired value for an initial period of the application of said assisting drive force, and slowly decreases from the desired value to zero for a terminal period of the application of said assisting drive force.

50. A vehicle control apparatus according to claim 37, wherein said front drive force for driving said pair of front wheels (66, 68) and said rear drive force for driving said pair of rear wheels (80, 82) are controlled, during starting of the vehicle, on the basis of a gradient of a road surface on which the vehicle is started.

* * * * *